(12) United States Patent
Takahashi

(10) Patent No.: US 11,440,438 B2
(45) Date of Patent: Sep. 13, 2022

(54) COMMUNICATION SEAT-TYPE VEHICLE

(71) Applicant: YAMAHA HATSUDOKI KABUSHIKI KAISHA, Iwata (JP)

(72) Inventor: Arato Takahashi, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 46 days.

(21) Appl. No.: 16/878,374

(22) Filed: May 19, 2020

(65) Prior Publication Data

US 2020/0276915 A1 Sep. 3, 2020

Related U.S. Application Data

(63) Continuation-in-part of application No. PCT/JP2018/042741, filed on Nov. 20, 2018.

(30) Foreign Application Priority Data

Nov. 20, 2017 (JP) .................. 2017-223153

(51) Int. Cl.
*B60N 2/01* (2006.01)
*B60J 5/04* (2006.01)

(52) U.S. Cl.
CPC ............ *B60N 2/012* (2013.01); *B60J 5/0479* (2013.01)

(58) Field of Classification Search
CPC ............................... B60N 2/012; B60J 5/0479
See application file for complete search history.

(56) References Cited

U.S. PATENT DOCUMENTS

| 1,350,601 A | 8/1920 | Fuller |
| 1,710,616 A | 4/1929 | Guernsey |
| (Continued) | | |

FOREIGN PATENT DOCUMENTS

| AU | 2792900 A | 9/2000 |
| CN | 106627812 A | 5/2017 |
| (Continued) | | |

OTHER PUBLICATIONS

Yamaha Motor Co., Ltd, "CES 2018", [online], Jan. 9, 2018, YouTube (registered trademark), [retrieved on Oct. 19, 2018], the Internet <https://global.yamahamotor.com/jp/showroom/event/2018-ces/index.html>.

(Continued)

*Primary Examiner* — Paul N Dickson
*Assistant Examiner* — Kurtis Nielson
(74) *Attorney, Agent, or Firm* — Rabin & Berdo, P.C.

(57) ABSTRACT

A vehicle including a front wall to form a cabin space to accommodate passengers, communication seats for the passengers seated thereon to talk face-to-face, and front and rear wheels. Front ends of upper and lower portions of the front wall are positioned forward of a rear end of an intermediate portion of the front wall. The front wall includes a front face-up surface, of which a front end is not forward of the front end of the lower portion of the front wall, and is not rearward of front ends of the front wheels, and of which a rear end is not forward of the front end of the upper portion of the front wall, and is not rearward of the rear end of the intermediate portion of the front wall. A front end of an upper portion of the cabin space is positioned forward of a front end of the intermediate portion of the cabin space.

17 Claims, 15 Drawing Sheets

(56) References Cited

U.S. PATENT DOCUMENTS

| | | | |
|---|---|---|---|
| 2,516,237 A | 7/1950 | Morse | |
| 3,352,597 A * | 11/1967 | Barenyi | B60N 2/01 |
| | | | 296/181.1 |
| 3,504,336 A | 3/1970 | Boblitz | |
| 3,759,566 A | 9/1973 | Sobey et al. | |
| 3,856,106 A * | 12/1974 | Sobey | B60V 3/04 |
| | | | 180/116 |
| 4,627,656 A | 12/1986 | Gokimoto et al. | |
| 6,129,405 A | 10/2000 | Miyahara et al. | |
| 6,260,913 B1 * | 7/2001 | Sekita | B62D 21/183 |
| | | | 280/748 |
| 6,334,252 B1 | 1/2002 | Sato et al. | |
| 7,455,490 B1 | 11/2008 | Goosen | |
| 9,725,064 B1 | 8/2017 | Faruque et al. | |
| 9,802,661 B1 | 10/2017 | Kentley-Klay | |
| 2013/0015012 A1 | 1/2013 | Wu | |
| 2013/0098695 A1 * | 4/2013 | Itou | B60K 7/0007 |
| | | | 180/6.28 |
| 2015/0175040 A1 * | 6/2015 | Meszaros | B60N 2/3045 |
| | | | 297/188.01 |
| 2016/0272141 A1 | 9/2016 | Ohmura | |
| 2018/0065464 A1 | 3/2018 | Palhegyi | |
| 2018/0272977 A1 | 9/2018 | Szawarski et al. | |
| 2019/0100247 A1 | 4/2019 | Nusier et al. | |
| 2019/0106017 A1 | 4/2019 | Marubayashi et al. | |
| 2019/0185077 A1 | 6/2019 | Smith et al. | |
| 2019/0193666 A1 | 6/2019 | Jost et al. | |
| 2019/0202391 A1 | 7/2019 | Cho et al. | |
| 2019/0225167 A1 | 7/2019 | Takamura et al. | |
| 2020/0039388 A1 | 2/2020 | Onoyama | |
| 2020/0086820 A1 | 3/2020 | Gould et al. | |
| 2020/0093662 A1 | 3/2020 | Mori | |
| 2020/0130838 A1 | 4/2020 | Beaudin et al. | |
| 2020/0276914 A1 | 9/2020 | Takahashi | |
| 2021/0038447 A1 * | 2/2021 | Fukawatase | B62D 47/00 |
| 2021/0146807 A1 | 5/2021 | Wood | |
| 2021/0179179 A1 | 6/2021 | Butukuri et al. | |
| 2021/0221263 A1 * | 7/2021 | Jost | B60N 2/42745 |
| 2021/0300212 A1 | 9/2021 | Ito et al. | |
| 2021/0380023 A1 | 12/2021 | Kanitz | |
| 2022/0024353 A1 | 1/2022 | Cha et al. | |

FOREIGN PATENT DOCUMENTS

| | | | | |
|---|---|---|---|---|
| DE | 1142115 B * | 1/1963 | | B62D 65/04 |
| DE | 102016008800 A1 | 1/2018 | | |
| FR | 2114948 A5 | 6/1972 | | |
| FR | 2826613 A1 * | 1/2003 | | B62D 31/003 |
| FR | 3046395 A1 | 7/2017 | | |
| FR | 3046395 B1 * | 5/2018 | | B62D 47/02 |
| JP | 2000-318501 A | 11/2000 | | |
| JP | 2003-191757 A | 7/2003 | | |
| JP | 2006-026303 A | 2/2006 | | |
| JP | 2007-325625 A | 12/2007 | | |
| JP | 2010120395 A | 6/2010 | | |
| JP | 2016175513 A | 10/2016 | | |
| KR | 1020120009215 A | 2/2012 | | |
| WO | 0051840 A1 | 9/2000 | | |
| WO | 2011061585 A2 | 5/2011 | | |
| WO | 2011098848 A1 | 8/2011 | | |
| WO | 2011154681 A1 | 12/2011 | | |
| WO | WO-2011154681 A1 * | 12/2011 | | H01H 23/16 |
| WO | 2016161216 A1 | 10/2016 | | |
| WO | WO-2020162186 A1 * | 8/2020 | | B60N 2/01 |

OTHER PUBLICATIONS

Zeromomentpoint, "Future Robot Commuter Hotaru", [online], Apr. 25, 2016, YouTube (registered trademark), [retrieved on Nov. 15, 2017], the Internet <https://www.youtube.com/watch?v=2XbrZ5me2E4>.

* cited by examiner

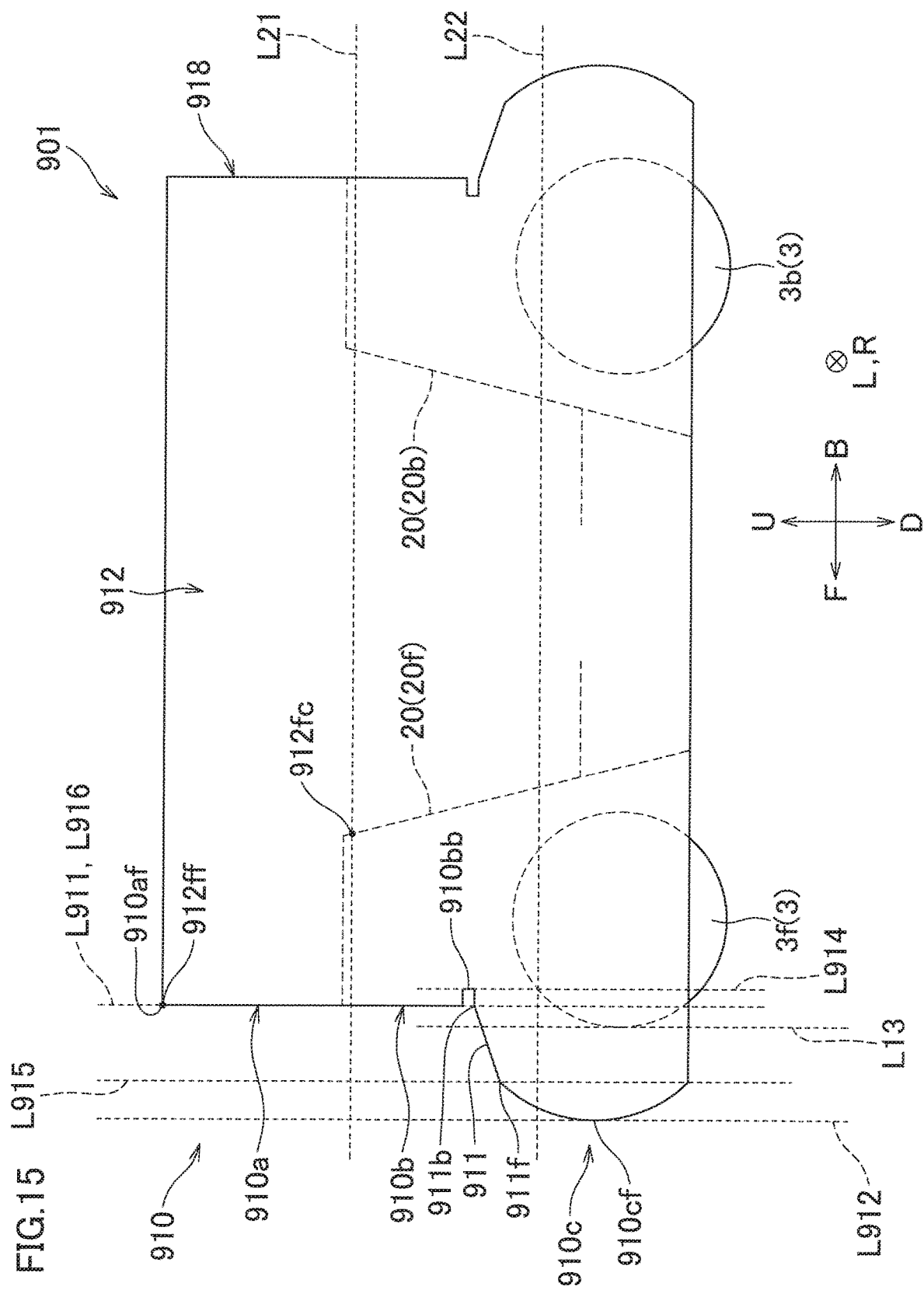

COMMUNICATION SEAT-TYPE VEHICLE

CROSS-REFERENCE TO RELATED APPLICATIONS

This application is a continuation-in-part application of International Application No. PCT/JP2018/042741, filed on Nov. 20, 2018, and claims the benefit of the earlier filing date of Japanese Patent Application No. 2017-223153, filed on Nov. 20, 2017. The entire contents of each of the identified applications are incorporated herein by reference.

BACKGROUND

Technical Field

The present teaching relates to a communication seat-type vehicle which includes communication seats which allow passengers to be seated at locations where the passengers are able to talk face-to-face with one another.

Background Art

A communication seat-type vehicle is a vehicle which includes communication seats which allow passengers to be seated at locations where the passengers are able to talk face-to-face with one another. In the communication seat-type vehicle, a cabin space in which passengers, etc. are accommodated is provided at a vehicle internal portion. The cabin space of such a communication seat-type vehicle is required to be comfortable for passengers. The communication seat-type vehicle is therefore required to have the largest possible cabin space in the limited capacity of the vehicle.

As a communication seat-type vehicle, a vehicle named Hotaru has been proposed as shown in a Non-Patent Literature 1. Hotaru is a vehicle having a box shape in order to satisfy the requirements above. Because the vehicle is box-shaped, a large cabin space can be secured in the vehicle internal portion even though the capacity of the vehicle is limited.

CITATION LIST

Non-Patent Literature

[Non-Patent Literature 1] zeromomentpoint, "Future Robot Commuter Hotaru", [online], Apr. 25, 2016, YouTube (registered trademark), [retrieved on Nov. 15, 2017], the Internet.

SUMMARY OF INVENTION

Technical Problem

In scenes in which a communication seat-type vehicle is used, there are pedestrians along with the communication seat-type vehicle. In the communication seat-type vehicle, the front wall of the vehicle when a pedestrian looks at the vehicle in the vehicle rearward direction is large in area. For this reason, a pedestrian who is ahead in the traveling direction of the communication seat-type vehicle may feel oppressed by the communication seat-type vehicle. The communication seat-type vehicle is therefore required to have an outer shape which is less oppressive for a pedestrian who is ahead in the traveling direction of the vehicle.

Meanwhile, elderly people may ride on the communication seat-type vehicle. Furthermore, a passenger in wheelchair may ride on the communication seat-type vehicle. Furthermore, a cart with a luggage may be brought into the communication seat-type vehicle. For these reasons, the communication seat-type vehicle is required to have a large and comfortable cabin space.

An object of the present teaching is to provide a communication seat-type vehicle with which a pedestrian ahead in a traveling direction of the vehicle feels less oppressive while the comfortability of a cabin space is maintained.

Solution to Problem

The inventors of the subject application reviewed box-shaped vehicles. A box-shaped vehicle has relatively small capacity, while a front wall in the traveling direction of the vehicle is substantially vertically provided. In other words, in the box-shaped vehicle, the front wall of the vehicle is large in area when viewed in the vehicle rearward direction. The inventors of the subject application noticed that, for the above-mentioned reason, a pedestrian who is ahead in the traveling direction of the box-shaped vehicle mal feel oppressed by the vehicle.

As a result of thorough investigation, the inventors of the subject application found that the length in the vehicle front-rear direction (traveling direction) of the vehicle at the height of the viewpoint of a pedestrian ahead in the traveling direction of the vehicle relates to the oppressive feeling. The inventors of the subject application therefore reviewed the shape of the front wall of the vehicle at the height of the viewpoint of the pedestrian ahead of the vehicle front-rear direction which is the traveling direction. The inventors of the subject application provided a front wall upper portion which was at a vehicle upper portion of the front wall and a front wall intermediate portion which was at a vehicle intermediate portion to be rearward of in the vehicle front-rear direction of a front wall vehicle lower portion which was at a vehicle lower portion of the front wall. With this arrangement, the lengths in the vehicle front-rear direction of the vehicle upper portion and the vehicle intermediate portion which were at the height of the viewpoint of the pedestrian ahead in the traveling direction of the vehicle were shorter than the length in the front-rear direction of the vehicle lower portion. As a result, the pedestrian ahead in the traveling direction of the vehicle felt less oppressed by the communication seat-type vehicle.

In connection with the above, when the front wall upper portion and the front wall intermediate portion of the front wall are provided rearward of the front wall lower portion, a cabin space upper portion at a vehicle upper portion of the cabin space and a cabin space intermediate portion at a vehicle intermediate portion of the cabin space are decreased in size. When the cabin space upper portion and the cabin space intermediate portion are decreased in size, the comfortability of the cabin space is considered to be typically deteriorated. The inventors of the subject application therefore reviewed in the comfortability of the cabin space in a detailed manner.

In the communication-type vehicle, communication seats are provided to allow passengers in the vehicle internal portion to be seated at locations where the passengers are able to talk face-to-face with one another. In the communication seat-type vehicle, the passengers are seated at locations where they are able to talk face-to-face with one another. The inventors noticed that, in the case of the communication seat-type vehicle, the comfortability of the cabin space is highly dependent on the cabin space upper portion which is at the height of the viewpoint of the passengers seated on the communication seats. Even if the cabin space upper portion and the cabin space intermediate portion are decreased in size, the comfortability of the cabin space is maintained when the cabin space upper portion is larger than the cabin space intermediate portion. To put it differently, even if the front wall upper portion and the front wall intermediate portion are provided rearward of the front wall lower portion in the vehicle front-rear direction, the cabin space upper portion which is at the height of the viewpoint of the passengers seated on the communication seats is roomy when the cabin space upper portion is larger than the cabin space intermediate portion. The comfortability of the cabin space is therefore maintained.

In addition to the above, when, in the vehicle front-rear direction, the front wall intermediate portion of the vehicle is provided rearward of the vehicle upper portion and a front face-up surface which faces upward and is long in the vehicle front-rear direction is formed at a position lower than the front wall vehicle upper portion, a pedestrian ahead in the traveling direction of the vehicle looks down the front face-up surface formed at the front wall of the vehicle. It has been found that this arrangement causes the pedestrian ahead in the traveling direction to feel as if the front wall of the vehicle at the height of the viewpoint of the pedestrian ahead in the traveling direction of the vehicle is positioned further behind. As a result, it has been found that the oppressive feeling of the pedestrian ahead in the traveling direction due to the communication seat-type vehicle is further decreased.

Based on the above, it has been found that the oppressive feeling of the pedestrian ahead in the traveling direction due to the communication seat-type vehicle is suppressed by providing, in the vehicle front-rear direction, the front wall upper portion and the front wall intermediate portion to be rearward of the front wall lower portion in the communication seat-type vehicle. The oppressive feeling of the pedestrian ahead in the traveling direction due to the communication seat-type vehicle is further suppressed by providing, in the vehicle front-rear direction, the front wall intermediate portion of the communication seat-type vehicle to be rearward of the front wall upper portion and forming, at a position lower than the front wall upper portion, the front face-up surface which faces upward and is long in the vehicle front-rear direction. Meanwhile, the comfortability of the cabin space for the passengers is maintained by providing, in the vehicle front-rear direction, the cabin space upper portion of the communication seat-type vehicle to be forward of the cabin space intermediate portion.

(1) A communication seat-type vehicle of the present teaching includes: a front wall which is provided at a vehicle front portion and forms a cabin space in a vehicle internal portion to accommodate passengers; communication seats which are provided in the vehicle internal portion and allow the passengers to be seated at locations where the passengers are able to talk face-to-face with one another; and four wheels including two front wheels and two rear wheels which are behind the two front wheels in a vehicle front-rear direction, the communication seat-type vehicle being capable of running forward in the vehicle front-rear direction, as a traveling direction, in the front wall, in the vehicle front-rear direction, a front end of a front wall upper portion at a vehicle upper portion and a front end of a front wall lower portion at a vehicle lower portion being positioned forward of a rear end of a front wall intermediate portion at a vehicle intermediate portion, the front wall including a front face-up surface which has a front end and a rear end and is disposed below the front wall upper portion, in the vehicle front-rear direction, the front end of the front face-up surface being at the same position as or rearward of the front end of the front wall lower portion and at the same position as or forward of front ends of the two front wheels, and in the vehicle front-rear direction, the rear end of the front face-up surface being at the same position as or rearward of the front end of the front wall upper portion and is at the same position as or forward of the rear end of the front wall intermediate portion, and in the cabin space, in the vehicle front-rear direction, a front end of a cabin space upper portion at the vehicle upper portion being positioned forward of a front end of a cabin space intermediate portion at the vehicle intermediate portion.

According to this arrangement, the communication seat-type vehicle includes the front wall, the communication seat, and the four wheels. The front wall is provided at the vehicle front portion. The front wall forms the vehicle internal portion. The cabin space is provided in the vehicle internal portion. The cabin space accommodates the passengers. The communication seat is arranged to allow passengers to be seated at locations where the passengers are able to talk face-to-face with one another. The communication seat is a seat arranged so that plural passengers can be seated on the seat. On the communication seat, one passenger or plural passengers may be seated. The communication seat may be a seat which is switchable between a state in which seated passengers face one another and a state in which the seated passengers face the same direction. In this connection, the communication seat does not include a seat which is fixed in a state in which the seated passengers face only in the same direction. The communication seat is provided in the vehicle internal portion. The communication seat may constitute the cabin space. The communication seat may be provided in the cabin space. The four wheels include two front wheels and two rear wheels. The two rear wheels are provided rearward of the two front wheels in the vehicle front-rear direction. The communication seat-type vehicle is able to run forward in the vehicle front-rear direction, as a traveling direction. The traveling direction is a direction in which the communication seat-type vehicle in normal use runs due to the rotation of wheels. The traveling direction does not include a direction in which the communication seat-type vehicle temporarily runs. When the communication seat-type vehicle is a bi-directional vehicle, the traveling direction can be changed to rearward in the vehicle front-rear direction.

The front wall is arranged such that, in the vehicle front-rear direction, a front end of the front wall upper portion and a front end of the front wall lower portion are positioned forward of a rear end of the front wall intermediate portion. The front wall upper portion is part of the front wall and is at a vehicle upper portion. The front wall intermediate portion is part of the front wall and is at a vehicle intermediate portion. The front wall lower portion is part of the front wall and is at a vehicle lower portion. The front wall is constituted by the front wall upper portion, the front wall intermediate portion, and the front wall lower portion. In this connection, the front wall of the communication seat-type vehicle is an outer wall at the front end portion of the communication seat-type vehicle in the vehicle front-rear direction. The outer wall include a vehicle body cover, a window, a door, etc. which separate the vehicle internal portion from the outside of the vehicle. With this arrangement, the length in the vehicle front-rear direction of the vehicle is short at the height of the viewpoint of a pedestrian ahead in the traveling direction of the communication seat-type vehicle. As a result, the pedestrian ahead in the traveling direction of the vehicle feels less oppressed by the communication seat-type vehicle.

In the vehicle front-rear direction, the front wall vehicle upper portion is positioned forward of the front wall vehicle intermediate portion, and the front end of the cabin space upper portion at the vehicle upper portion of the cabin space is positioned forward of the front end of the cabin space intermediate portion which is at the vehicle intermediate portion of the cabin space. With this arrangement, in the vehicle front portion, the cabin space upper portion is larger than the cabin space intermediate portion. As a result, the cabin space upper portion which is at the height of the viewpoint of the passenger seated on the communication seat is roomy. The comfortability of the cabin space is therefore maintained.

In addition to the above, the front wall of the vehicle includes the front face-up surface. The front end of the front face-up surface is provided at the same position as or rearward of the front end of the front wall lower portion and is at the same position as or forward of the front ends of the two front wheels. The rear end of the front face-up surface is provided at the same position as or rearward of the front end of the front wall upper portion and is at the same position as or forward of the rear end of the front wall intermediate portion. This front face-up surface is provided below the front wall upper portion. For these reasons, the front face-up surface is provided at a position lower than the front wall upper portion of the vehicle, and is long in the vehicle front-rear direction. In summary, the front wall intermediate portion is provided rearward of the front wall upper portion in the vehicle front-rear direction, and the front face-up surface is formed at a position lower than the front wall upper portion of the front wall to face upward and to be long in the vehicle front-rear direction. As a result, the pedestrian ahead in the traveling direction of the vehicle looks down the front face-up surface formed at the front wall of the vehicle. It is therefore possible to cause the pedestrian ahead in the traveling direction of the communication seat-type vehicle to feel as if the front wall at the height of the viewpoint of the pedestrian ahead in the traveling direction of the vehicle is positioned further behind. As a result, the oppressive feeling of the pedestrian ahead in the traveling direction of the vehicle, which is caused by the communication seat-type vehicle, is further suppressed.

In this way, with the communication seat-type vehicle of the present teaching, the pedestrian ahead in the traveling direction of the vehicle feels less oppressive while the comfortability of the cabin space is maintained.

(2) According to an aspect of the present teaching, the communication seat-type vehicle of the present teaching preferably includes the following arrangement, in addition to the arrangement (1).

Preferably, in the vehicle front-rear direction, the front end of the front wall upper portion is positioned rearward of the front end of the front wall lower portion.

With this arrangement, when viewed in the vehicle up-down direction, at least part of the front face-up surface does not overlap the front wall upper portion. As a result, the space above the front face-up surface is further widened and a pedestrian ahead in the traveling direction of the vehicle to feel as if the front wall upper portion of the vehicle is positioned further behind the front wall lower portion. Consequently, the oppressive feeling of the pedestrian ahead in the traveling direction due to the communication seat-type vehicle is further decreased.

In this way, with the communication seat-type vehicle of the present teaching, the pedestrian ahead in the traveling direction of the vehicle feels less oppressive while the comfortability of the cabin space is maintained.

(3) According to an aspect of the present teaching, the communication seat-type vehicle of the present teaching preferably includes the following arrangement, in addition to the arrangement (1) or (2). Preferably, the communication seats include at least two of: a rear seat assembly on which a seated passenger faces in a vehicle forward direction; a front seat assembly on which a seated passenger faces in a vehicle rearward direction; a right seat assembly on which a seated passenger faces in a vehicle leftward direction; and a left seat assembly on which a seated passenger faces in a vehicle rightward direction.

According to this arrangement, the communication seat does not include a seat assembly which is fixed in a state in which the seated passengers face only in the same direction. The communication seat is therefore arranged to allow passengers to be seated at locations where the passengers are able to talk face-to-face with one another.

(4) According to an aspect of the present teaching, the communication seat-type vehicle of the present teaching preferably includes the following arrangement, in addition to any one of the arrangements (1) to (3).

Preferably, the maximum number of the passengers seated on the communication seat is six or less.

With this arrangement, while the comfortability of the cabin space is maintained, the passengers in the communication seat-type vehicle can be seated on the communication seats so that the passengers are able to talk face-to-face with one another.

(5) According to an aspect of the present teaching, the communication seat-type vehicle of the present teaching preferably includes the following arrangement, in addition to any one of the arrangements (1) to (4).

Preferably, the traveling direction is changeable to rearward in the vehicle front-rear direction.

According to this arrangement, the traveling direction of the communication seat-type vehicle can be switched to rearward in the vehicle front-rear direction. To put it differently, the communication seat-type vehicle may be a bi-directional vehicle which is able to change the traveling direction by rotating the wheels in reverse.

(6) According to an aspect of the present teaching, the communication seat-type vehicle of the present teaching preferably includes the following arrangement, in addition to any one of the arrangements (1) to (5).

Preferably, the communication seat-type vehicle further includes a rear wall which is provided at a vehicle rear portion constituting the cabin space, in the rear wall, in the vehicle front-rear direction, a rear end of a rear wall upper portion at the vehicle upper portion and a rear end of a rear wall lower portion at the vehicle lower portion being positioned rearward of a front end of a rear wall intermediate portion at the vehicle intermediate portion, the rear wall including a rear face-up surface which has a front end and a rear end and is disposed below the rear wall upper portion, in the vehicle front-rear direction, the rear end of the rear face-up surface being at the same position as or forward of the rear end of the rear wall lower portion and at the same position as or rearward of rear ends of the two rear wheels, and in the vehicle front-rear direction, the front end of the rear face-up surface being at the same position as or forward of the rear end of the rear wall upper portion and is at the same position as or rearward of the front end of the rear wall intermediate portion, and in the cabin space, in the vehicle front-rear direction, a rear end of the cabin upper portion being positioned rearward of a rear end of the cabin space intermediate portion.

According to this arrangement, the communication seat-type vehicle includes the rear wall.

In the rear wall of the communication seat-type vehicle, in the vehicle front-rear direction, a rear end of a rear wall upper portion at the vehicle upper portion and a rear end of a rear wall lower portion at the vehicle lower portion being positioned rearward of a front end of a rear wall intermediate portion at the vehicle intermediate portion. The rear wall upper portion is part of the rear wall and is at the vehicle upper portion. The rear wall intermediate portion is part of the rear wall and is at the vehicle intermediate portion. The rear wall lower portion is part of the rear wall and is at the vehicle lower portion. The rear wall is constituted by the rear wall upper portion, the rear wall intermediate portion, and the rear wall lower portion. In this connection, the rear wall of the communication seat-type vehicle is an outer wall at the rear end portion of the communication seat-type vehicle in the vehicle front-rear direction. With this arrangement, the length of the vehicle in the vehicle front-rear direction is shortened at the height of the viewpoint of a pedestrian behind the vehicle in the vehicle front-rear direction. As a result, the pedestrian behind the communication seat-type vehicle in the vehicle front-rear direction feels less oppressive by the vehicle.

In the vehicle front-rear direction, the rear wall upper portion is positioned rearward of the rear wall intermediate portion, and the rear end of the cabin space upper portion is positioned rearward of the rear end of the cabin space intermediate portion. With this arrangement, the cabin space upper portion is larger than the vehicle intermediate portion of the cabin space, and the cabin space upper portion which is at the height of the viewpoint of the passenger seated on the communication seat is roomy. The size in the vehicle front-rear direction of the cabin space at the height of the viewpoint of the passenger seated on the communication seat is therefore maintained, with the result that the comfortability of the cabin space is maintained.

In addition to the above, the rear wall of the vehicle includes the rear face-up surface. The rear end of the rear face-up surface is provided at the same position as or forward of the rear end of the rear wall lower portion and is at the same position as or rearward of the rear ends of the two rear wheels. Furthermore, the front end of the rear face-up surface is provided at the same position as or forward of the rear end of the rear wall upper portion and is at the same position as or rearward of the front end of the rear wall intermediate portion. This rear face-up surface is provided below the rear wall upper portion. For these reasons, the rear face-up surface is provided at a position lower than the rear wall upper portion, and is long in the vehicle front-rear direction. In summary, the rear wall intermediate portion is provided forward of the rear wall upper portion in the vehicle front-rear direction, and the rear face-up surface is formed at a position lower than the rear wall upper portion to face upward and to be long in the vehicle front-rear direction. As a result, the pedestrian behind the vehicle in the vehicle front-rear direction looks down the rear face-up surface formed in the rear wall of the vehicle. It is therefore possible to cause the pedestrian behind the vehicle in the vehicle front-rear direction to feel as if the rear wall is positioned further forward at the height of the viewpoint of the pedestrian. As a result, the oppressive feeling of the pedestrian behind the communication seat-type vehicle in the vehicle front-rear direction, which is caused by the vehicle, is further suppressed.

For example, the front wall and the rear wall may be shaped to be plane symmetrical with respect to a plane which passes between the front wall and the rear wall in the vehicle front-rear direction and is perpendicular to the vehicle front-rear direction. Furthermore, for example, in the communication seat-type vehicle, the front wall viewed rearward in the vehicle front-rear direction is identical in shape with the rear wall viewed forward in the vehicle front-rear direction.

Consequently, even after the traveling direction is changed to rearward in the vehicle front-rear direction, the oppressive feeling of the pedestrian ahead in the traveling direction due to the communication seat-type vehicle is suppressed.

(7) According to an aspect of the present teaching, the communication seat-type vehicle of the present teaching preferably includes the following arrangement, in addition to the arrangement (6).

Preferably, in the vehicle front-rear direction, the rear end of the rear wall upper portion is positioned forward of the rear end of the rear wall lower portion.

With this arrangement, when viewed in the vehicle up-down direction, at least part of the rear face-up surface does not overlap the rear wall upper portion. As a result, the space above the rear face-up surface is further widened and a pedestrian behind in the vehicle front-rear direction of the vehicle to feel as if the front rear wall upper portion of the vehicle is positioned further forward of the rear wall lower portion. Consequently, the oppressive feeling of the pedestrian rearward in the vehicle front-rear direction of the vehicle due to the communication seat-type vehicle is further decreased.

In this way, with the communication seat-type vehicle of the present teaching, the pedestrian ahead in the traveling direction of the vehicle feels less oppressive while the comfortability of the cabin space is maintained.

(8) According to an aspect of the present teaching, the communication seat-type vehicle of the present teaching preferably includes the following arrangement, in addition to any one of the arrangements (1) to (7).

Preferably, the communication seat includes a seat portion on which a passenger is seated, and a seat which is formed to be able to constitute the seat portion is provided in the vehicle internal portion of the communication seat-type vehicle.

According to this arrangement, the communication seats include a seat portion on which a passenger is seated. The seat is formed to be able to constitute the seat portion in the vehicle internal portion. For example, the seat is fixed in a seating state in which a passenger is able to be seated and constitutes the seat portion. For example, the seat is swingable between the seating state in which a passenger is allowed to be seated thereon and a storage state (non-seating state) in which a passenger is not allowed to be seated. To be more specific, the seat is arranged to be swingable relative to the back rest or a wall surface in the vehicle internal portion. When the seat is in the storage state, the seat is positioned to face the back rest or the wall surface in the vehicle internal portion. For example, the seat is formed to be detachable and switchable from the seating state or the storage state to a detached state in which the seat is detached. When the seat is in the storage state or the detached state, the seat does not form the seat portion in the vehicle internal portion. When the seat is in the storage state or the detached state, the cabin space is roomy when passengers get in or out from the cabin space, and it becomes easy for the passengers to get in and out from the vehicle. Furthermore, if the seat is in the storage state or the detached state when luggage is introduced into the cabin space, the cabin space is roomy and many pieces of luggage can be loaded. The comfortability of the cabin space is therefore further ensured. When the seat is in the seating state, the area of the seat is maximized when viewed in the vehicle up-down direction. When the seat is in the storage state, the area of the seat viewed in the vehicle up-down direction is small as compared to the seat in the seating state. When the seat is in the detached state, the area of the seat is minimized to 0 when viewed in the vehicle up-down direction. In other words, the area of the seat is changeable when viewed in the vehicle up-down direction.

(9) According to an aspect of the present teaching, the communication seat-type vehicle of the present teaching preferably includes the following arrangement, in addition to any one of the arrangements (1) to (8).

Preferably, the communication seat includes a back rest portion by which a passenger keeps posture, and a back rest which is formed to be able to constitute the back rest portion is provided in the vehicle internal portion of the communication seat-type vehicle.

According to this arrangement, the communication seat includes the back rest portion which is used by a passenger to keep the posture. The back rest is formed to be able to constitute the back rest portion in the vehicle internal portion. The back rest is fixed in a posture keeping state in which a passenger is able to keep the posture, to constitute the back rest portion. When the back rest is in the posture keeping state, the passenger is able to lean on the back rest portion. When the back rest is in a storage state (non-posture keeping state), the passenger is not able to lean on the back rest portion. For example, the back rest may be swingable between an attached state in which the back rest portion is formed and a storage state in which the back rest portion is not formed. To be more specific, for example, the back rest is arranged to be swingable relative to the seat. When the back rest is in the storage state, the back rest is swung so that the back rest faces the seat. Alternatively, the back rest may be detachable and switchable from the attached state in which the back rest portion is formed to the detached state in which the back rest portion is not formed. When the back rest constitutes the back rest portion, the back of a passenger is supported and the passenger keeps the posture thanks to the back rest, when seated on the communication seat, with the result that the passenger feels comfortable. The comfortability of the cabin space is therefore further ensured.

(10) According to an aspect of the present teaching, the communication seat-type vehicle of the present teaching preferably includes the following arrangement, in addition to any one of the arrangements (1) to (9).

Preferably, the communication seat-type vehicle further includes, in the vehicle internal portion, at least one of: a front luggage deck constituting a front storage space which is at least partially provided forward of a front end of the communication seats; or a rear luggage deck constituting a rear storage space which is at least partially provided rearward of a rear end of the communication seats.

According to this arrangement, the communication seat-type vehicle includes at least one of the front luggage deck constituting the front storage space or the rear luggage deck constituting the rear storage space. The front storage space is provided in the vehicle internal portion and is positioned at least partially forward of the front end of the communication seat. The rear storage space is provided in the vehicle internal portion and is positioned at least partially rearward of the rear end of the communication seat. As luggage, etc. is stored in the front storage space and the rear storage space, the cabin space is roomy for the passengers. The comfortability of the cabin space is therefore further ensured by utilizing spaces other than the cabin space.

(11) According to an aspect of the present teaching, the communication seat-type vehicle of the present teaching preferably includes the following arrangement, in addition to the arrangement (9). Preferably, the communication seat-type vehicle further includes, in the vehicle internal portion, at least one of: a front luggage deck constituting a front storage space which is at least partially provided forward of a front end of the communication seats; or a rear luggage deck constituting a rear storage space which is at least partially provided rearward of a rear end of the communication seats, and the back rest being arranged to be able to open and close at least one of the front storage space or the rear storage space.

According to this arrangement, the communication seat-type vehicle includes at least one of the front luggage deck constituting the front storage space or the rear luggage deck constituting the rear storage space. The front storage space is provided in the vehicle internal portion and is positioned at least partially forward of the front end of the communication seat. The rear storage space is provided in the vehicle internal portion and is positioned at least partially rearward of the rear end of the communication seat. The area of the back rest is changeable when viewed in the vehicle front-rear direction. Alternatively, for example, the area of the back rest when viewed in the vehicle front-rear direction is changeable between a posture keeping state and a storage state in which the passenger cannot keep the posture. When the back rest is in the posture keeping state, the area of the back rest is maximized when viewed in the vehicle front-rear direction. When the back rest is in the storage state, the area of the back rest when viewed in the vehicle front-rear direction is small as compared to the case where the back rest is in the posture keeping state. To be more specific, for example, the back rest is arranged to be swingable relative to the seat. When the back rest is in the storage state, the rest is swung so that the back rest faces the seat. Alternatively, for example, the back rest is formed to be detachable and switchable from the posture keeping state or the storage state to a detached state in which the back rest is detached. When the back rest is in the detached state, the area of the back rest is minimized to 0 when viewed in the vehicle front-rear direction. When the communication seat-type vehicle has the front storage space, the back rest is switchable between a closed state in which the front storage space is closed and an open state in which the front storage space is open. To be more specific, the back rest is arranged to be swingable relative to the seat to be in the storage state. Alternatively, the back rest may be detachable and switchable from the posture keeping state of the back rest in which the front storage space is in the closed state to the detached state of the back rest in which the front storage space is in the open state. When the front storage space is in the open state, the back rest is in the storage state or the detached state. When the front storage space is in the closed state, the back rest is in the posture keeping state. Passengers are allowed to utilize the front storage space when the front storage space is in the open state. As luggage, etc. of passengers is stored in the front storage space, the cabin space is roomy for the passengers.

When the communication seat-type vehicle has the rear storage space, the back rest is switchable between a closed state in which the rear storage space is closed and an open state in which the rear storage space is open. To be more specific, the back rest is arranged to be swingable relative to the seat to be in the storage state. Alternatively, the back rest may be detachable and switchable from the posture keeping state of the back rest in which the rear storage space is in the closed state to the detached state of the back rest in which the rear storage space is in the open state. When the rear storage space is in the open state, the back rest is in the storage state or the detached state. When the rear storage space is in the closed state, the back rest is in the posture keeping state. Passengers are allowed to utilize the rear storage space when the rear storage space is in the open state. As luggage, etc. of passengers is stored in the rear storage space, the cabin space is roomy for the passengers. In this way, the comfortability of the cabin space is therefore further ensured by utilizing spaces other than the cabin space.

(12) According to an aspect of the present teaching, the communication seat-type vehicle of the present teaching preferably includes the following arrangement, in addition to any one of the arrangements (1) to (11).

Preferably, the communication seat-type vehicle further includes at least one window which allows the passengers seated on the communication seats to see an external space outside the vehicle from the cabin space.

According to this arrangement, the communication seat-type vehicle includes the window. The window is arranged to allow a passenger seated on the communication seat to see the external space outside the vehicle from the cabin space. The passenger therefore feels spaciousness. Because the passenger feels spaciousness, the comfortability of the cabin space is further ensured.

According to an aspect of the present teaching, the communication seat-type vehicle of the present teaching preferably includes the following arrangement, in addition to the arrangement (12). Preferably, the communication seat-type vehicle further includes a visor which is provided directly above the window or provided at an upper edge of the window and on the vehicle outer surface.

According to this arrangement, the communication seat-type vehicle includes the visor. The visor is provided directly above the window or provided at an upper edge of the window and on the vehicle outer surface. Because the visor prevents the entrance of rain or sunlight through the window, the comfortability of the cabin space is further ensured. The vehicle outer surface is a surface exposed to the external space of the vehicle, among surfaces constituting the vehicle.

(13) According to an aspect of the present teaching, the communication seat-type vehicle of the present teaching preferably includes the following arrangement, in addition to any one of the arrangements (1) to (12).

Preferably, the communication seat-type vehicle further includes an entrance which allows the passengers to get in and out from the cabin space, the entrance being provided at at least one of a vehicle left portion, a vehicle right portion, the vehicle front portion, or a vehicle rear portion.

According to this arrangement, the entrance is provided at at least one of the vehicle left portion, the vehicle right portion, the vehicle front portion, or the vehicle rear portion. The entrance is therefore positioned to allow passengers to easily get in and out from the cabin space. Because passengers can easily get in or out from the vehicle, the comfortability of the cabin space is further ensured.

(14) According to an aspect of the present teaching, the communication seat-type vehicle of the present teaching preferably includes the following arrangement, in addition to the arrangement (13). Preferably, the communication seat-type vehicle further includes a door which is configured to be able to open and close the entrance.

According to this arrangement, the entrance is opened and closed by the door. The door may be switched to a closed state when no passenger gets in or out. As the door is switched to the closed state, a space around the feet of the passengers is not open and hence the comfortability of the cabin space is maintained.

According to an aspect of the present teaching, the communication seat-type vehicle of the present teaching preferably includes the following arrangement, in addition to the arrangement (14). Preferably, the door is a sliding door which can be slid along the vehicle outer surface.

According to this arrangement, the door is a sliding door and is slid along the vehicle outer surface. The door does not therefore enter the cabin space. The cabin space is roomy for the passengers and hence the comfortability of the cabin space is maintained.

(15) According to an aspect of the present teaching, the communication seat-type vehicle of the present teaching preferably includes the following arrangement, in addition to any one of the arrangements (1) to (14).

Preferably, the communication seat-type vehicle further includes a driving source which is configured to apply driving force to at least one of the four wheels; a steering mechanism which is configured to steer at least one of the four wheels; and an automatic driving controller which is configured to automatically control the driving source and the steering mechanism.

According to this arrangement, the communication seat-type vehicle further includes the driving source, the steering mechanism, and the automatic driving controller. The driving source applies driving force to at least one of the four wheels. The steering mechanism steers at least one of the four wheels. The driving source and the steering mechanism are automatically controlled by the automatic driving controller. The communication seat-type vehicle is able to automatically run. It is therefore unnecessary to provide components such as a steering wheel and a pedal in the cabin space. The cabin space is roomy for the passengers and hence the comfortability of the cabin space is maintained.

<Definition of Communication Seats>

In the present teaching, communication seats are arranged to allow passengers to be seated at locations where the passengers are able to talk face-to-face with one another. The communication seats are seats on which plural passengers can be seated. The communication seats include, for example, two rows of seat assemblies which are provided to allow the passengers to be seated face to face. The communication seats include, for example, a seat assembly provided in L shape. The communication seats include, for example, a seat assembly provided in C shape. The communication seats include, for example, a seat assembly provided to form a quadrangle. On the communication seats, one passenger or plural passengers may be seated. On the communication seats, the seated passengers may or may not talk each other face to face. The communication seats may include a seat assembly which is switchable between a state in which seated passengers face one another and a state in which the seated passengers face the same direction. In this connection, the communication seats do not include a seat assembly which is fixed in a state in which the seated passengers face only in the same direction. To allow the seated passengers to talk each other face to face, the maximum number of passengers seated on the communication seats is preferably 6 or less. In regard to the maximum number of passengers seated, each passenger is an adult of average height. The communication seat-type vehicle may be individually owned or may be used publicly.

<Definition of Traveling Direction>

In the present teaching, the traveling direction of the communication seat-type vehicle is basically a forward direction in the vehicle front-rear direction. The traveling direction of the communication seat-type vehicle is a direction in which the communication seat-type vehicle in normal use runs due to the rotation of wheels. The traveling direction does not include a direction in which the communication seat-type vehicle runs due to temporary reverse rotation of the wheels. When the communication seat-type vehicle is a bi-directional vehicle, the traveling direction of the communication seat-type vehicle can be changed to a rearward direction in the vehicle front-rear direction, as the rotational direction of the wheels in normal use is changed to the reverse direction. The communication seat-type vehicle may run on a public road or a private road, or may run on a running path which is not a road.

<Definition of Front Wall and Rear Wall of Communication Seat-Type Vehicle>

In the present teaching, the front wall of the communication seat-type vehicle is a front surface of an outer wall which is at a front end portion of the communication seat-type vehicle in the vehicle front-rear direction. In other words, the front wall of the communication seat-type vehicle does not have thickness in the vehicle front-rear direction. The front face-up surface of the front wall of the communication seat-type vehicle is an outer wall surface having a front end and a rear end. The front end of the front face-up surface is at the same position or rearward of the front end of the vehicle lower portion of the front wall and is at the same position as or forward of the front end of a front wheel. The rear end of the front face-up surface is at the same position as or rearward of the front end of the vehicle upper portion of the front wall and is at the same position as or forward of the rear end of the vehicle intermediate portion of the front wall. The front face-up surface is an outer wall surface which is formed along the vehicle front-rear direction and has a space which is open upward from the front face-up surface. In the present teaching, the rear wall of the communication seat-type vehicle is a front surface of an outer wall at the rear end portion of the communication seat-type vehicle in the vehicle front-rear direction. In other words, the rear wall of the communication seat-type vehicle does not have thickness in the vehicle front-rear direction. A rear face-up surface of the rear wall of the communication seat-type vehicle is an outer wall surface having a rear end and a front end. The rear end of the rear face-up surface is at the same position as or forward of the rear end of a lower portion of the rear wall and is at the same position as or rearward of the rear end of a rear wheel. The front end of the rear face-up surface is at the same position as or forward of the rear end of an upper portion of the rear wall and is at the same position as or rearward of the front end of an intermediate portion of the rear wall. The rear face-up surface is an outer wall surface which is formed along the vehicle front-rear direction and has a space which is open upward from the rear face-up surface.

In the present teaching, the front wall of the communication seat-type vehicle viewed rearward in the front-rear direction is identical in shape with the rear wall of the communication seat-type vehicle viewed forward in the front-rear direction. This indicates that the outer shape of the front wall of the communication seat-type vehicle viewed rearward in the vehicle front-rear direction is identical or substantially identical with the outer shape of the rear wall of the communication seat-type vehicle viewed forward in the vehicle front-rear direction. In the present teaching, the front wall and the rear wall of the communication seat-type vehicle are plane symmetrical with respect to a plane which passes between the front wall and the rear wall in the vehicle front-rear direction and is orthogonal to the vehicle front-rear direction. This indicates that the outer shapes of the front wall and the rear wall of the communication seat-type vehicle are substantially plane symmetrical with respect to a plane which passes between the front wall and the rear wall in the vehicle front-rear direction and is orthogonal to the vehicle front-rear direction.

<Definition of Vehicle Upper Portion, Vehicle Intermediate Portion, and Vehicle Lower Portion of Communication Seat-Type Vehicle>

In the present teaching, the vehicle upper portion of the communication seat-type vehicle is the uppermost portion when the communication seat-type vehicle is equally divided into three portions in the vehicle up-down direction. The vehicle intermediate portion of the communication seat-type vehicle is the middle portion when the communication seat-type vehicle is equally divided into three portions in the vehicle up-down direction. The vehicle lower portion of the communication seat-type vehicle is the lowermost portion when the communication seat-type vehicle is equally divided into three portions in the vehicle up-down direction.

<Definition of Cabin Space>

In the present teaching, the cabin space is a space provided in a vehicle internal portion and is a space where passengers are accommodated. The cabin space is constituted by a vehicle body cover, communication seats in the vehicle internal portion, windows, doors, etc. The vehicle body cover is, for example, included in outer walls outside the vehicle and inner walls in the vehicle internal portion. When the communication seat-type vehicle has windows, a space inside planes constituting the windows is the cabin space whereas a space outside the planes constituting the windows is the external space, no matter whether a glass is fitted in each window. Furthermore, no matter whether the communication seat-type vehicle has a door, a space inside a plane constituting the entrance is the cabin space whereas a space outside the plane constituting the entrance is the external space. The cabin space is preferably not high enough to allow an adult passenger with average height to stand erect, but high enough to allow an adult passenger with average height to be seated on a communication seat. This arrangement makes it possible to obtain a roomy cabin space while the capacity of the communication seat-type vehicle is maintained to be small.

<Definition of Vehicle Front Portion, Vehicle Rear Portion, Vehicle Left Portion, and Vehicle Right Portion of Communication Seat-Type Vehicle>

In the present teaching, a vehicle front portion of the communication seat-type vehicle is the front portion when the vehicle is equally divided in two in the vehicle front-rear direction. A vehicle rear portion of the communication seat-type vehicle is the rear portion when the vehicle is equally divided in two in the vehicle front-rear direction. A vehicle left portion of the communication seat-type vehicle is the left portion when the vehicle is equally divided in two in the vehicle left-right direction. A vehicle right portion of the communication seat-type vehicle is the left portion when the vehicle is equally divided in two in the vehicle left-right direction.

<Definition of Wheels>

In the present teaching, a wheel includes a tire and a wheel main body that holds the tire. A front wheel is a wheel provided at the front portion of the vehicle in the vehicle front-rear direction. A rear wheel is a wheel provided at the rear portion of the vehicle in the vehicle front-rear direction.

<Definition of Door>

In the present teaching, a door is a member which moves to open or close the entrance, and does not encompass accessories of the door, such as a rail attached to the vehicle. The door of the present teaching may be a sliding door, hinged door, swing door, a glide slide door, etc. In the present teaching, the sliding door is a door slidable along the outer surface of the vehicle.

<Definition of Driving Source>

In the present teaching, a driving source applies driving force to at least two of four wheels. The driving source is a motor, an engine, etc.

<Definition of Steering Mechanism>

In the present teaching, a steering mechanism is a mechanism for steering at least two of the four wheels. The steering mechanism is a mechanism for steering at least two of the four wheels by, for example, rotation of a steering wheel. The steering mechanism is a mechanism for steering at least two of the four wheels by, for example, an automatic driving controller. The steering mechanism may be a mechanism for steering two front wheels or two rear wheels. The steering mechanism may be a mechanism for steering two front wheels and two rear wheels.

<Definitions of Other Terms>

In the present teaching, an end portion of a member indicates a portion constituted by an end and its surroundings of the member.

In this specification, unless otherwise specified, an inclination angle of a linear line A with respect to a linear line B indicates a smaller one of the angles formed by the linear line A and the linear line B. This applies not only the linear lines but also directions.

In this specification, unless otherwise specified, an angle between a linear line A and a linear line B indicates a smaller one of the angles formed by the linear line A and the linear line B. This applies not only the linear lines but also directions.

In the present teaching and the specification, a linear line along the A direction is not limited to a linear line in parallel to the A direction. Unless otherwise specified, the linear line along the A direction includes a linear line which intersects with the A direction at an angle which falls within the range from −45 degrees to 45 degrees. The same definition applies to other expressions using "along". The other expressions using "along" are, for example, "direction along the A direction", "plural B are lined up along the A direction", and "a single B is provided along the A direction". The direction A does not indicate any specific direction. The direction A may be the horizontal direction or the front-rear direction.

In the present teaching and the specification, an expression "entities A and B are lined up in an X direction" indicates the following state. Even when the entities A and B are viewed in any direction orthogonal to the X direction, a linear line or a curved line indicating the X direction passes through both the entities A and B. When the entirety of an entity A is lined up with an entity B in the X direction, the entirety of the entity A opposes the entity B in the X direction. In other words, the entirety of the entity A overlaps the entity B when viewed in the X direction. The term "entirety" may be replaced with a term "part".

In the present teaching and the specification, an expression "entities A and B are lined up in an X direction when viewed in a Y direction" indicates the following state. When the entities A and B are viewed in the Y direction, a linear line or a curved line indicating the X direction passes through both of the entities A and B. When the entities A and B are viewed in a direction different from the Y direction, the entities A and B may not be lined up in the X direction. When the entirety of an entity A is lined up with an entity B in a X direction when viewed in a Y direction, the entirety of the entity A opposes the entity B in the X direction when viewed in the Y direction. The term "entirety" may be replaced with a term "part".

In these two definitions, the entities A and B may be in contact with each other. The entities A and B may not be in contact with each other. An entity C may be provided between the entities A and B.

In the present teaching and the specification, an expression "an entity A is provided forward of an entity B" indicates the following state, unless otherwise specified. The entity A is provided in front of a plane which passes through the front-most end of the entity B and is orthogonal to the front-rear direction. In this connection, the entities A and B may or may not be lined up in the front-rear direction. When the entity B is a plane or a linear line orthogonal to the front-rear direction, a plane passing the front-most end of the entity B is a plane passing the entity B. When the entity B is a linear line or a plane with an infinite length in the front-rear direction, the front-most end of the entity B is not specified. A linear line or a plane with an infinite length in the front-rear direction is not limited to a linear line or a plane parallel to the front-rear direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a plane with an infinite length in the front-rear direction, an expression "an entity A is provided forward of the entity B" indicates the following state. Among two spaces partitioned by the entity B, the entity A exists in the front one of the spaces.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a linear line with an infinite length in the front-rear direction when viewed in a X direction different from the front-rear direction, an expression "an entity A is provided forward of the entity B when viewed in the X direction" indicates the following state. Among two areas partitioned by the entity B, the entity A exists in the front one of the areas when viewed in the X direction. The entity B may be a plane in three dimensions, as long as the entity B is a linear line when viewed in the X direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" when viewed in a given direction, in the same condition with regard to the entity B and the viewing direction.

In the present teaching and the specification, an expression "an entity A is provided in front of an entity B" indicates the following state, unless otherwise specified. At least part of a rear surface of the entity A opposes at least part of a front surface of the entity B in the front-rear direction. Furthermore, the frontmost end of the entity B is rearward of the front-most end of the entity A and the rearmost end of the entity B is forward of the rear-most end of the entity A. The rear surface of the entity A is a surface which is viewable when the entity A is viewed from the rear side. The rear surface of the entity A may be a single continuous surface or may be formed of plural non-continuous surfaces. The definition of the front surface of the entity B is similar to this.

The same applies to expressions "an entity A is provided behind an entity B", "an entity A is provided directly above or below an entity B", and "an entity A is provided to the right of or to the left of an entity B".

In the present teaching and the specification, an expression "an entity A is provided in front of an entity B when viewed in an X direction different from the front-rear direction" indicates the following state, unless otherwise specified. When viewed in the X direction, at least part of the rear end of the entity A opposes at least part of the front end of the entity B in the front-rear direction. Furthermore, the frontmost end of the entity B is rearward of the front-most end of the entity A and the rearmost end of the entity B is forward of the rear-most end of the entity A. When the entities A and B are viewed in a Y direction different from the X direction, at least part of the rear end of the entity A may not oppose at least part of the front end of the entity B in the front-rear direction.

The same applies to expressions "an entity A is provided behind an entity B", "an entity A is provided directly above or below an entity B", and "an entity A is provided to the right of or to the left of an entity B" when viewed in a given direction.

In the present teaching and the specification, an expression "an entity A is provided between entities B and C" indicates the following state, unless otherwise specified. A linear line passes through the entities B, A, and C in this order. In other words, the entities B, A, and C are lined up in this order in the direction of a linear line.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs. Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the preferred arrangements of the different aspects described above may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described modifications.

Advantageous Effects

With the communication seat-type vehicle of the present teaching, a pedestrian ahead in a traveling direction of the vehicle feels less oppressive while the comfortability of a cabin space is maintained.

BRIEF DESCRIPTION OF DRAWINGS

FIG. 15 is a side view which schematically shows a communication seat-type vehicle of another modification.

DESCRIPTION OF EMBODIMENTS

Figure 1:
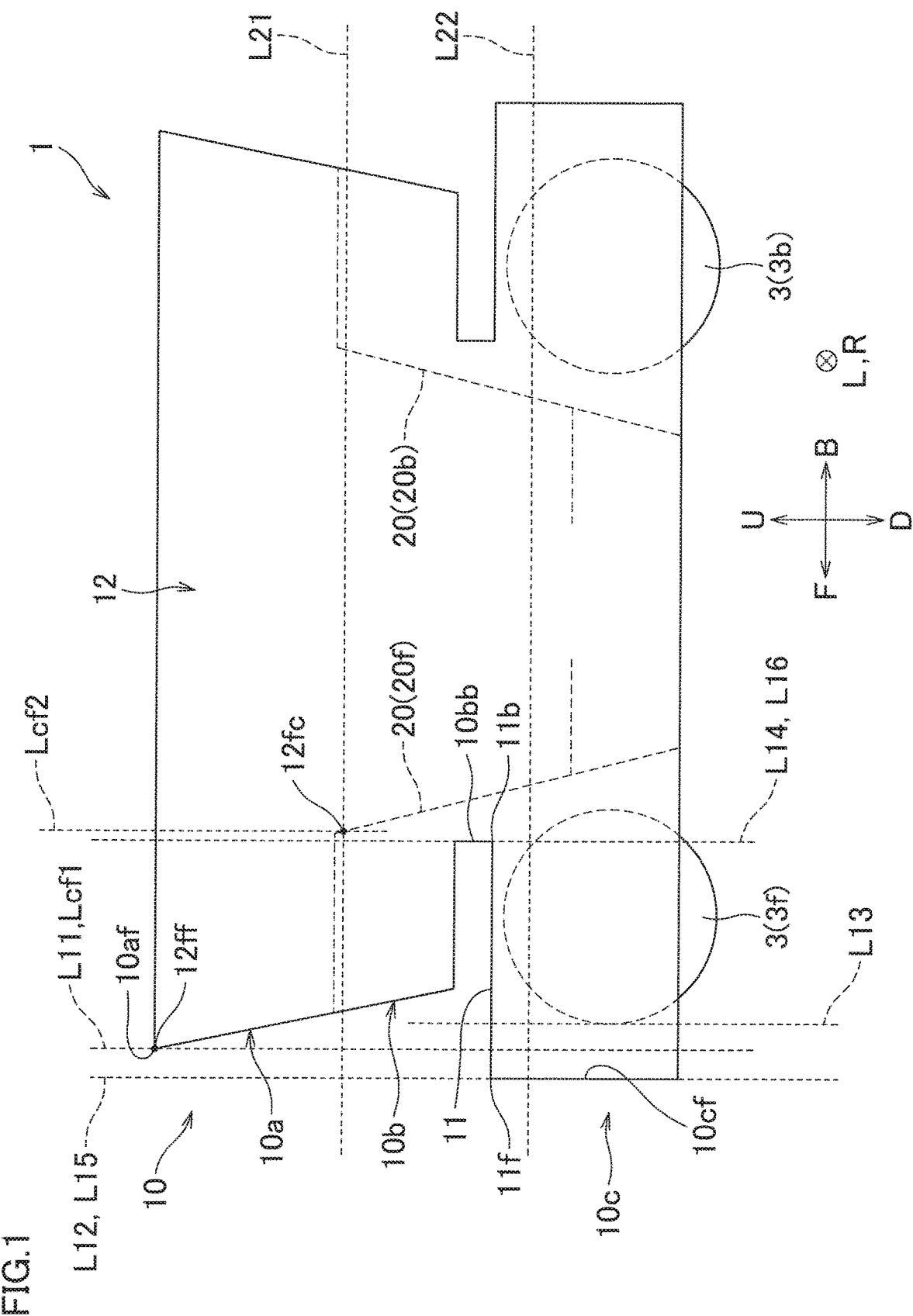
FIG. 1 is a side view which schematically shows a communication seat-type vehicle of the present teaching.

The following will describe an embodiment of the present teaching with reference to FIG. 1. In the following description of the embodiment of the present teaching, a front-rear direction, a left-right direction, and an up-down direction are a vehicle front-rear direction, a vehicle left-right direction, and a vehicle up-down direction, respectively. Furthermore, in each figure, arrows F, B, U, D, L, and R indicate forward, rearward, upward, downward, leftward, and rightward, respectively.

As shown in FIG. 1, a communication seat-type vehicle 1 includes a front wall 10, communication seats 20, and four wheels 3.

The front wall 10 constitutes a cabin space 12. The cabin space 12 is provided in the vehicle internal portion in which a passenger is accommodated. In other words, the cabin space 12 is a space in the vehicle internal portion in which a passenger is accommodated. The front wall 10 is provided at a vehicle front portion.

The communication seats 20 are arranged to allow passengers to be seated at locations where the passengers are able to talk face-to-face with one another. For example, the communication seats 20 are constituted by two rows of seat assemblies 20f and 20b which are provided so that seated passengers face each other. The communication seats 20 are arranged so that plural passengers can be seated. On the communication seats 20, one passenger or plural passengers may be seated. The communication seats 20 are provided in the vehicle internal portion. The communication seats 20 constitute the cabin space 12. The cabin space 12 is provided rearward of the front wall 10 and the communication seat 20 in the vehicle front-rear direction and is in the vehicle internal portion.

The four wheels 3 include two front wheels 3f and two rear wheels 3b. The two rear wheels 3b are provided rearward of the two front wheels 3f in the vehicle front-rear direction. The communication seat-type vehicle 1 runs as the four wheels 3 rotate. The communication seat-type vehicle 1 is able to run forward in the vehicle front-rear direction, as a traveling direction. The traveling direction is a direction in which the communication seat-type vehicle 1 in normal use runs due to the rotation of wheels 3. The traveling direction does not include a direction in which the communication seat-type vehicle 1 runs due to temporary reverse rotation of the wheels 3. The two front wheels 3f include a left front wheel which is at a vehicle left portion and a right front wheel which is at a vehicle right portion. The two rear wheels 3b include a left rear wheel which at the vehicle left portion and a right rear wheel which is at the vehicle right portion.

The front wall 10 is constituted by a front wall upper portion 10a, a front wall intermediate portion 10b, and a front wall lower portion 10c. The front wall upper portion 10a is part of the front wall 10 and is at a vehicle upper portion. The front wall intermediate portion 10b is part of the front wall 10 and is at a vehicle intermediate portion. The front wall lower portion 10c is part of the front wall 10 and is at a vehicle lower portion. The front wall 10 is arranged such that, in the vehicle front-rear direction, a front end 10af of the front wall upper portion 10a and a front end 10cf of the front wall lower portion 10c are positioned forward of a rear end 10bb of the front wall intermediate portion 10b. In FIG. 1, a plane which passes through the front end 10af of the front wall upper portion 10a and is parallel to the vehicle up-down direction is indicated by a linear line L11. A plane which passes through the front end 10cf of the front wall lower portion 10c and is parallel to the vehicle up-down direction is indicated by a linear line L12. A plane which passes through the rear end 10bb of the front wall intermediate portion 10b and is parallel to the vehicle up-down direction is indicated by a linear line L14. In other words, in the vehicle front-rear direction, the linear lines L11 and L12 are positioned forward of the linear line L14.

The front wall upper portion 10a of the communication seat-type vehicle 1 is included in the uppermost portion of the front wall 10 when the communication seat-type vehicle 1 is equally divided into three portions in the vehicle up-down direction. The front wall intermediate portion 10b of the communication seat-type vehicle 1 is included in the middle portion of the front wall 10 when the communication seat-type vehicle 1 is equally divided into three portions in the vehicle up-down direction. The front wall lower portion 10c of the communication seat-type vehicle 1 is included in the lowermost portion of the front wall 10 when the communication seat-type vehicle 1 is equally divided into three portions in the vehicle up-down direction. In FIG. 1, linear lines L21 and L22 are shown as linear lines equally dividing the communication seat-type vehicle 1 into three portions in the vehicle up-down direction. The linear lines L21 and L22 are linear lines which are orthogonal to the vehicle up-down direction and parallel to the vehicle front-rear direction. The linear line L21 is directly above the linear line L22 in the vehicle up-down direction. In the vehicle up-down direction, the front wall 10 of the communication seat-type vehicle 1 is divided into three portions, i.e., the front wall upper portion 10a, the front wall intermediate portion 10b, and the front wall lower portion 10c, by a plane passing the linear line L21 and a plane passing the linear line L22.

The front wall 10 of the communication seat-type vehicle 1 includes a front face-up surface 11. In the vehicle front-rear direction, a front end 11f of the front face-up surface 11 is provided at the same position as or rearward of the front end 10cf of the front wall lower portion 10c and is at the same position as or forward of the front ends of the two front wheels 3f. In the vehicle front-rear direction, a rear end 11b of the front face-up surface 11 is provided at the same position as or rearward of the front end 10af of the front wall upper portion 10a and is at the same position as or forward of the rear end 10bb of the front wall intermediate portion 10b. Furthermore, in the vehicle front-rear direction, the front face-up surface 11 is provided below the front wall upper portion 10a. In FIG. 1, in the vehicle front-rear direction, the front end 11f of the front face-up surface 11 is provided at the same position as the front end 10cf of the front wall lower portion 10c and is forward of the front ends of the two front wheels 3f. In the vehicle front-rear direction, the rear end 11b of the front face-up surface 11 is provided rearward of the front end 10af of the front wall upper portion 10a and is at the same position as the rear end 10bb of the front wall intermediate portion 10b. In FIG. 1, a plane which passes through the front ends of the two front wheels 3f and is parallel to the vehicle up-down direction is indicated by a linear line L13. A plane which passes through the front end 11f of the front face-up surface 11 of the front wall 10 and is parallel to the vehicle up-down direction is indicated by a linear line L15. A plane which passes through the rear end 11b of the front face-up surface 11 of the front wall 10 and is parallel to the vehicle up-down direction is indicated by a linear line L16. In short, in FIG. 1, the linear line L15 is at the same position as the linear line L12 and forward of the linear line L13 in the vehicle front-rear direction. The linear line L16 is rearward of the linear line L11 and at the same position as the linear line L14 in the vehicle front-rear direction.

The cabin space 12 is constituted by a cabin space upper portion, a cabin space intermediate portion, and a cabin space lower portion. In the vehicle front-rear direction, a front end 12*ff* of the cabin space upper portion is positioned forward of a front end 12*fc* of the cabin space intermediate portion. In FIG. 1, the front end 12*ff* of the cabin space upper portion is positioned at the front wall 10. The front end 12*fc* of the cabin space intermediate portion is positioned at the communication seat 20. In FIG. 1, a plane which passes through the front end 12*ff* of the cabin space upper portion of the cabin space 12 and is parallel to the vehicle up-down direction is indicated by a linear line Lcf1. A plane which passes through the front end 12*fc* of the cabin space intermediate portion of the cabin space 12 and is parallel to the vehicle up-down direction is indicated by a linear line Lcf2. In other words, in FIG. 1, the linear line Lcf1 is positioned forward of the linear line Lcf2. The cabin space upper portion of the cabin space 12 is included in the uppermost portion of the cabin space 12 when the communication seat-type vehicle 1 is equally divided into three portions in the vehicle up-down direction. The cabin space intermediate portion of the cabin space 12 is included in the middle portion of the cabin space 12 when the communication seat-type vehicle 1 is equally divided into three portions in the vehicle up-down direction. The cabin space lower portion of the cabin space 12 is included in the lowermost portion of the cabin space 12 when the communication seat-type vehicle 1 is equally divided into three portions in the vehicle up-down direction.

The following effects are obtained when the communication seat-type vehicle 1 of the present embodiment has the arrangement described above.

In the vehicle front-rear direction, the front wall 10 of the communication seat-type vehicle 1 is arranged such that the front end 10*af* of the front wall upper portion 10*a* is positioned rearward of the front end 10*cf* of the front wall lower portion 10*c* and forward of the rear end 10*bb* of the front wall intermediate portion 10*b*. With this arrangement, the length in the vehicle front-rear direction of the vehicle 1 is short at the height of the viewpoint of a pedestrian ahead in the traveling direction of the communication seat-type vehicle 1. As a result, the pedestrian ahead in the traveling direction of the vehicle feels less oppressed by the communication seat-type vehicle 1.

In addition to the above, in the vehicle front-rear direction, the front wall upper portion 10*a* and the front wall intermediate portion 10*b* of the front wall 10 of the vehicle 1 are positioned rearward of the front wall lower portion 10*c*, whereas the front end 12*ff* of the cabin space upper portion of the cabin space 12 is positioned forward of the front end 12*fc* of the cabin space intermediate portion of the cabin space 12. With this arrangement, in the vehicle front portion, the cabin space upper portion is larger than the cabin space intermediate portion. As a result, the cabin space upper portion which is at the height of the viewpoint of the passenger seated on the communication seat 20 is roomy. The comfortability of the cabin space 12 is therefore maintained.

In addition to the above, the front wall 10 of the vehicle 1 includes the front face-up surface 11. In the vehicle front-rear direction, the front end 11*f* of the front face-up surface 11 is provided at the same position as or rearward of the front end 10*cf* of the front wall lower portion 10*c* and is at the same position as or forward of the front ends of the two front wheels 3*f*. Furthermore, in the vehicle front-rear direction, the rear end 11*b* of the front face-up surface 11 is provided at the same position as or rearward of the front end 10*af* of the front wall upper portion 10*a* and is at the same position as or forward of the rear end 10*bb* of the front wall intermediate portion 10*b*. Furthermore, in the vehicle up-down direction, the front face-up surface 11 is provided below the front wall upper portion 10*a*. For these reasons, the front face-up surface 11 is provided at a position lower than the front wall upper portion 10*a* of the vehicle 1, and is long in the vehicle front-rear direction.

In summary, the front wall intermediate portion 10*b* of the vehicle 1 is provided rearward of the front wall upper portion 10*a* in the vehicle front-rear direction, and the front face-up surface 11 is formed at a position lower than the front wall upper portion 10*a* of the vehicle 1 to face upward and to be long in the vehicle front-rear direction. As a result, the pedestrian ahead in the traveling direction of the vehicle looks down the front face-up surface 11 formed at the front wall 10 of the vehicle 1. It is therefore possible to cause the pedestrian ahead in the traveling direction of the communication seat-type vehicle 1 to feel as if the front wall 10 at the height of the viewpoint of the pedestrian ahead in the traveling direction of the vehicle is positioned further behind. As a result, the oppressive feeling of the pedestrian ahead in the traveling direction of the vehicle, which is caused by the communication seat-type vehicle 1, is further suppressed.

In this way, with the communication seat-type vehicle 1 of the present teaching, the pedestrian ahead in the traveling direction of the vehicle feels less oppressive while the comfortability of the cabin space 12 is maintained.

Specific Example 1 of Embodiment

Specific Example 1 of the above-described embodiment of the present teaching will be described with reference to FIG. 2 to FIG. 7. It is noted that items identical with those in the embodiment of the present teaching having been described above are not explained again. Basically, Specific Example 1 of the embodiment of the present teaching encompasses all features of the embodiment of the present teaching described above.

Hereinafter, a front-rear direction is a vehicle front-rear direction unless otherwise specified. Forward in the vehicle front-rear direction is a traveling direction of a communication seat-type vehicle 101. Hereinafter, a vehicle left-right direction is a left-right direction of the vehicle. The vehicle left-right direction is a left-right direction when the traveling direction of the communication seat-type vehicle 101 is forward. The left-right direction is identical with a vehicle width direction of the communication seat-type vehicle 101. Hereinafter, a vehicle up-down direction is an up-down direction of the vehicle unless otherwise specified. The vehicle up-down direction is an up-down direction when the communication seat-type vehicle 101 vertically stands up on a horizontal road surface. In each figure, arrows F, B, U, D, L, and R indicate forward, rearward, upward, downward, leftward, and rightward, respectively.

Figure 2:
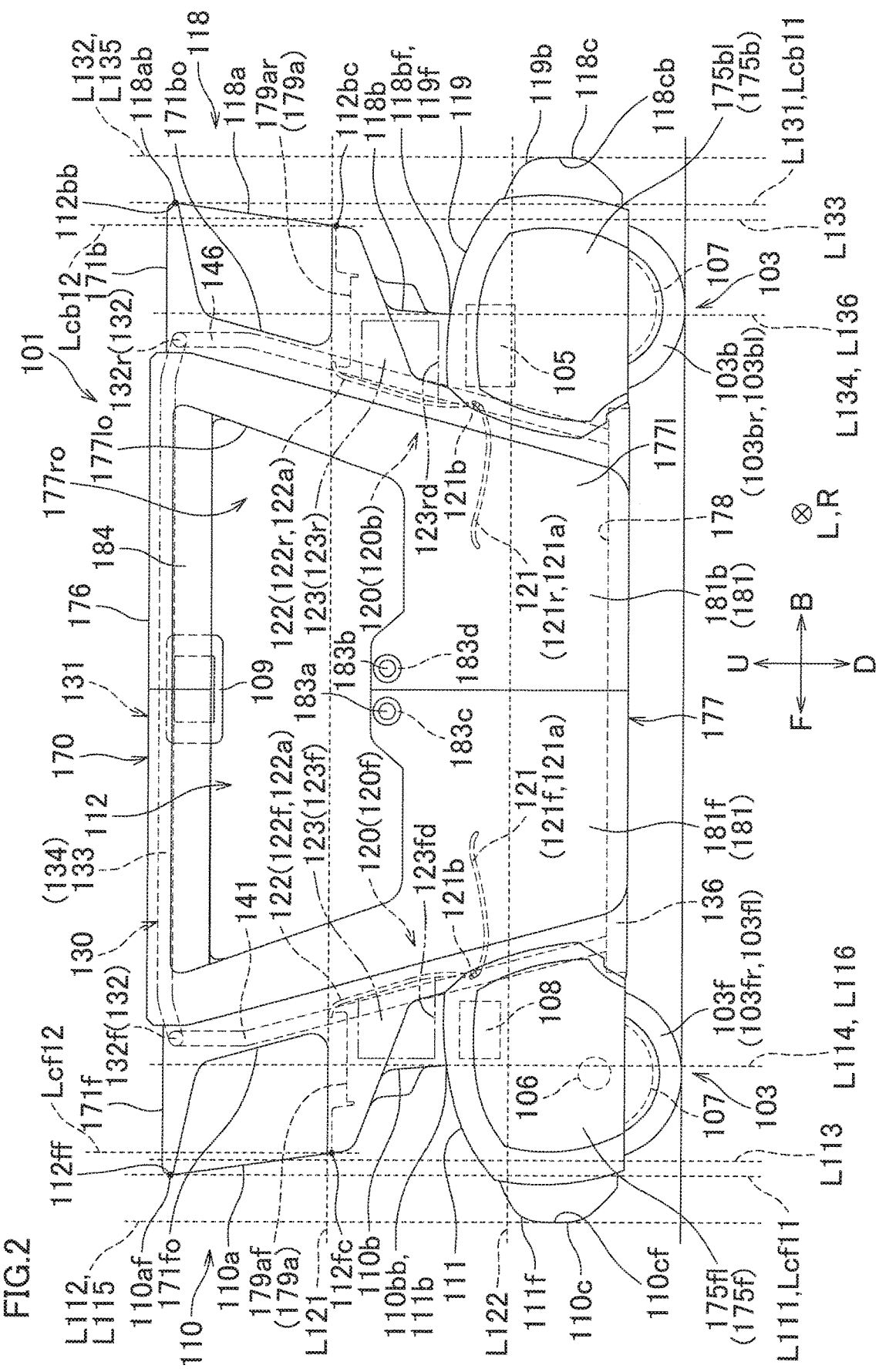
FIG. 2 is a side view of a communication seat-type vehicle of Specific Example 1.

As shown in FIG. 2, the communication seat-type vehicle 101 includes communication seats 120, four wheels 103, a driving source 105, a steering mechanism 106, a brake mechanism 107, an automatic driving controller 108, a front wall 110, a vehicle body frame 130, and a vehicle body cover 170.

The communication seats 120 are arranged to allow passengers to be seated at locations where the passengers are able to talk face-to-face with one another. The communication seats 120 include a front seat assembly 120*f* and a rear seat assembly 120*b* which are provided to allow seated passengers to face each other. The front seat assembly 120*f* and the rear seat assembly 120*b* are provided to be lined up in the vehicle front-rear direction. The front seat assembly 120f is provided forward of the rear seat assembly 120b in the vehicle front-rear direction. The front seat assembly 120f is a seat assembly on which a seated passenger faces in the vehicle rearward direction. The rear seat assembly 120b is a seat assembly on which a seated passenger faces in the vehicle forward direction. The communication seats 120 includes seats 121 and back rests 122. The communication seats 120 are arranged so that plural passengers can be seated. The front seat assembly 120f is arranged so that two or less passengers can be seated. The rear seat assembly 120b is arranged so that two or less passengers can be seated. To put it differently, the communication seats 120 are arranged so that four or less passengers can be seated. On the communication seats 120, one passenger or plural passengers may be seated.

The communication seats 120 include seat portions 121a on which passengers are seated. The seats 121 constitute the seat portions 121a in the vehicle internal portion. Each of the seats 121 is swingable between a seating state and a storage state relative to the back rest 122. The seats 121 includes a front seat 121f and a rear seat 121r. The front seat 121f is included in the front seat assembly 120f. The rear seat 121r is included in the rear seat assembly 120b. In the seating state shown in FIG. 2, the front seat 121f is inclined upward, downward, and then upward in the vehicle up-down direction, from the rear side to the front side in the vehicle front-rear direction. In the seating state shown in FIG. 2, the rear seat 121r is inclined upward, downward, and then upward in the vehicle up-down direction, from the front side to the rear side in the vehicle front-rear direction. This allows the passengers to be deeply seated on the seats 121, and hence the cabin space 112 is roomy for the passengers. The seating state is the state shown in FIG. 2, and is a state in which the seat portions 121a are formed by the seats 121 and passengers can be seated. In the seating state, the seats 121 are provided along the vehicle front-rear direction. In the storage state shown in FIG. 5, the seats 121 are provided along the vehicle up-down direction. The storage state of the seats 121 is the state shown in FIG. 5, and is a state in which the seat portions 121a are not formed by the seats 121 and the passengers cannot be seated. When each seat 121 is in the storage state, the seat 121 and the back rest 122 are arranged to face each other. When the seat 121 is in the storage state, the area of the seat 121 viewed in the vehicle up-down direction is small as compared to the seat 121 in the seating state. To be more specific, each seat 121 is arranged to be swingable relative to the back rest 122. A rotational shaft 121b which is the swing center of the seat 121 is fixed to the vehicle body frame 130. To be more specific, as shown in FIG. 6, the seat 121 is swingable in a direction indicated by an arrow, from the seating state to the storage state. The rotational shaft 121b of the seat 121 is, for example, made of an elastic member. With this arrangement, when the seat 121 in the seating state is manually lifted up by a predetermined angle, the seat 121 is switched to the storage state thanks to the elastic force of the elastic member.

Figure 5:
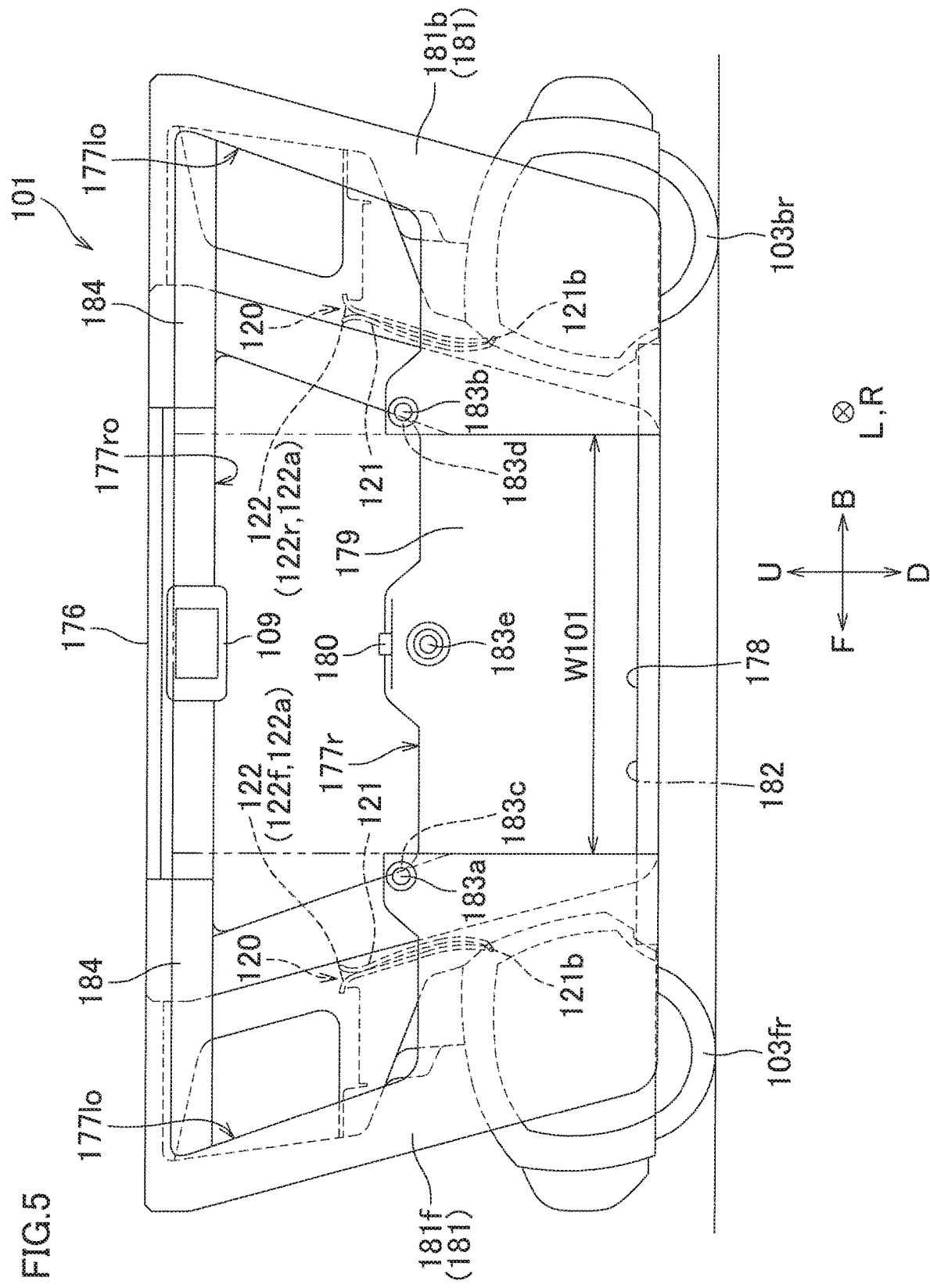
FIG. 5 is a side view of the communication seat-type vehicle of Specific Example 1.
Figure 6:
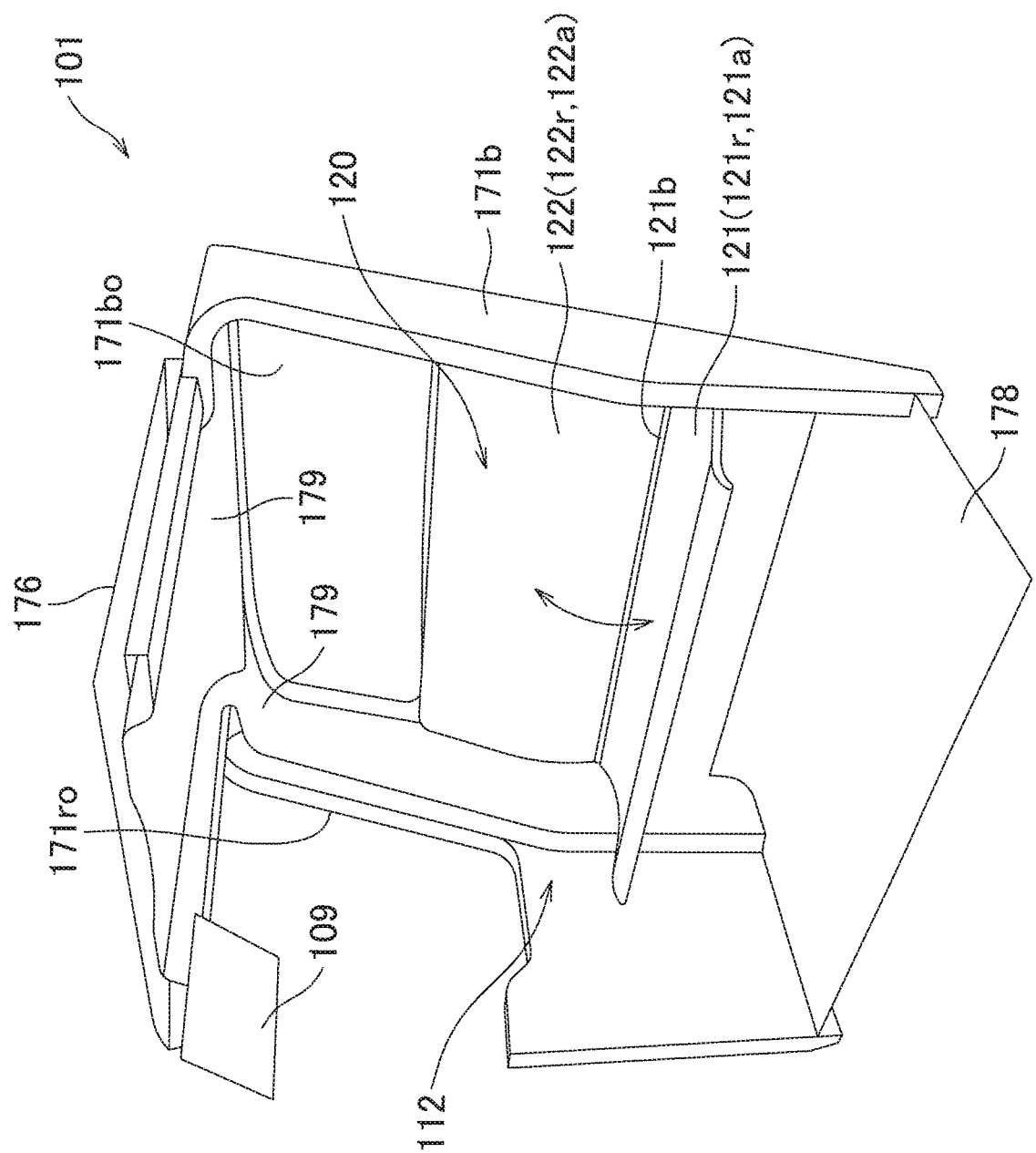
FIG. 6 is a partial sectional view of the communication seat-type vehicle of Specific Example 1.

As shown in FIG. 2 and FIG. 5, each communication seat 120 includes a back rest portion 122a which is used by a passenger to keep the posture. The back rests 122 form the back rest portions 122a in the vehicle internal portion. The back rests 122 are fixed to form the back rest portions 122a. The back rests 122 are provided along the vehicle up-down direction. The back rests 122 include a front back rest 122f and a rear back rest 122r. The front back rest 122f is included in the front seat assembly 120f. The rear back rest 122r is included in the rear seat assembly 120b. The front back rest 122f is titled upward in the vehicle up-down direction and forward in the vehicle front-rear direction. The rear back rest 122r is titled upward in the vehicle up-down direction and rearward in the vehicle front-rear direction. With this arrangement, the back rest 122 supports the backside of each passenger in a stretched state, and hence the cabin space 112 is roomy for the passengers. The backrests 122 are fixed to the vehicle body frame 130.

As shown in FIG. 2, the four wheels 103 include two front wheels 103f and two rear wheels 103b. The traveling direction is forward in the vehicle front-rear direction. The traveling direction is a direction in which the communication seat-type vehicle 101 in normal use runs due to the rotation of wheels 103. The traveling direction does not include a direction in which the communication seat-type vehicle 101 temporarily runs. By reverse rotation of the wheels 103, the traveling direction of the communication seat-type vehicle 101 can be changed to rearward in the vehicle front-rear direction. In other words, the communication seat-type vehicle 101 is a bi-directional vehicle. The two front wheels 103f include a left front wheel 103fl which is at the vehicle left portion and a right front wheel 103fr which is at the vehicle right portion. The two rear wheels 103b include a left rear wheel 103bl which is at the vehicle left portion and a right rear wheel 103br which is at the vehicle right portion.

The driving source 105 applies driving force to at least one of the four wheels 103. The communication seat-type vehicle 101 runs as the four wheels 103 rotate. The driving source 105 include a driving motor and a battery. The communication seat-type vehicle 101 is, for example, an electric car and the driving motor is an electric motor. The driving motor is connected to the battery. The battery supplies power for driving the communication seat-type vehicle 101 to the driving motor. The driving motor drives the two rear wheels 103b. The driving motor is able to rotate the rear wheels 103b in both directions. The driving source 105 is supported by the vehicle body frame 130. The driving source 105 is controlled based on a command output from the automatic driving controller 108.

The steering mechanism 106 steers at least one of the four wheels 103. As a result of the steering by the steering mechanism 106, the traveling direction of the communication seat-type vehicle 101 is changed in the vehicle left-right direction. The steering mechanism 106 steers the two front wheels 103f and the two rear wheels 103b. The steering mechanism 106 is arranged to steer the left front wheel 103fl and the right front wheel 103fr each at a predetermined steering angle relative to the vehicle front-rear direction. The left front wheel 103fl and the right front wheel 103fr are swung in the vehicle left-right direction by the steering mechanism 106. The steering mechanism 106 is arranged to steer the left rear wheel 103bl and the right rear wheel 103br each at a predetermined steering angle relative to the vehicle front-rear direction. The left rear wheel 103bl and the right rear wheel 103br are swung in the vehicle left-right direction by the steering mechanism 106. The traveling direction of the communication seat-type vehicle 101 is determined by the orientations of the two front wheels 103f and the two rear wheels 103b which are swung in the vehicle left-right direction. The steering mechanism 106 is supported by the vehicle body frame 130. The steering mechanism 106 is controlled based on a command output from the automatic driving controller 108.

The brake mechanism 107 is constituted by four disc brake devices. The four disc brake devices are provided for the four wheels 103, respectively. The four disc brake devices brake the four wheels 103, respectively. Each disc brake device includes a metal disc which rotates together with the wheel 103 and pads which are provided to the right of and to the left of the disc in the vehicle left-right direction. The disc brake device brakes the wheel 103 by sandwiching the disc by the pads from the left and right. The brake mechanism 107 is supported by the vehicle body frame 130. The brake mechanism 107 is controlled based on a command output from the automatic driving controller 108.

The automatic driving controller 108 is connected to the driving source 105, the steering mechanism 106, and the brake mechanism 107. The automatic driving controller 108 is supported by the vehicle body frame 130. The automatic driving controller 108 is arranged to be able to communicate with a control panel 109. The control panel 109 is provided in a cabin space 112. The cabin space 112 is a space in the vehicle internal portion, in which passengers are accommodated. The cabin space 112 is formed by the vehicle body cover 170. The control panel 109 is a computer. The control panel 109 may be attachable and detachable to and from an inner cover 179 in the vehicle internal portion. The automatic driving controller 108 is arranged to receive a drive signal, a brake signal, and a steering signal from the control panel 109. The drive signal is a signal for driving the communication seat-type vehicle 101 by the driving source 105. The brake signal is a signal for braking the communication seat-type vehicle 101 by the brake mechanism 107. The steering signal is a signal for steering the communication seat-type vehicle 101 by the steering mechanism 106. The drive signal may be a signal generated based on an acceleration instruction input through the control panel 109. The brake signal may be a signal generated based on a deceleration instruction input through the control panel 109. The drive signal and the brake signal may be signals generated based on a target speed input through the control panel 109. The steering signal may be a signal generated based on a rotational angle instruction which is input through the control panel 109. The automatic driving controller 108 outputs instructions based on the drive signal, the brake signal, and the steering signal to the driving source 105, the steering mechanism 106, and the brake mechanism 107.

Figure 3:
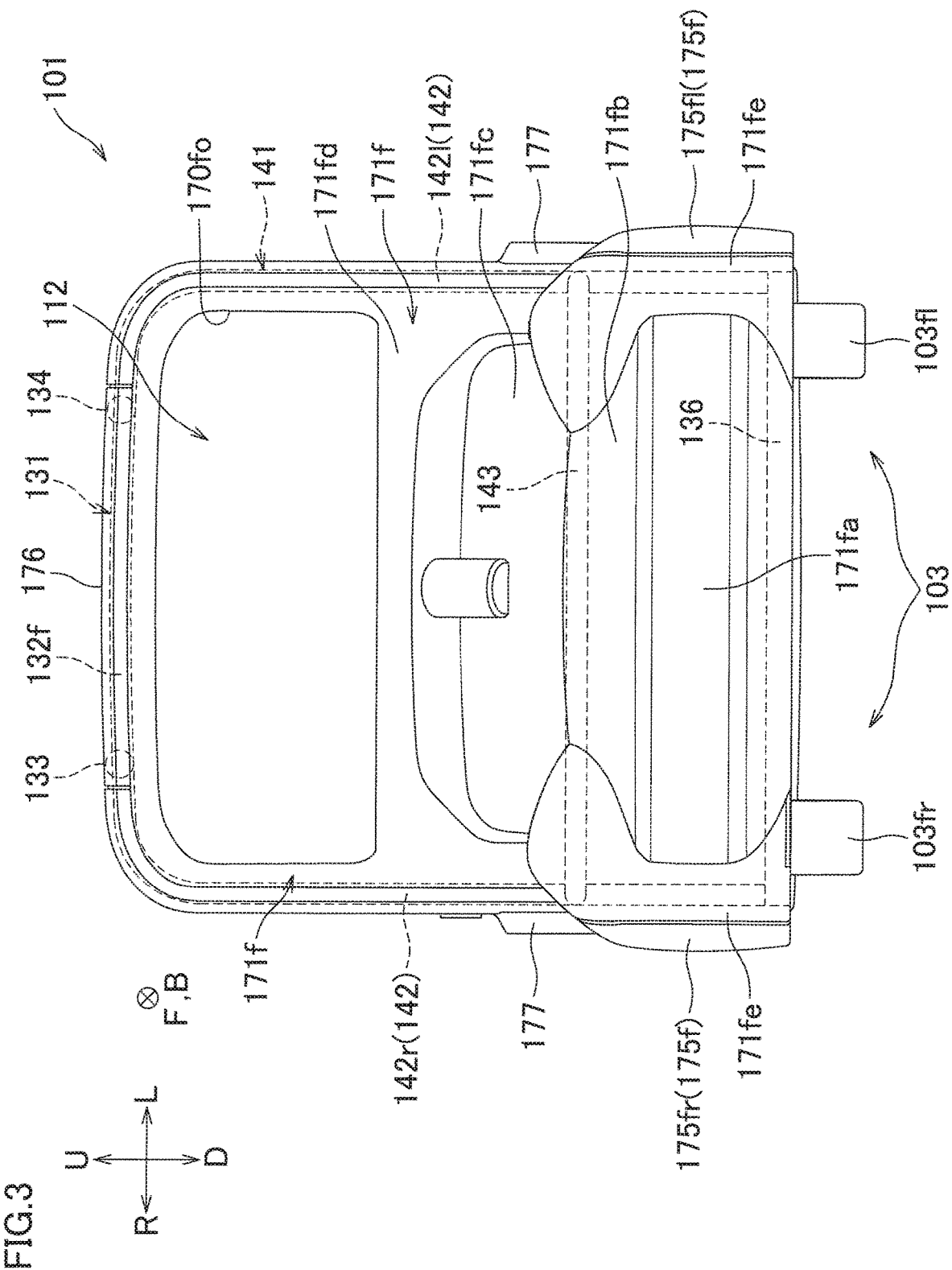
FIG. 3 is a front view of the communication seat-type vehicle of Specific Example 1.

As shown in FIG. 2 and FIG. 3, the vehicle body frame 130 includes a ceiling frame 131, a floor frame 136, a front H-shaped frame 141, and a rear H-shaped frame 146. The vehicle body frame 130 is, for example, made of metal. In the vehicle body frame 130, the shape of the front portion viewed rearward in the vehicle front-rear direction is identical with the shape of the rear portion viewed forward in the vehicle front-rear direction. Furthermore, the vehicle body frame 130 is formed to be plane symmetrical with respect to a plane which passes between the front end and the rear end of the vehicle body frame 130 in the vehicle front-rear direction and is perpendicular to the vehicle front-rear direction. In this specific example, the vehicle body frame 130 is formed to be plane symmetrical with respect to a plane which passes through the center in the vehicle front-rear direction of the vehicle body frame 130 and is perpendicular to the vehicle front-rear direction.

The ceiling frame 131 includes a ceiling right frame 133 and a ceiling left frame 134 which are lined up in the vehicle left-right direction and two ceiling crosswise frames 132 which are lined up in the vehicle front-rear direction. The two ceiling crosswise frames 132 include a ceiling front frame 132$f$ and a ceiling rear frame 132$r$. The ceiling front frame 132$f$ is provided forward of the ceiling rear frame 132$r$ in the vehicle front-rear direction. The ceiling front frame 132$f$ connects front end portions of the ceiling right frame 133 and the ceiling left frame 134 with each other. The ceiling rear frame 132$r$ connects rear end portions of the ceiling right frame 133 and the ceiling left frame 134 with each other. The front end portion and the rear end portion of the ceiling frame 131 are formed to be inclined downward. The front end portion of the ceiling frame 131 is connected to the front H-shaped frame 141. The rear end portion of the ceiling frame 131 is connected to the rear H-shaped frame 146.

The front H-shaped frame 141 includes two front pillars 142 lined up in the vehicle left-right direction and a front intermediate crosswise frame 143 having end portions in the vehicle left-right direction, which are connected to the two front pillars 142, respectively. The two front pillars 142 include a left front pillar 142$l$ and a right front pillar 142$r$. The left front pillar 142$l$ is provided leftward of the right front pillar 142$r$ in the vehicle left-right direction. Although not illustrated, being similar to the front H-shaped frame 141, the rear H-shaped frame 146 includes two rear pillars lined up in the vehicle left-right direction and a rear intermediate crosswise frame having end portions in the vehicle left-right direction, which are connected to the two rear pillars.

The floor frame 136 is rectangular in shape, in which the sides in the vehicle left-right direction are longer than the sides in the vehicle front-rear direction. The floor frame 136 is provided directly below the ceiling frame 131. The floor frame 136 is connected to lower end portions of the two front pillars 142 of the front H-shaped frame 141. The floor frame 136 is connected to lower end portions of the two rear pillars of the rear H-shaped frame 146.

Figure 4:
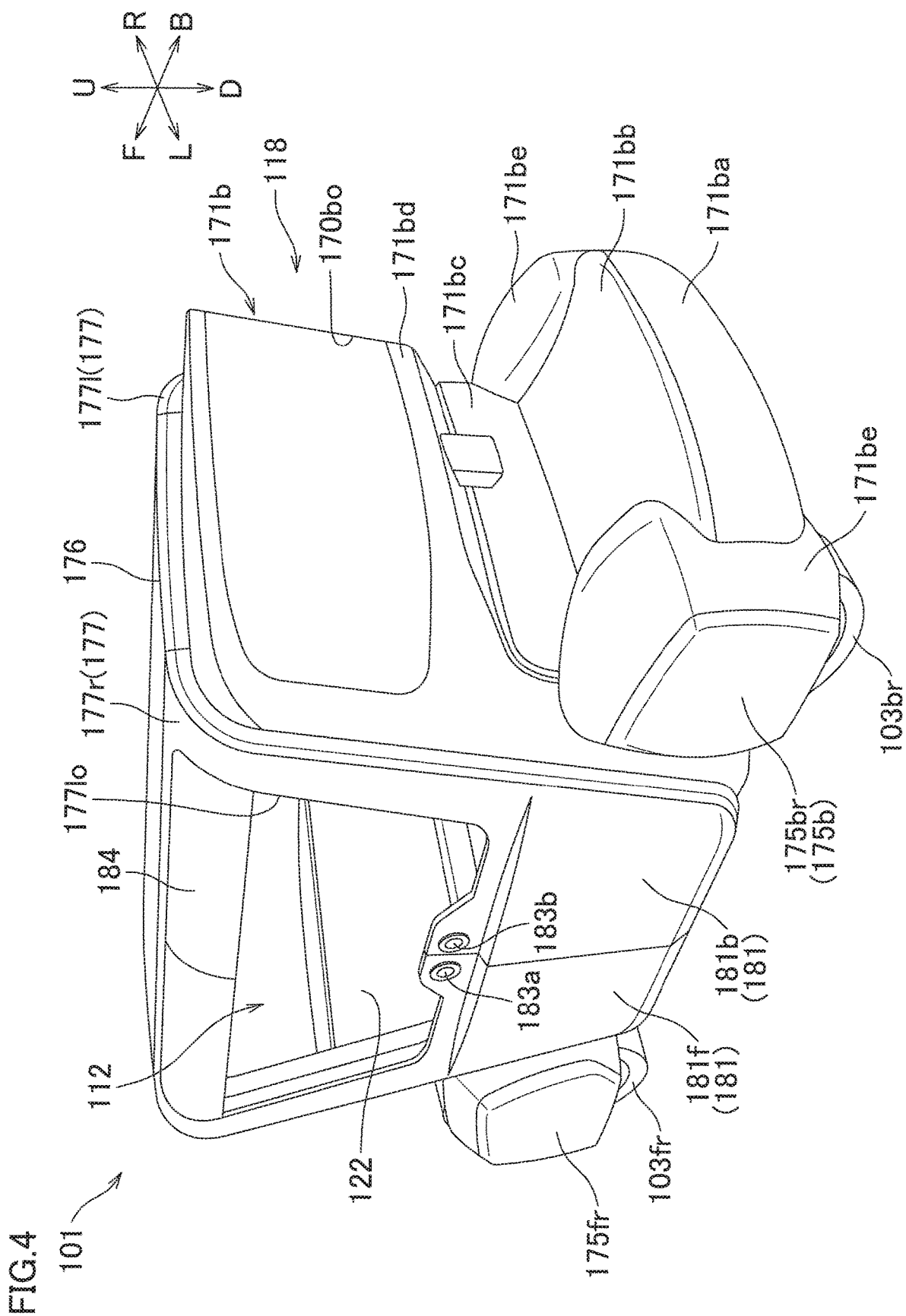
FIG. 4 is a perspective view of the communication seat-type vehicle of Specific Example 1.

As shown in FIG. 2 to FIG. 4, the vehicle body cover 170 includes a front cover 171$f$, a rear cover 171$b$, two front wheel side covers 175$f$, two rear wheel side covers 175$b$, a roof cover 176, side covers 177, a floor deck 178 which is a floor cover, and an inner cover 179. In the vehicle internal portion, the vehicle body cover 170 forms the cabin space 112 in which passengers are accommodated. Furthermore, the vehicle body cover 170 is formed to be plane symmetrical with respect to a plane which passes between a later-described front wall 110 and a later-described rear wall 118 in the vehicle front-rear direction and is perpendicular to the vehicle front-rear direction. In this specific example, the vehicle body cover 170 is formed to be plane symmetrical with respect to a plane which passes through the center in the vehicle front-rear direction of the vehicle body cover 170 and is perpendicular to the vehicle front-rear direction. The vehicle body cover 170 is, for example, made of synthetic resin. The vehicle body cover 170 is supported by the vehicle body frame 130. The vehicle body cover 170 covers the vehicle body frame 130. The vehicle body cover 170 covers an upper portion of the vehicle body frame 130 from the inside and outside of the vehicle. The vehicle body cover 170 covers a lower portion of the vehicle body frame 130 from the inside and outside of the vehicle. The front cover 171$f$ covers the front H-shaped frame 141 from the front and rear in the vehicle front-rear direction. The rear cover 171$b$ covers the rear H-shaped frame 146 from the front and rear in the vehicle front-rear direction. The front wheel side covers 175$f$ cover the outer surfaces of the two front wheels 103$f$ from the left and right in the vehicle left-right direction. The rear wheel side covers 175$b$ cover the outer surfaces of the two rear wheels 103$b$ from the left and right in the vehicle left-right direction. The roof cover 176 covers the ceiling frame 131 from above and below in the vehicle up-down direction. The floor deck 178 covers the upper surface of the floor frame 136 from above in the vehicle up-down direction. The side covers 177 include a right side cover 177r and a left side cover 177l. The shape of the communication seat-type vehicle 101 visually perceived by the passengers is plane symmetrical with respect to a plane which passes between the front wall 110 and the rear wall 118 in the vehicle front-rear direction and is perpendicular to the vehicle front-rear direction. In this specific example, the communication seat-type vehicle 101 is plane symmetrical with respect to a plane which passes through the center in the vehicle front-rear direction of the communication seat-type vehicle 101 and is perpendicular to the vehicle front-rear direction. The shape of the communication seat-type vehicle 101 perceived by the passengers is a combination of the outer shape of the communication seat-type vehicle 101 and the shape of the cabin space 112.

The vehicle body cover 170 includes an entrance 182 which is provided at a left portion, a right portion, or both of these portions of the vehicle body cover 170 in the vehicle left-right direction. In FIG. 2, the vehicle body cover 170 has the entrance 182 provided at the vehicle left portion.

As shown in FIG. 3, the front cover 171f is provided forward of the roof cover 176 and the side covers 177. The front cover 171f is partially provided above the two front wheels 103f. The front cover 171f includes a front cover lower portion 171fa, a front cover intermediate lower portion 171fb, a front cover intermediate portion 171fc, a front cover upper portion 171fd, and two front wheel front cover portions 171fe. The front cover lower portion 171fa, the front cover intermediate lower portion 171fb, the front cover intermediate portion 171fc, the front cover upper portion 171fd, and the two front wheel front cover portions 171fe may be partially or entirely formed in an integral manner, or may be formed individually.

The front cover lower portion 171fa is provided in front of the two front wheels 103f. The front cover lower portion 171fa is provided along the vehicle up-down direction. The front cover lower portion 171fa has left and right portions which are connected to the two front wheel front cover portions 171fe, respectively. The front cover lower portion 171fa is provided between the two front wheel front cover portions 171fe, along the vehicle left-right direction. The front cover lower portion 171fa is curved so that a central portion in the vehicle left-right direction is positioned forward of left and right end portions. The front cover lower portion 171fa is curved so that a central portion in the vehicle up-down direction is positioned forward of upper and lower end portions. The front end of the front cover lower portion 171fa protrudes forward as compared to the front ends of the two front wheel front cover portions 171fe.

The front cover intermediate lower portion 171fb is connected to the front cover lower portion 171fa and is provided directly above the front cover lower portion 171fa. The front cover intermediate lower portion 171fb is provided rearward of the front cover lower portion 171fa. The front cover intermediate lower portion 171fb is connected to the front cover intermediate portion 171fc and is provided directly below the front cover intermediate portion 171fc. The front cover intermediate portion 171fc is provided behind the front cover lower portion 171fa. The front cover intermediate lower portion 171fb is provided along the vehicle front-rear direction. The front cover intermediate lower portion 171fb is inclined upward from the front cover lower portion 171fa toward the front cover intermediate portion 171fc. The front cover intermediate lower portion 171fb has left and right portions which are connected to the two front wheel front cover portions 171fe, respectively.

The front cover intermediate portion 171fc is connected to the front cover intermediate lower portion 171fb and is provided directly above the front cover intermediate lower portion 171fb. The front cover intermediate portion 171fc is provided along the vehicle up-down direction.

The front cover upper portion 171fd is connected to the front cover intermediate portion 171fc and is provided above the front cover intermediate portion 171fc. The front cover upper portion 171fd is provided along the vehicle up-down direction. The front cover upper portion 171fd is provided forward of the front cover intermediate portion 171fc. The front cover upper portion 171fd has left and right portions which are connected to the two front wheel front cover portions 171fe, respectively. The front cover upper portion 171fd is curved so that a central portion in the vehicle left-right direction is positioned forward of left and right end portions. The front cover upper portion 171fd includes a front cover window 171fo. The front cover window 171fo is provided above the back rest 122 of the communication seat 120. The front cover window 171fo is positioned to be higher than the waist of a passenger seated on the communication seat 120. The front cover window 171fo is at least partially positioned at the height of the viewpoint of a passenger seated on the communication seat 120. The front cover window 171fo is arranged to allow a passenger seated on the communication seat 120 to see the external space outside the vehicle from the cabin space 112 in the vehicle internal portion. The front cover window 171fo may be an open window which allows the cabin space 112 to always communicate with the external space. The front cover window 171fo may be a window which is openable and closable and allows the cabin space 112 to communicate with the external space when opened. The front cover window 171fo may be a fixed window which cannot be opened. When the front cover window 171fo is either a window which is openable and closable or a fixed window, a transparent glass, synthetic resin, a vinyl sheet, etc. is fitted to the front cover window 171fo. When the front cover window 171fo is either a window which is always open or a window which is openable and closable, the comfortability of the cabin space 112 is improved because the outside air enters the cabin space 112. When the front cover window 171fo is either a window which is openable and closable or a fixed window, the comfortability of the cabin space 112 is improved because rain and wind do not enter the cabin space 112.

The two front wheel front cover portions 171fe are provided in front of the two front wheels 103f and partially cover front portions of the two front wheels 103f from the front. The two front wheel front cover portions 171fe are provided directly above the two front wheels 103f and partially cover front portions of the two front wheels 103f from above. The two front wheel front cover portions 171fe are curved along the two front wheels 103f. The two front wheel front cover portions 171fe are connected to the two front wheel side covers 175f, respectively.

As shown in FIG. 4, the rear cover 171b is provided rearward of the roof cover 176 and the side covers 177. The rear cover 171b is provided directly above the rear wheels 103b. The rear cover 171b includes a rear cover lower portion 171ba, a rear cover intermediate lower portion 171bb, a rear cover intermediate portion 171bc, a rear cover upper portion 171bd, and two rear wheel rear cover portions 171be. In the rear cover 171b, the rear cover lower portion 171ba, the rear cover intermediate lower portion 171bb, the rear cover intermediate portion 171bc, the rear cover upper portion 171bd, and the two rear wheel rear cover portions 171*be* may be partially or entirely formed in an integral manner, or may be formed individually.

The rear cover lower portion 171*ba* is provided behind the two rear wheels 103*b*. The rear cover lower portion 171*ba* is provided along the vehicle up-down direction. The rear cover lower portion 171*ba* has left and right portions which are connected to the two rear wheel rear cover portions 171*be*, respectively. The rear cover lower portion 171*ba* is provided between the two rear wheel rear cover portions 171*be*, along the vehicle left-right direction. The rear cover lower portion 171*ba* is curved so that a central portion in the vehicle left-right direction is positioned rearward of left and right end portions. The rear cover lower portion 171*ba* is curved so that a central portion in the vehicle up-down direction is positioned rearward of upper and lower end portions. The rear end of the rear cover lower portion 171*ba* protrudes rearward as compared to the rear ends of the two rear wheel rear cover portions 171*be*.

The rear cover intermediate lower portion 171*bb* is connected to the rear cover lower portion 171*ba* and is provided directly above the rear cover lower portion 171*ba*. The rear cover intermediate lower portion 171*bb* is provided at least partially rearward of the rear cover lower portion 171*ba*. The rear cover intermediate lower portion 171*bb* is connected to the rear cover intermediate portion 171*bc* and is provided directly below the rear cover intermediate portion 171*bc*. The rear cover intermediate portion 171*bc* is provided in front of the rear cover lower portion 171*ba*. The rear cover intermediate lower portion 171*bb* is provided along the vehicle front-rear direction. The rear cover intermediate lower portion 171*bb* is inclined upward from the rear cover lower portion 171*ba* toward the rear cover intermediate portion 171*bc*. The rear cover intermediate lower portion 171*bb* has left and right portions which are connected to the two rear wheel rear cover portions 171*be*, respectively.

The rear cover intermediate portion 171*bc* is connected to the rear cover intermediate lower portion 171*bb* and is provided directly above the rear cover intermediate lower portion 171*bb*. The rear cover intermediate portion 171*bc* is provided along the vehicle up-down direction.

The rear cover upper portion 171*bd* is connected to the rear cover intermediate portion 171*bc* and is provided above the rear cover intermediate portion 171*bc*. The rear cover upper portion 171*bd* is provided along the vehicle up-down direction. The rear cover upper portion 171*bd* is provided partially rearward of the rear cover intermediate portion 171*bc*. The rear cover upper portion 171*bd* has left and right portions which are connected to the two rear wheel rear cover portions 171*be*, respectively. The rear cover upper portion 171*bd* is curved so that a central portion in the vehicle left-right direction is positioned rearward of left and right end portions. The rear cover upper portion 171*bd* includes a rear cover window 171*bo*. The rear cover window 171*bo* is provided above the back rest 122 of the communication seat 120. The rear cover window 171*bo* is positioned to be higher than the waist of a passenger seated on the communication seat 120. The rear cover window 171*bo* is at least partially positioned at the height of the viewpoint of a passenger seated on the communication seat 120. The rear cover window 171*bo* is arranged to allow a passenger seated on the communication seat 120 to see the external space outside the vehicle from the cabin space 112 in the vehicle internal portion. The rear cover window 171*bo* may be an open window which allows the cabin space 112 to always communicate with the external space. The rear cover window 171*bo* may be a window which is openable and closable and allows the cabin space 112 to communicate with the external space when opened. The rear cover window 171*bo* may be a fixed window which cannot be opened. When the rear cover window 171*bo* is either a window which is openable and closable or a fixed window, a transparent glass, synthetic resin, a vinyl sheet, etc. is fitted to the rear cover window 171*bo*. When the rear cover window 171*bo* is either a window which is always open or a window which is openable and closable, the comfortability of the cabin space 112 is improved because the outside air enters the cabin space 112. When the rear cover window 171*bo* is either a window which is openable and closable or a fixed window, the comfortability of the cabin space 112 is improved because rain and wind do not enter the cabin space 112.

The two rear wheel rear cover portions 171*be* are provided directly above the two rear wheels 103*b* and partially cover the two rear wheels 103*b* from above. The two rear wheel rear cover portions 171*be* are curved along the two rear wheels 103*b*. The two rear wheel rear cover portions 171*be* are connected to the two rear wheel side covers 175*b*, respectively.

As shown in FIG. 2 and FIG. 3, the two front wheel side covers 175*f* include a right front wheel side cover 175*fr* and a left front wheel side cover 175*fl*. The two front wheel side covers 175*f* are provided to the left of and to the right of the two front wheels 103*f* in the vehicle left-right direction. The right front wheel side cover 175*fr* is provided to the right of the right front wheel 103*fr*. The left front wheel side cover 175*fl* is provided to the left of the left front wheel 103*fl*. The two front wheel side covers 175*f* partially cover the two front wheels 103*f* from the left and right. The two front wheel side covers 175*f* are curved along the two front wheels 103*f*.

The two rear wheel side covers 175*b* include a right rear wheel side cover 176*br* and a left rear wheel side cover 176*bl*. The two rear wheel side covers 175*b* are provided to the left of and to the right of the two rear wheels 103*b* in the vehicle left-right direction. The right rear wheel side cover 175*br* is provided to the right of the right rear wheel 103*br*. The left rear wheel side cover 175*bl* is provided to the to the left of the left rear wheel 103*bl*. The two rear wheel side covers 175*b* partially cover the two rear wheels 103*b* from the left and right. The two rear wheel side covers 175*b* are curved along the two rear wheels 103*b*.

As shown in FIG. 2 and FIG. 4, the roof cover 176 is connected to the front cover 171*f* and is provided behind the front cover 171*f*. The roof cover 176 is connected to the rear cover 171*b* and is provided in front of the rear cover 171*b*. The roof cover 176 is connected to the side covers 177 and is provided directly above the side covers 177. The roof cover 176 is formed to be substantially flat.

The side covers 177 are connected to the front cover 171*f* and are provided behind the front cover 171*f*. The side covers 177 are connected to the rear cover 171*b* and are provided in front of the rear cover 171*b*. The side covers 177 are connected to the roof cover 176 and are provided directly below the roof cover 176. The side covers 177 include a right side cover 177*r* and a left side cover 177*l*.

As shown in FIG. 5, the right side cover 177*r* has a right window 177*ro*. The right window 177*ro* is trapezoidal in shape, and the upper side is longer than the lower side. The right window 177*ro* is provided at an upper portion of the right side cover 177*r*. The right window 177*ro* is provided above the seat 121 of the communication seat 120. The right window 177*ro* is positioned to be higher than the waist of a passenger seated on the communication seat 120. The right window 177*ro* is positioned at the height of the viewpoint of a passenger seated on the communication seat 120. The right window 177ro is arranged to allow a passenger seated on the communication seat 120 to see the external space outside the vehicle from the cabin space 112 in the vehicle internal portion. The right window 177ro is an open window which allows the cabin space to always communicate with the external space. The communication seat-type vehicle 101 has an emergency button 180 at a central portion in the front-rear direction of a lower frame of the right window 177ro of the right side cover 177r. The emergency button 180 is more or less at the border between the cabin space 112 and the external space of the vehicle. The emergency button 180 is operated by being pressed down. The emergency button 180 may be pressed by a passenger in the cabin space 112 in the vehicle internal portion of the communication seat-type vehicle 101. Alternatively, the emergency button 180 may be pressed by a pedestrian, etc. who is in the external space of the communication seat-type vehicle 101 and inserts a hand through the right window 177ro. The communication seat-type vehicle 101 is stopped when the emergency button 180 is pressed.

The left side cover 177l includes a left window 177lo and a door 181. The communication seat-type vehicle 101 of Specific Example 1 is assumed to run in a left portion in the vehicle left-right direction of the road. The left window 177lo is provided at an upper portion of the left side cover 177l. When the door 181 is in a closed state (see FIG. 2), the left window 177lo is trapezoidal in shape, and the upper side is longer than the lower side. The left window 177lo is provided above a seat member 121 of the communication seat 120. The left window 177lo is at least partially positioned to be higher than the height of the waist of a passenger seated on the communication seat 120. The left window 177lo is at least partially positioned at the height of the viewpoint of a passenger seated on the communication seat 120. The left window 177lo is arranged to allow a passenger seated on the communication seat 120 to see the external space outside the vehicle from the cabin space 112 in the vehicle internal portion. The left window 177lo is an open window which allows the cabin space to always communicate with the external space.

The door 181 is provided at a lower central portion in the vehicle left-right direction of the left side cover 177l. The door 181 includes a front door 181f and a rear door 181b. The front door 181f is provided forward of the center in the vehicle front-rear direction of the communication seat-type vehicle 101. The rear door 181b is provided rearward of the center in the vehicle front-rear direction of the communication seat-type vehicle 101. The front door 181f and the rear door 181b form a sliding door. The front door 181f and the rear door 181b are arranged to be slid in the vehicle front-rear direction so as to open or close the entrance 182. The entrance 182 is a region indicated by two-dot chain lines in FIG. 5. The front door 181f and the rear door 181b are arranged so that, in a closed state, the rear end of the front door 181f is in contact with the front end of the rear door 181b (see FIG. 2). The front door 181f and the rear door 181b are arranged so that, in an open state (see FIG. 5), a passenger is allowed to get in or out from the cabin space 112 through the entrance 182. When the closed state is switched to the open state, the front door 181f is slid forward. When the open state is switched to the closed state, the front door 181f is slid rearward. When the closed state is switched to the open state, the rear door 181b is slid rearward. When the open state is switched to the closed state, the rear door 181b is slid forward.

In the communication seat-type vehicle 101, four open buttons 183a, 183b, 183c, and 183d are provided on a vehicle outer surface. The open buttons 183a and 183b are provided on a vehicle outer surface. The open buttons 183c and 183d are provided on a vehicle inner surface. The vehicle outer surface is a surface exposed to the external space of the vehicle among surfaces constituting the communication seat-type vehicle 101. The vehicle inner surface is a surface opposing the cabin space 112 in the vehicle internal portion, among the surfaces constituting the communication seat-type vehicle 101. The open buttons 183a and 183d are provided on the outer surface of the door 181. The open buttons 183c and 183d face the cabin space 112. The outside surface of the door 181 is a surface exposed to the external space of the vehicle, among surfaces constituting the door 181. The open buttons 183c and 183d are provided on the inner surface of the door 181. The inner surface of the door 181 is a surface opposing the cabin space 112 in the vehicle internal portion, among the surfaces constituting the door 181. The open buttons 183a and 183c are provided on the front door 181f. The open buttons 183b and 183d are provided on the rear door 181b. The open button 183a and the open button 183c are provided for general passengers. When one of the open button 183a and the open button 183c is pressed, the front door 181f and the rear door 181b are switched to the open state. The open button 183b and the open button 183d are provided for special passengers. When one of the open button 183b and the open button 183d is pressed, the front door 181f and the rear door 181b are switched to the open state and the vehicle height of the communication seat-type vehicle 101 is lowered. To be more specific, when the vehicle height of the communication seat-type vehicle 101 is lowered, at least the vehicle body frame 130 and the vehicle body cover 170 are lowered in height. Alternatively, the open button 183a and the open button 183c are buttons for special passengers whereas the open button 183b and the open button 183d are buttons for general passengers. The communication seat-type vehicle 101 has a single close button 183e which is provided on the vehicle inner surface. The close button 183e is provided on a later-described inner cover 179 which is provided directly below the right window 170ro. The close button 183e faces the cabin space 112. As the close button 183e is pressed, the front door 181f and the rear door 181b are switched to the closed state. When the vehicle height of the communication seat-type vehicle 101 is lower than the height in the running at the time of the pressing of the close button 183e, the front door 181f and the rear door 181b are switched to the closed state and the vehicle height of the communication seat-type vehicle 101 is changed to the height in the running, in response to the pressing of the close button 183e. The open buttons 183a and 183b provided on the outer surfaces of the front door 181f and the rear door 181b may be pressed by a pedestrian, etc. in the external space of the communication seat-type vehicle 101. The open buttons 183c and 183d on the inner surfaces of the front door 181f and the rear door 181b and the close button 183e on the inner cover 179 may be pressed by a passenger inside the cabin space 112. When a human, etc. is no longer detected by a sensor or when a predetermined time elapses after one of the open buttons 183c and 183d provided on the inner surfaces of the front door 181f and the rear door 181b is pressed, the front door 181f and the rear door 181b are automatically switched to the closed state.

As shown in FIG. 2 and FIG. 4, the communication seat-type vehicle 101 includes visors 184. The visors 184 are provided at the upper edges of the left window 177lo and the right window 177ro on the vehicle outer surface. Alternatively, the visors 184 may be provided at positions directly above the left window 177lo and the right window 177ro on the vehicle outer surface.

As shown in FIG. 5 and FIG. 6, the floor deck 178 is provided below the roof cover 176. The floor deck 178 constitute a floor portion in the vehicle internal portion. A foot of a passenger, a wheelchair, and a luggage are placed on the floor deck 178.

The inner cover 179 is provided below the roof cover 176. The inner cover 179 constitutes a wall portion in the vehicle internal portion. The inner cover 179 is provided above the floor deck 178 and is connected to the floor deck 178. The control panel 109 is provided on the inner cover 179 and directly above the right window 170ro. The inner cover 179 is provided with two trays (luggage decks) 179a. The two luggage decks 179a include a front luggage deck 179af and a rear luggage deck 179ar. The front luggage deck 179af is provided above the front seat 121f. The front luggage deck 179af is provided forward of the front back rest 122f and rearward of the front cover window 171fo. The rear luggage deck 179ar is provided above the rear seat 121r. The rear luggage deck 179ar is provided rearward of the rear back rest 122r and forward of the rear cover window 171bo. The front luggage deck 179af is a front luggage deck in which a front storage space is formed above the top surface. The rear luggage deck 179ar is a rear luggage deck in which a rear storage space is formed above the top surface. The front storage space and the rear storage space are spaces in the vehicle internal portion. A luggage of a passenger, etc. can be placed on the two luggage decks 179a.

In the vehicle internal portion, the vehicle body cover 170 constitutes the cabin space 112 in which passengers are accommodated. The vehicle body cover 170 includes the front wall 110 and the rear wall 118 which will be described below. In the vehicle internal portion, moreover, the door 181 and the communication seats 120 constitute the cabin space 112 in which passengers are accommodated. To be more specific, the cabin space 112 is constituted in the vehicle internal portion by the vehicle body cover 170 and the door 181. In the vehicle internal portion, the cabin space 112 includes a space which is rearward of the front back rest 122f of the communication seat 120 and forward of the rear back rest 122r of the communication seat 120. In the vehicle internal portion, the cabin space 112 includes a space above the two luggage decks 179a.

The front wall 110 of the communication seat-type vehicle 101 is a front surface of an outer wall which is at a front end portion of the communication seat-type vehicle 101 in the vehicle front-rear direction. The rear wall 118 of the communication seat-type vehicle 101 is a rear surface of an outer wall which is at a rear end portion of the communication seat-type vehicle 101 in the vehicle front-rear direction. The front wall 110 and the rear wall 118 of the communication seat-type vehicle 101 are shaped to be plane symmetrical with respect to a plane which passes between the front wall 110 and the rear wall 118 in the vehicle front-rear direction and is perpendicular to the vehicle front-rear direction. The front end portion of the vehicle body cover 170 constitutes the front wall 110 of the communication seat-type vehicle 101. The rear end portion of the vehicle body cover 170 constitutes the rear wall 118 of the communication seat-type vehicle 101.

As shown in FIG. 2, the front wall 110 of the communication seat-type vehicle 101 is made up of a front wall upper portion 110a, a front wall intermediate portion 110b, and a front wall lower portion 110c. The front wall 110 is arranged such that, in the vehicle front-rear direction, a front end 110af of the front wall upper portion 110a is positioned rearward of a front end 110cf of the front wall lower portion 110c and forward of a rear end 110bb of the front wall intermediate portion 110b. In FIG. 2, a plane which passes through the front end 110af of the front wall upper portion 110a and is parallel to the vehicle up-down direction is indicated by a linear line L111. A plane which passes through the front end 110cf of the front wall lower portion 110c and is parallel to the vehicle up-down direction is indicated by a linear line L112. A plane which passes through the rear end 110bb of the front wall intermediate portion 110b and is parallel to the vehicle up-down direction is indicated by a linear line L114. Therefore the linear line L111 is positioned rearward of the linear line L112 and forward of the linear line L114 in vehicle front-rear direction.

In the vehicle front-rear direction, the rear end 110bb of the front wall intermediate portion 110b is positioned rearward of the front ends of the two front wheels 103f. In FIG. 2, a plane which passes through the front ends of the two front wheels 103f and is parallel to the vehicle up-down direction is indicated by a linear line L113. Therefore the linear line L114 is positioned rearward of the linear line L113 in the vehicle front-rear direction. In FIG. 2, in the vehicle front-rear direction, the front end 110af of the front wall upper portion 110a is positioned forward of the front ends of the two front wheels 103f. Therefore the linear line L111 is positioned forward of the linear line L113 in the vehicle front-rear direction. In the vehicle front-rear direction, the front end 110af of the front wall upper portion 110a may be at the same position as the front ends of the two front wheels 103f or positioned rearward of the front ends of the two front wheels 103f. In other words, in the vehicle front-rear direction, the linear line L111 may be at the same position as the linear line L113 or positioned rearward of the linear line L113.

The front wall upper portion 110a of the front wall 110 of the communication seat-type vehicle 101 is included in the uppermost portion of the front wall 110 when the communication seat-type vehicle 101 is equally divided into three portions in the vehicle up-down direction. The front wall intermediate portion 110b of the front wall 110 of the communication seat-type vehicle 101 is included in the middle portion of the front wall 110 when the communication seat-type vehicle 101 is equally divided into three portions in the vehicle up-down direction. The front wall lower portion 110c of the front wall 110 of the communication seat-type vehicle 101 is included in the lowermost portion of the front wall 110 when the communication seat-type vehicle 101 is equally divided into three portions in the vehicle up-down direction. In FIG. 2, linear lines L121 and L122 are shown as linear lines equally dividing the communication seat-type vehicle 101 into three portions in the vehicle up-down direction. The linear lines L121 and L122 are linear lines which are orthogonal to the vehicle up-down direction and parallel to the vehicle front-rear direction. The linear line L121 is directly above the linear line L122 in the vehicle up-down direction. In the vehicle up-down direction, the front wall 110 of the communication seat-type vehicle 101 is divided into three portions, i.e., the front wall upper portion 110a, the front wall intermediate portion 110b, and the front wall lower portion 110c, by a plane passing the linear line L121 and a plane passing the linear line L122.

The front wall 110 of the communication seat-type vehicle 101 includes a front face-up surface 111. The front face-up surface 111 of the front wall 110 is an outer wall surface formed along the vehicle front-rear direction. The front cover 171f and the two front wheel side covers 175f constitute the front face-up surface 111 of the front wall 110.

In the vehicle front-rear direction, the front end 111f of the front face-up surface 111 is provided at the same position as or rearward of the front end 110cf of the front wall lower portion 110c and is at the same position as or forward of the front ends of the two front wheels 103f. In the vehicle front-rear direction, a rear end 111b of the front face-up surface 111 is provided at the same position as or rearward of the front end 110af of the front wall upper portion 110a and is at the same position as or forward of the rear end 110bb of the front wall intermediate portion 110b. In FIG. 2, in the vehicle front-rear direction, the front end 111f of the front face-up surface 111 is provided at the same position as the front end 110cf of the front wall lower portion 110c and is forward of the front ends of the two front wheels 103f. In the vehicle front-rear direction, the rear end 111b of the front face-up surface 111 is provided rearward of the front end 110af of the front wall upper portion 110a and is at the same position as the rear end 110bb of the front wall intermediate portion 110b. In the vehicle front-rear direction, the front end 111f of the front face-up surface 111 is positioned forward of the front end 110af of the front wall upper portion 110a. Furthermore, in the vehicle up-down direction, the front face-up surface 111 is provided below the front wall upper portion 110a. In FIG. 2, a plane which passes through the front end 111f of the front face-up surface 111 of the front wall 110 and is parallel to the vehicle up-down direction is indicated by a linear line L115. A plane which passes through the rear end 111b of the front face-up surface 111 of the front wall 110 and is parallel to the vehicle up-down direction is indicated by a linear line L116. In short, in FIG. 2, the linear line L115 is at the same position as the linear line L112 and forward of the linear line L113 in the vehicle front-rear direction. The linear line L116 is rearward of the linear line L111 and at the same position as the linear line L114 in the vehicle front-rear direction. The linear line L115 is positioned forward of the linear line L111 in the vehicle front-rear direction.

The cabin space 112 is arranged such that, in the vehicle front-rear direction, a front end 112ff of the cabin space upper portion is positioned forward of a front end 112fc of the cabin space intermediate portion. In FIG. 2, the front end 112ff of the cabin space upper portion is positioned at the front cover 171a. The front end 112fc of the cabin space intermediate portion is positioned at the front luggage deck 179af. A plane which passes through the front end 112ff of the of the cabin space upper portion and is parallel to the vehicle up-down direction is indicated by a linear line Lcf11. A plane which passes through the front end 112fc of the of the cabin space intermediate portion and is parallel to the vehicle up-down direction is indicated by a linear line Lcf12. In short, in FIG. 2, the linear line Lcf11 is positioned forward of the linear line Lcf12 in the vehicle front-rear direction. The cabin space upper portion is included in the uppermost portion of the cabin space 112 when the communication seat-type vehicle 101 is equally divided into three portions in the vehicle up-down direction. The cabin space intermediate portion is included in the middle portion of the cabin space 112 when the communication seat-type vehicle 101 is equally divided into three portions in the vehicle up-down direction. FIG. 2 schematically shows that, in the vehicle front-rear direction, the front end 112ff of the cabin space upper portion is at the same position as the front end 110af of the front wall upper portion 110a. In reality, in the vehicle front-rear direction, the front end 112ff of the cabin space upper portion is positioned rearward of the front end 110af of the front wall upper portion 110a by the thickness of the front cover 171f.

The rear wall 118 of the communication seat-type vehicle 101 is constituted by a rear wall upper portion 118a, a rear wall intermediate portion 118b, and a rear wall lower portion 118c. The rear wall 118 is arranged such that, in the vehicle front-rear direction, a rear end 118ab of the rear wall upper portion 118a is forward of a rear end 118cb of the rear wall lower portion 118c and rearward of a front end 118bf of the rear wall intermediate portion 118b. In FIG. 2, a plane which passes through the front end 118ab of the rear wall upper portion 118a and is parallel to the vehicle up-down direction is indicated by a linear line L131. A plane which passes through the front end 118cb of the rear wall lower portion 118c and is parallel to the vehicle up-down direction is indicated by a linear line L132. A plane which passes through the rear end 118bf of the rear wall intermediate portion 118b and is parallel to the vehicle up-down direction is indicated by a linear line L134. Therefore the linear line L131 is positioned forward of the linear line L132 and rearward of the linear line L134 in the vehicle front-rear direction.

The front end 118bf of the rear wall intermediate portion 118b is positioned forward of the rear ends of the two rear wheels 103b. In FIG. 2, a plane which passes through the front ends of the two rear wheels 103b and is parallel to the vehicle up-down direction is indicated by a linear line L133. Therefore the linear line L134 is positioned forward of the linear line L133 in the vehicle front-rear direction. In FIG. 2, the rear end 118ab of the rear wall upper portion 118a is positioned rearward of the rear ends of the two rear wheels 103b. Therefore the linear line L131 is positioned rearward of the linear line L133 in the vehicle front-rear direction. In the vehicle front-rear direction, the rear end 118ab of the rear wall upper portion 118a may be at the same position as the rear ends of the two rear wheels 103b or positioned forward of the rear ends of the two rear wheel 103b. In other words, in the vehicle front-rear direction, the linear line L131 may be at the same position as the linear line L133 or positioned forward of the linear line L133.

The rear wall upper portion 118a of the communication seat-type vehicle 101 is included in the uppermost portion of the rear wall 118 when the communication seat-type vehicle 101 is equally divided into three portions in the vehicle up-down direction. The rear wall intermediate portion 118b of the communication seat-type vehicle 101 is included in the middle portion of the rear wall 118 when the communication seat-type vehicle 101 is equally divided into three portions in the vehicle up-down direction. The rear wall lower portion 118c of the communication seat-type vehicle 101 is included in the lowermost portion of the rear wall 118 when the communication seat-type vehicle 101 is equally divided into three portions in the vehicle up-down direction. In FIG. 2, linear lines L121 and L122 are shown as linear lines equally dividing the communication seat-type vehicle 101 into three portions in the vehicle up-down direction. In the vehicle up-down direction, the rear wall 118 of the communication seat-type vehicle 101 is divided into three portions, i.e., the vehicle upper portion 118a, the vehicle intermediate portion 118b, and the vehicle lower portion 118c, by a plane passing the linear line L121 and a plane passing the linear line L122.

The rear wall 118 of the communication seat-type vehicle 101 includes a rear face-up surface 119. The rear face-up surface 119 of the rear wall 118 is an outer wall surface formed along the vehicle front-rear direction. The rear cover 171*b* and the two rear wheel side covers 175*b* constitute the rear face-up surface 119 of the rear wall 118.

In the vehicle front-rear direction, the rear end 119*b* of the rear face-up surface 119 is provided at the same position as or forward of the rear end 118*cb* of the rear wall lower portion 118*c* and is at the same position as or rearward of the rear ends of the two rear wheels 103*b*. In the vehicle front-rear direction, the front end 119*f* of the rear face-up surface 119 is provided at the same position as or forward of the rear end 118*ab* of the rear wall upper portion 118*a* and is at the same position as or rearward of the front end 118*bf* of the rear wall intermediate portion 118*b*. In FIG. 2, in the vehicle front-rear direction, the rear end 119*b* of the rear face-up surface 119 is provided at the same position as the rear end 118*cb* of the rear wall lower portion 118*c* and is rearward of the rear ends of the two rear wheels 103*b*. In the vehicle front-rear direction, the front end 119*f* of the rear face-up surface 119 is provided forward of the rear end 118*ab* of the rear wall upper portion 118*a* and is at the same position as the front end 118*bf* of the rear wall intermediate portion 118*b*. In the vehicle front-rear direction, the rear end 119*b* of the rear face-up surface 119 is positioned forward of the rear end 118*ab* of the rear wall upper portion 118*a*. In the vehicle up-down direction, the rear face-up surface 119 is provided below the vehicle upper portion 118*a* of the rear wall 118. In FIG. 2, a plane which passes through the rear end 119*b* of the rear face-up surface 119 of the rear wall 118 and is parallel to the vehicle up-down direction is indicated by a linear line L135. A plane which passes through the front end 119*f* of the rear face-up surface 119 of the rear wall 110 and is parallel to the vehicle up-down direction is indicated by a linear line L136. In short, in FIG. 2, the linear line L135 is at the same position as the linear line L132 and rearward of the linear line L133 in the vehicle front-rear direction. The linear line L136 is forward of the linear line L131 and at the same position as the linear line L134 in the vehicle front-rear direction. The linear line L135 is positioned rearward of the linear line L131 in the vehicle front-rear direction.

The cabin space 112 is arranged such that, in the vehicle front-rear direction, a rear end 112*bb* of the cabin space upper portion is positioned rearward of a rear end 112*bc* of the cabin space intermediate portion. In FIG. 2, the rear end 112*bb* of the cabin space upper portion is positioned at the rear cover 171*b*. The rear end 112*bc* of the cabin space intermediate portion is positioned at the rear luggage deck 179*ar*. A plane which passes through the rear end 112*bb* of the of the cabin space upper portion and is parallel to the vehicle up-down direction is indicated by a linear line Lcb11. A plane which passes through the front end 112*bc* of the of the cabin space intermediate portion and is parallel to the vehicle up-down direction is indicated by a linear line Lcb12. In short, in FIG. 2, the linear line Lcb11 is positioned forward of the linear line Lcb12 in the vehicle front-rear direction. FIG. 2 schematically shows that, in the vehicle front-rear direction, the rear end 112*bb* of the cabin space upper portion is at the same position as the rear end 118*ab* of the rear wall upper portion 118*a*. In reality, in the vehicle front-rear direction, the rear end 112*bb* of the cabin space upper portion is positioned forward of the rear end 118*ab* of the rear wall upper portion 118*a* by the thickness of the rear cover 171*b*.

Figure 7:
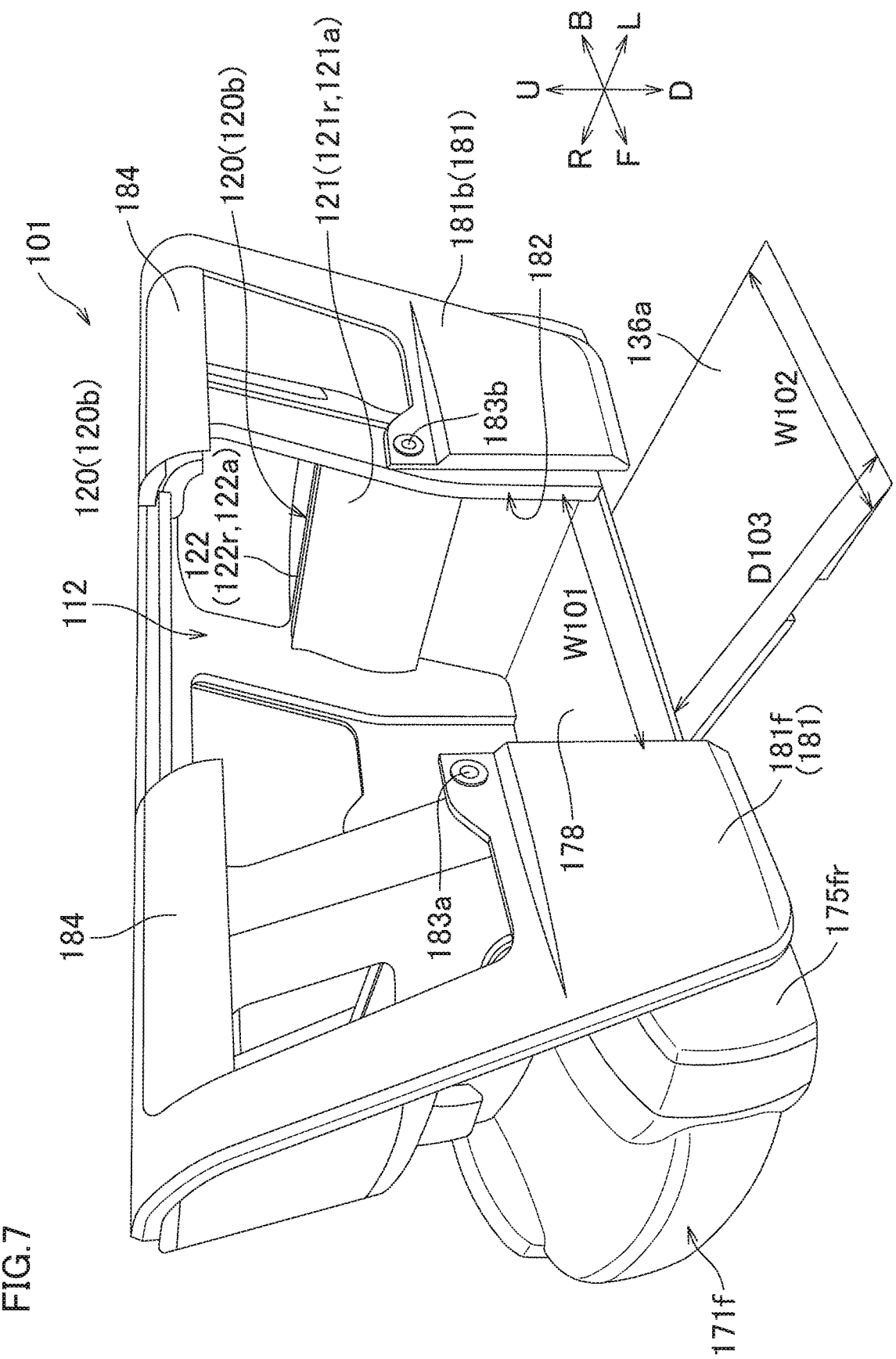
FIG. 7 is a perspective view of the communication seat-type vehicle of Specific Example 1.

As shown in FIG. 7, the communication seat-type vehicle 101 includes a slope member 136*a*. When the communication seat-type vehicle 101 is running, the slope member 136*a* is stored at a position which is in the cabin space 112 and is to the right of the door 181 in the vehicle left-right direction. To be more specific, the slope member 136*a* is constituted by two plate members which are aligned in the vehicle front-rear direction. When the slope member 136*a* is in the storage state, the two plate members of the slope member 136*a* are provided along the inner surfaces of the front door 181*f* and the rear door 181*b*. Each plate member may be folded in two, for example, and provided along the inner surface of the door 181. When the open button 183*b* or the open button 183*d* is pressed while the communication seat-type vehicle 101 is in a stopped state, the slope member 136*a* is switched from the storage state (not illustrated) to an in-use state shown in FIG. 7. The slope member 136*a* in the in-use state obliquely extends from the entrance 182 to the ground. In other words, in the slope member 136*a* in the in-use state shown in FIG. 7, a left end portion in the vehicle left-right direction is on the ground. The slope member 136*a* is provided to connect the entrance 182 with the ground. The slope member 136*a* is provided to be oblique. The slope member 136*a* in the in-use state shown in FIG. 7 is provided at the entrance 182 so that a right end portion in the vehicle left-right direction is at the same height as the floor deck 178. In this connection, the communication seat-type vehicle 101 is controlled so that its vehicle height is lower than the vehicle height when the vehicle is running. In other words, the entrance 182 of the communication seat-type vehicle 101 is controlled so that its height is lower than the height when the vehicle is running. This allows a passenger, a cart, a wheelchair, etc. to be easily get in or out from the vehicle. When the close button 183*e* is pressed while the slope member 136*a* is in the in-use state shown in FIG. 7, the slope member 136*a* is switched from the in-use state shown in FIG. 7 to the storage state. In this connection, the communication seat-type vehicle 101 is controlled so that its vehicle height is identical with the vehicle height when the vehicle is running. In other words, the entrance 182 of the communication seat-type vehicle 101 is controlled so that its height is identical with the height when the vehicle is running. When the open button 183*a* or the open button 183*c* is pressed, the two plate members constituting the slope member 136*a* are slid in the vehicle front-rear direction together with the front door 181*f* and the rear door 181*b*. When the close button 183*e* is pressed while the slope member 136*a* is in the storage state, the two plate members constituting the slope member 136*a* are slid in the vehicle front-rear direction together with the front door 181*f* and the rear door 181*b*. The slope member 136*a* is used for bridging the level difference between the floor deck 178 and the ground. The slope member 136*a* allows a passenger, a cart, a wheelchair, etc. to be easily get in or out from the vehicle. Because a passenger, a cart, a wheelchair, etc. can easily get in or out from the vehicle, the comfortability of the cabin space 112 is further ensured. The width W102 of the slope member 136*a* is identical with or shorter than the width W101 of the entrance 182. The width W102 of the slope member 136*a* is preferably identical with the width W101 of the entrance 182. This is because, when the slope member 136*a* is wide, a passenger, a cart, a wheelchair, etc. can smoothly get in or out from the vehicle. Preferably, a protrusion is formed at each end portion in the width direction of the slope member 136*a* and each end portion of the slope member 136*a* is L-shaped. This is because a, a cart, a wheelchair, etc. can be guided when getting in or getting out from the vehicle. Projections are preferably formed on the upper surface of the slope member 136*a* for the purpose of preventing slippage. This allows a passenger, a cart, a wheelchair, etc. to smoothly get in or out from the vehicle. As shown in FIG. 7, when the communication seat-type vehicle 101 is in the stopped state and a passenger, a cart, a wheelchair, etc. gets in or out from the vehicle, the seats 121 are preferably in the storage state. With this arrangement, the cabin space 112 is roomy and a passenger, a cart, a wheelchair, etc. can smoothly get in or out from the vehicle.

In addition to the effects of the communication seat-type vehicle 1 of the above-described embodiment of the present teaching, the communication seat-type vehicle 101 of Specific Example 1 of the embodiment of the present teaching exerts the following effects.

In the vehicle front-rear direction, the front wall 110 of the communication seat-type vehicle 101 is arranged such that the front end 110af of the front wall upper portion 110a is positioned rearward of the front end 110cf of the front wall lower portion 110c. With this arrangement, when viewed in the vehicle up-down direction, at least part of the front face-up surface 111 does not overlap the front wall upper portion 110a. As a result, the space above the front face-up surface 111 is further widened and a pedestrian ahead in the traveling direction of the vehicle to feel as if the front wall upper portion 110a of the vehicle 101 is positioned further behind the front wall lower portion 110c. Consequently, the oppressive feeling of the pedestrian ahead in the traveling direction due to the communication seat-type vehicle 101 is further decreased.

The communication seats 120 include a front seat assembly 120f and a rear seat assembly 120b which constitute two rows and are provided to allow seated passengers to face each other. The front seat assembly 120f is a front seat on which a seated passenger faces in the vehicle rearward direction. The rear seat assembly 120b is a rear seat on which a seated passenger faces in the vehicle forward direction. The communication seats 120 do not include a seat which is fixed in a state in which the seated passengers face only in the same direction. The communication seats 120 are therefore arranged to allow passengers to be seated at locations where the passengers are able to talk face-to-face with one another.

The communication seats 120 are arranged so that four or less passengers can be seated. While the comfortability of the cabin space 112 is maintained, the passengers in the communication seat-type vehicle 101 can be seated on the communication seats 120 so that the passengers are able to talk face-to-face with one another.

As the wheels 103 are rotated in reverse, the traveling direction of the communication seat-type vehicle 101 can be switched to rearward in the vehicle front-rear direction. The vehicle body cover 170 of the communication seat-type vehicle 101 is shaped to be symmetrical with respect to the vehicle front-rear direction. The vehicle body frame 130 is shaped to be symmetrical with respect to the vehicle front-rear direction. The communication seat-type vehicle 101 is therefore a bi-directional vehicle in which the traveling direction is switchable as the rotational direction of the wheels 103 is switched.

The communication seat-type vehicle 101 includes the rear wall 118. The rear wall 118 of the communication seat-type vehicle 101 is arranged such that, in the vehicle front-rear direction, the rear end 118ab of the rear wall upper portion 118a and the rear end 118cb of the rear wall lower portion 118c are positioned rearward of the front end 118bf of the rear wall intermediate portion 118b. With this arrangement, the length of the vehicle in the vehicle front-rear direction is shortened at the height of the viewpoint of a pedestrian behind the vehicle in the vehicle front-rear direction. As a result, the pedestrian behind the communication seat-type vehicle 101 in the vehicle front-rear direction feels less oppressive by the vehicle.

In the vehicle front-rear direction, the rear wall upper portion 118a is positioned rearward of the rear wall intermediate portion 118b, and the rear end 112bb of the cabin space upper portion of the cabin space 112 is positioned rearward of the rear end 112bc of the cabin space intermediate portion. With this arrangement, the cabin space upper portion is larger than the cabin space intermediate portion, and the cabin space upper portion which is at the height of the viewpoint of the passenger seated on the communication seat 120 is roomy. The size in the vehicle front-rear direction of the cabin space 112 at the height of the viewpoint of the passenger seated on the communication seat 120 is therefore maintained, with the result that the comfortability of the cabin space 112 is maintained.

In addition to the above, the rear wall 118 of the vehicle 101 includes the rear face-up surface 119. In the vehicle front-rear direction, the rear end 119b of the rear face-up surface 119 is provided at the same position as or forward of the rear end 118cb of the rear wall lower portion 118c and is at the same position as or rearward of the rear ends of the two rear wheels 103b. Furthermore, in the vehicle front-rear direction, the front end 119f of the rear face-up surface 119 is provided at the same position as or forward of the rear end 118ab of the rear wall upper portion 118a and is at the same position as or rearward of the front end 118bf of the rear wall intermediate portion 118b. In the vehicle up-down direction, the rear face-up surface 119 is provided below the rear wall upper portion 118a. The rear face-up surface 119 is therefore provided at a position lower than the vehicle upper portion 118a of the rear wall 118 and is long in the vehicle front-rear direction. In summary, the rear wall intermediate portion 118b is provided forward of the rear wall upper portion 118a of the rear wall 118 in the vehicle front-rear direction, and the rear face-up surface 119 is formed at a position lower than the rear wall upper portion 118a to face upward and to be long in the vehicle front-rear direction. As a result, the pedestrian behind the vehicle in the vehicle front-rear direction looks down the rear face-up surface 119 formed in the rear wall 118 of the vehicle. It is therefore possible to cause the pedestrian behind the vehicle in the vehicle front-rear direction to feel as if the rear wall 118 is positioned further forward at the height of the viewpoint of the pedestrian. As a result, the oppressive feeling of the pedestrian behind the communication seat-type vehicle 101 in the vehicle front-rear direction, which is caused by the vehicle, is further suppressed. In Specific Example 1, the front wall 110 and the rear wall 118 of the communication seat-type vehicle 101 are shaped to be plane symmetrical with respect to a plane which passes between the front wall 110 and the rear wall 118 in the vehicle front-rear direction and is perpendicular to the vehicle front-rear direction. The front wall 110 and the rear wall 118 of the communication seat-type vehicle 101 are shaped to be plane symmetrical with respect to a plane which passes between the front wall 110 and the rear wall 118 in the vehicle front-rear direction and is perpendicular to the vehicle front-rear direction. Consequently, even after the traveling direction is changed to rearward in the vehicle front-rear direction, the oppressive feeling of the pedestrian ahead in the traveling direction due to the communication seat-type vehicle 101 is suppressed.

The rear wall 118 is arranged such that, in the vehicle front-rear direction, the rear end 118ab of the rear wall upper portion 118a is forward of the rear end 118cb of the rear wall lower portion 118c. With this arrangement, when viewed in the vehicle up-down direction, at least part of the rear face-up surface 119 does not overlap the rear wall upper portion 118a. As a result, the space above the rear face-up surface 119 is further widened and a pedestrian behind in the vehicle front-rear direction of the vehicle to feel as if the front rear wall upper portion 118a of the vehicle 101 is positioned further forward of the rear wall lower portion 118c. Consequently, the oppressive feeling of the pedestrian behind in the vehicle front-rear direction of the vehicle due to the communication seat-type vehicle 101 is further decreased. In this way, with the communication seat-type vehicle 101 of the present teaching, the pedestrian ahead in the traveling direction of the vehicle feels less oppressive while the comfortability of the cabin space 112 is maintained.

The communication seats 120 include seats 121 on which passengers are seated. The seats 121 are formed to be able to constitute seat portions 121a in the cabin space 112. Each of the seats 121 is swingable between a seating state in which the seat portion 121a is constituted and a storage state in which the seat portion 121a is not constituted. To be more specific, each seat 121 is arranged to be swingable relative to the back rest 122 which constitutes the back rest portion 122a. When each seat 121 is in the storage state, the seat 121 is swung so that the seat 121 and the back rest 122 face each other. If the seats 121 do not constitute the seat portions 121a when a passenger gets in or out from the cabin space 112, the cabin space 112 is roomy. Furthermore, if the seats 121 do not constitute the seat portions 121a when luggage is introduced into the cabin space 112, the cabin space 112 is roomy and many pieces of luggage can be loaded. The comfortability of the cabin space 112 is therefore further ensured.

The communication seats 120 include the back rest portions 122a which are used by passengers to keep the posture. The back rests 122 are formed in the cabin space 112 in the vehicle internal portion in which a passenger is accommodated, to be able to constitute the back rest portions 122a. The back rests 122 are fixed in a posture keeping state in which each passenger is able to keep the posture, to constitute the back rest portions 122a. When the back rests 122 constitute the back rest portions 122a, the back of each passenger is supported when seated on the communication seat 120, with the result that each passenger feels comfortable. The comfortability of the cabin space 112 is therefore further ensured.

The front cover window 171fo, the rear cover window 171bo, the right window 177ro, and the left window 177lo are provided to allow the cabin space 112 to communicate with the external space outside the vehicle. The front cover window 171fo, the rear cover window 171bo, the right window 177ro, and the left window 177lo are arranged to allow a passenger seated on the communication seat 120 to see the external space outside the vehicle from the cabin space 112. The passenger therefore feels spaciousness. Because the passenger feels spaciousness, the comfortability of the cabin space is further ensured.

The entrance 182 is provided at the vehicle left portion. When the communication seat-type vehicle 101 runs at a left portion of the road in the vehicle left-right direction, an oncoming vehicle passes to the right of the communication seat-type vehicle 101 in the vehicle left-right direction. The entrance 182 is therefore positioned to allow passengers to easily get in and out from the cabin space 112. Because passengers can easily get in or out from the vehicle, the comfortability of the cabin space 112 is further ensured.

The entrance 182 is opened and closed by the door 181. The door 181 may be switched to a closed state when no passenger gets in or out. As the door 181 is switched to the closed state, a space around the feet of the passengers is not open and hence the comfortability of the cabin space 112 is maintained.

The door 181 is a sliding door slidable along the outer surface of the vehicle. The door 181 does not therefore enter the cabin space 112. The cabin space 112 is roomy for the passengers and hence the comfortability of the cabin space 112 is maintained.

The communication seat-type vehicle 101 further includes the driving source 105, the steering mechanism 106, and the automatic driving controller 108. The driving source 105 applies driving force to at least one of the four wheels 103. The steering mechanism 106 steers at least one of the four wheels 103. The driving source 105 and the steering mechanism 106 are automatically controlled by the automatic driving controller 108. The communication seat-type vehicle 101 is able to automatically run. It is therefore unnecessary to provide components such as a steering wheel and a pedal in the cabin space 112. The cabin space 112 is roomy for the passengers and hence the comfortability of the cabin space 112 is maintained.

The communication seat-type vehicle 101 includes the visors 184. The visors 184 are provided at the upper edges of the left window 177lo and the right window 177ro and on the vehicle outer surface. Because the visors 184 prevent the entrance of rain or sunlight through the left window 177lo and the right window 177ro, the comfortability of the cabin space 112 is further ensured.

Specific Example 2 of Embodiment

Specific Example 1 of the above-described embodiment of the present teaching will be described with reference to FIG. 8. It is noted that items identical with those in the embodiment of the present teaching having been described above are not explained again. Basically, Specific Example 2 of the embodiment of the present teaching encompasses all features of the embodiment and Specific Example 1 of the present teaching described above. It is noted that items identical with those of the Specific Example 1 of the embodiment of the present teaching are indicated by the same reference numerals and detailed descriptions thereof are suitably omitted.

A communication seat-type vehicle 201 of Specific Example 2 is different from Specific Example 1 in the shapes of the front cover lower portion 171fa of the front cover 171f and the rear cover lower portion 171ba of the rear cover 171b. In other words, the communication seat-type vehicle 201 is different from Specific Example 1 in the shapes of a front wall 210 and a rear wall 218. Furthermore, a cabin space 212 is different from the cabin space 112 of Specific Example 1.

Figure 8:
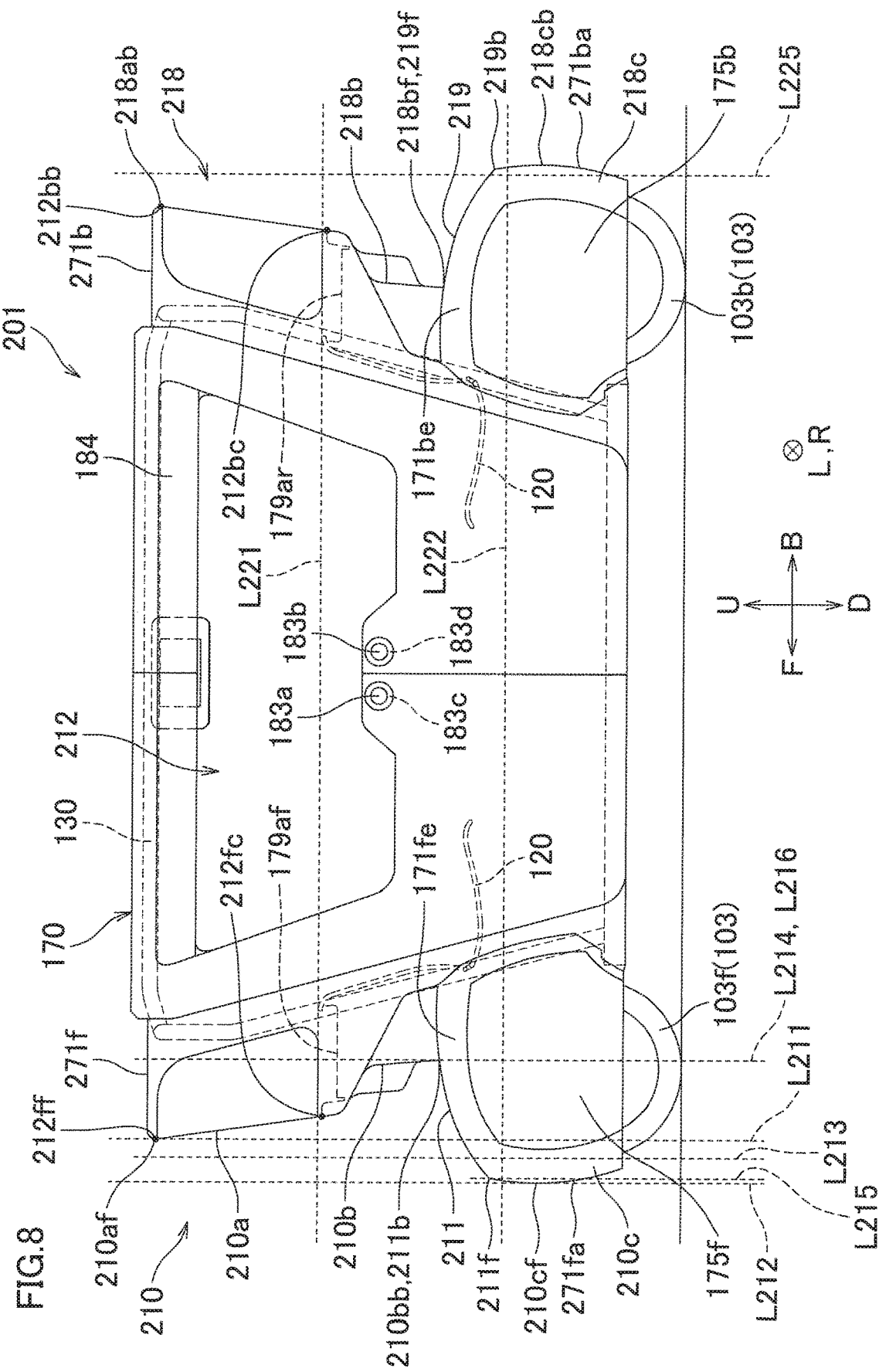
FIG. 8 is a side view of a communication seat-type vehicle of Specific Example 2.

As shown in FIG. 8, a front cover lower portion 271fa of a front cover 271f is provided in front of the two front wheels 103f. The front cover lower portion 271fa is provided along the vehicle up-down direction. The front cover lower portion 271fa has left and right portions which are connected to the two front wheel front cover portions 171fe, respectively. The front cover lower portion 271fa is provided between the two front wheel front cover portions 171fe, along the vehicle left-right direction. The front cover lower portion 271fa is curved so that a central portion in the vehicle left-right direction is positioned forward of left and right end portions. The front cover lower portion 271fa is curved so that a central portion in the vehicle up-down direction is positioned forward of upper and lower end portions. In the vehicle front-rear direction, the front end of the front cover lower portion 271fa is at the same position as or behind the front ends of the two front wheel front cover portions 171fe.

The rear cover lower portion 271ba of the rear cover 271b is provided behind the two rear wheels 103b. The rear cover lower portion 271ba is provided along the vehicle up-down direction. The rear cover lower portion 271ba has left and right portions which are connected to the two front wheel rear cover portions 171be, respectively. The rear cover lower portion 271ba is provided between the two rear wheel rear cover portions 171be, along the vehicle left-right direction. The rear cover lower portion 271ba is curved so that a central portion in the vehicle left-right direction is positioned rearward of left and right end portions. The rear cover lower portion 271ba is curved so that a central portion in the vehicle up-down direction is positioned rearward of upper and lower end portions. The rear end of the rear cover lower portion 271ba is provided at the same position as or in front of the rear ends of the two rear wheel rear cover portions 171be in the vehicle front-rear direction.

As shown in FIG. 8, the front wall 210 of the communication seat-type vehicle 201 is arranged such that, in the vehicle front-rear direction, the front end 210af of the front wall upper portion 210a is positioned rearward of the front end 210cf of the front wall lower portion 210c and forward of the rear end 210bb of the front wall intermediate portion 210b. In FIG. 8, a plane which passes through the front end 210af of the front wall upper portion 210a and is parallel to the vehicle up-down direction is indicated by a linear line L211. A plane which passes through the front end 210cf of the front wall lower portion 210c and is parallel to the vehicle up-down direction is indicated by a linear line L212. A plane which passes through the rear end 210bb of the front wall intermediate portion 210c and is parallel to the vehicle up-down direction is indicated by a linear line L214. Therefore the linear line L211 is positioned rearward of the linear line L212 and forward of the linear line L214 in vehicle front-rear direction.

The rear end 210bb of the front wall intermediate portion 210b is positioned rearward of the front ends of the two front wheels 103f. In FIG. 8, a plane which passes through the front ends of the two front wheels 103f and is parallel to the vehicle up-down direction is indicated by a linear line L213. Therefore the linear line L214 is positioned rearward of the linear line L213 in the vehicle front-rear direction. In FIG. 8, in the vehicle front-rear direction, the front end 210af of the front wall upper portion 210a is positioned rearward of the front ends of the two front wheels 103f. Therefore the linear line L211 is positioned rearward of the linear line L213 in the vehicle front-rear direction. In the vehicle front-rear direction, the front end 210af of the front wall upper portion 210a may be at the same position as the front ends of the two front wheels 103f or positioned forward of the front ends of the two front wheels 103f. In other words, in the vehicle front-rear direction, the linear line L211 may be at the same position as the linear line L213 or positioned forward of the linear line L213.

The front wall upper portion 210a of the communication seat-type vehicle 201 is included in the uppermost portion of the front wall 210 when the communication seat-type vehicle 201 is equally divided into three portions in the vehicle up-down direction. The front wall intermediate portion 210b of the communication seat-type vehicle 201 is included in the middle portion of the front wall 210 when the communication seat-type vehicle 201 is equally divided into three portions in the vehicle up-down direction. The front wall lower portion 210c of the communication seat-type vehicle 201 is included in the lowermost portion of the front wall 210 when the communication seat-type vehicle 201 is equally divided into three portions in the vehicle up-down direction. In FIG. 8, linear lines L221 and L222 are shown as linear lines equally dividing the communication seat-type vehicle 201 into three portions in the vehicle up-down direction. The linear lines L221 and L222 are linear lines which are orthogonal to the vehicle up-down direction and parallel to the vehicle front-rear direction. The linear line L221 is directly above the linear line L222 in the vehicle up-down direction. In the vehicle up-down direction, the front wall 210 of the communication seat-type vehicle 201 is divided into three portions, i.e., the front wall upper portion 210a, the front wall intermediate portion 210b, and the front wall lower portion 210c, by a plane passing the linear line L221 and a plane passing the linear line L222.

The front wall 210 of the communication seat-type vehicle 201 includes a front face-up surface 211. The front face-up surface 211 of the front wall 210 is an outer wall surface formed along the vehicle front-rear direction. The front cover 271f and the two front wheel side covers 175f constitute the front face-up surface 211 of the front wall 210.

In the vehicle front-rear direction, a front end 211f of the front face-up surface 211 is provided at the same position as or rearward of the front end 210cf of the front wall lower portion 210c and is at the same position as or forward of the front ends of the two front wheels 103f. In the vehicle front-rear direction, a rear end 211b of the front face-up surface 211 is provided at the same position as or rearward of the front end 210af of the front wall upper portion 210a and is at the same position as or forward of the rear end 210bb of the front wall intermediate portion 210b. In FIG. 8, in the vehicle front-rear direction, the front end 211f of the front face-up surface 211 is provided rearward of the front end 210cf of the front wall lower portion 210c and is forward of the front ends of the two front wheels 103f. In the vehicle front-rear direction, the rear end 211b of the front face-up surface 211 is provided rearward of the front end 210af of the front wall upper portion 210a and is at the same position as the rear end 210bb of the front wall intermediate portion 210b. In the vehicle front-rear direction, the front end 211f of the front face-up surface 211 is positioned forward of the front end 210af of the front wall upper portion 210a. Furthermore, in the vehicle front-rear direction, the front face-up surface 211 is provided below the front wall upper portion 210a. In FIG. 8, a plane which passes through the front end 211f of the front face-up surface 211 of the front wall 210 and is parallel to the vehicle up-down direction is indicated by a linear line L215. A plane which passes through the rear end 211b of the front face-up surface 211 of the front wall 210 and is parallel to the vehicle up-down direction is indicated by a linear line L216. In short, in FIG. 8, the linear line L215 is rearward of the linear line L212 and forward of the linear line L213 in the vehicle front-rear direction. The linear line L216 is rearward of the linear line L211 and at the same position as the linear line L214 in the vehicle front-rear direction. The linear line L215 is positioned forward of the linear line L211 in the vehicle front-rear direction.

The cabin space 212 is arranged such that, in the vehicle front-rear direction, a front end 212ff of the cabin space upper portion is positioned forward of a front end 212fc of the cabin space intermediate portion. In FIG. 8, the front end 212ff of the cabin space upper portion is positioned at the front cover 271f. The front end 212fc of the cabin space intermediate portion is positioned at the front luggage deck 179af. The cabin space upper portion is included in the uppermost portion of the cabin space 212 when the communication seat-type vehicle 201 is equally divided into three portions in the vehicle up-down direction. The cabin space intermediate portion is included in the middle portion of the cabin space 212 when the communication seat-type vehicle 201 is equally divided into three portions in the vehicle up-down direction. FIG. 8 schematically shows that, in the vehicle front-rear direction, the front end 212*ff* of the cabin space upper portion is at the same position as the front end 210*af* of the front wall upper portion 210*a*. In reality, in the vehicle front-rear direction, the front end 212*ff* of the cabin space upper portion is positioned rearward of the front end 210*af* of the front wall upper portion 210*a* by the thickness of the front cover 271*f*.

The rear wall 218 of the communication seat-type vehicle 201 is arranged such that, in the vehicle front-rear direction, the rear end 218*ab* of the rear wall upper portion 218*a* is positioned forward of the rear end 218*cb* of the rear wall lower portion 218*c* and forward of the front end 218*bf* of the rear wall intermediate portion 218*b*.

In the vehicle front-rear direction, the front end 218*bf* of the rear wall intermediate portion 218*b* is positioned forward of the rear ends of the two rear wheels 103*b*. In FIG. 8, a plane which passes through the rear ends of the two rear wheels 103*b* and is parallel to the vehicle up-down direction is indicated by a linear line L225. In FIG. 8, in the vehicle front-rear direction, the rear end 218*ab* of the rear wall upper portion 218*a* is positioned forward of the rear ends of the two rear wheel 103*b*. In the vehicle front-rear direction, the rear end 218*ab* of the rear wall upper portion 218*a* may be at the same position as the rear ends of the two rear wheels 103*b* or positioned rearward of the rear ends of the two rear wheel 103*b*.

The rear wall upper portion 218*a* of the communication seat-type vehicle 201 is included in the uppermost portion of the rear wall 218 when the communication seat-type vehicle 201 is equally divided into three portions in the vehicle up-down direction. The rear wall intermediate portion 218*b* of the communication seat-type vehicle 201 is included in the middle portion of the rear wall 218 when the communication seat-type vehicle 201 is equally divided into three portions in the vehicle up-down direction. The rear wall lower portion 218*c* of the communication seat-type vehicle 201 is included in the lowermost portion of the rear wall 218 when the communication seat-type vehicle 201 is equally divided into three portions in the vehicle up-down direction. In the vehicle up-down direction, the rear wall 218 of the communication seat-type vehicle 201 is divided into three portions, i.e., the upper portion 218*a*, the intermediate portion 218*b*, and the lower portion 218*c*, by a plane passing the linear line L221 and a plane passing the linear line L222.

The rear wall 218 of the communication seat-type vehicle 201 includes a rear face-up surface 219. The rear face-up surface 219 of the rear wall 218 is an outer wall surface formed along the vehicle front-rear direction. The rear cover 271*b* and the two rear wheel side covers 175*b* constitute the rear face-up surface 219 of the rear wall 218.

In the vehicle front-rear direction, the rear end 219*b* of the rear face-up surface 219 is provided at the same position as or forward of the rear end 218*cb* of the rear wall lower portion 218*c* and is at the same position as or rearward of the rear ends of the two rear wheels 103*b*. In the vehicle front-rear direction, the rear end 219*b* of the rear face-up surface 219 is provided at the same position as the front end 218*ab* of the rear wall upper portion 218*a* or forward of the rear end 218*ab* of the rear wall upper portion 218*a* and is at the same position as or rearward of the front end 218*bf* of the rear wall intermediate portion 218*b*. In FIG. 8, in the vehicle front-rear direction, the rear end 219*b* of the rear face-up surface 219 is provided forward of the rear end 218*cb* of the rear wall lower portion 218*c* and is rearward of the rear ends of the two rear wheels 103*b*. In the vehicle front-rear direction, the front end 219*f* of the rear face-up surface 219 is provided forward of the rear end 218*ab* of the rear wall upper portion 218*a* and is at the same position as the front end 218*bf* of the rear wall intermediate portion 218*b*. In the vehicle front-rear direction, the rear end 219*b* of the rear face-up surface 219 is positioned rearward of the rear end 218*ab* of the rear wall upper portion 218*a*. Furthermore, in the vehicle up-down direction, the rear face-up surface 219 is provided below the rear wall upper portion 218*a*.

The cabin space 212 is arranged such that, in the vehicle front-rear direction, a rear end 212*bb* of the cabin space upper portion is positioned rearward of a rear end 212*bc* of the cabin space intermediate portion. In FIG. 8, the rear end 212*bb* of the cabin space upper portion is positioned at the rear cover 271*b*. The rear end 212*bc* of the cabin space intermediate portion is positioned at the rear luggage deck 179*ar*. It is schematically shown that, in the vehicle front-rear direction, the rear end 212*bb* of the cabin space upper portion is at the same position as the rear end 218*ab* of the rear wall upper portion 218*a*. In reality, in the vehicle front-rear direction, the rear end 212*bb* of the cabin space upper portion is positioned forward of the rear end 210*ab* of the rear wall upper portion 218*a* by the thickness of the rear cover 271*b*.

The front wall 210 and the rear wall 218 of the communication seat-type vehicle 201 are shaped to be plane symmetrical with respect to a plane which passes between the front wall 210 and the rear wall 218 in the vehicle front-rear direction and is perpendicular to the vehicle front-rear direction.

In addition to the effects of the communication seat-type vehicle 101 of the above-described Specific Example 1 of the embodiment of the present teaching, the communication seat-type vehicle 201 of Specific Example 2 of the embodiment of the present teaching exerts the following effects.

In the vehicle front-rear direction, the front end of the front cover lower portion 271*fa* is at the same position as or behind the front ends of the two front wheel front cover portions 171*fe*. The lower portion 210*c* of the front wall 210 of the communication seat-type vehicle 201 is therefore reduced in size in the vehicle front-rear direction. As a result, the oppressive feeling of the pedestrian ahead in the traveling direction of the vehicle, which is caused by the communication seat-type vehicle 201, is further suppressed.

The rear end of the rear cover lower portion 271*ba* is provided at the same position as or in front of the rear ends of the two rear wheel rear cover portions 171*be* in the vehicle front-rear direction. The lower portion 218*c* of the rear wall 218 of the communication seat-type vehicle 201 is therefore reduced in size in the vehicle front-rear direction. As a result, even after the traveling direction of the communication seat-type vehicle 201 is changed to rearward in the vehicle front-rear direction, the oppressive feeling of the pedestrian behind the communication seat-type vehicle 201 in the vehicle front-rear direction is further suppressed.

The present teaching is not limited to the above-described embodiment, and various changes can be made within the scope of the claims. The following describes modifications of the embodiment of the present teaching.

In the specific examples of the present teaching, the driving source drives the two rear wheels. Alternatively, the driving source of the present teaching may drive the two front wheels. Alternatively, the driving source of the present teaching may drive at least two of the wheels. In the specific examples of the present teaching, the driving source is a driving motor including an electric motor and a battery. Alternatively, the driving source of the present teaching may be an engine using gasoline, etc.

In the specific examples of the present teaching, the brake mechanism is constituted by the disc brake device. Alternatively, the brake mechanism of the present teaching may be a combination of a regenerative brake using a driving motor and the disc brake device. Alternatively, the brake mechanism of the present teaching may be constituted by a drum brake device, etc.

In the specific examples of the present teaching, the steering mechanism steers the two front wheels to control the traveling direction of the communication seat-type vehicle. Alternatively, the steering mechanism of the present teaching may steer the two rear wheels to control the traveling direction of the communication seat-type vehicle. Alternatively, the steering mechanism of the present teaching may steer at least two of the wheels to control the traveling direction of the communication seat-type vehicle.

In the embodiment and the specific examples of the present teaching, the communication seats include two arrays of seat assemblies, i.e., the front seat assembly and the rear seat assembly. In this regard, the communication seats of the present teaching may be variously arranged on condition that passengers can be seated at locations where the passengers are able to talk face-to-face with one another. The communication seats of the present teaching may be variously arranged on condition that at least two of the rear seat assembly, the front seat assembly, a right seat assembly, and a left seat assembly are included. The right seat assembly is a seat assembly on which a seated passenger faces in the vehicle leftward direction. The left seat assembly is a seat assembly on which a seated passenger faces in the vehicle rightward direction. The communication seats may include an L-shaped seat assembly which is constituted by a combination of the front seat assembly and the right seat assembly, a combination of the front seat assembly and the left seat assembly, a combination of the rear seat assembly and the right seat assembly, or a combination of the rear seat assembly and the left seat assembly. The communication seats may include a C-shaped seat assembly which is constituted by a combination of the front seat assembly, the right seat assembly, and the left seat assembly, a combination of the front seat assembly, the left seat assembly, and the rear seat assembly, a combination of the rear seat assembly, the right seat assembly, and the front seat assembly, or a combination of the rear seat assembly, the right seat assembly, and the front seat assembly. The communication seats may include a quadrangular seat assembly which is constituted by all of the rear seat assembly, the front seat assembly, the right seat assembly, and the left seat assembly.

In the embodiment and the specific examples of the present teaching, each communication seat includes the back rest which is used by a passenger to keep the posture. Alternatively, the communication seat may not include the back rest.

In the specific examples of the present teaching, the steering mechanism is controlled by the automatic driving controller. Alternatively, the steering mechanism of the present teaching may include a steering wheel, and the mechanism may be controlled by a passenger operating the steering wheel. The steering wheel may be formed of a circular member and rotationally operated by a passenger, or may be formed of a lever and tilted by a passenger to input the direction. The communication seat-type vehicle of the present teaching may be steered in either an automatic driving mode or a manual driving mode. In the automatic driving mode, the steering mechanism is controlled by the automatic driving controller. In the manual driving mode, the steering mechanism is controlled by a passenger operating the steering wheel. The steering mechanism may include a detachable steering wheel. The steering wheel may be attached when the vehicle is driven in the manual driving mode, and the steering wheel may be detached when the vehicle is driven in the automatic driving mode.

In the specific examples of the present teaching, the driving source and the brake mechanism are controlled by the automatic driving controller. Alternatively, the communication seat-type vehicle of the present teaching may include an accelerator pedal, a brake pedal, and a clutch pedal. The driving source may be controlled by a passenger operating the accelerator pedal or the clutch pedal. The clutch pedal may be omitted. The brake mechanism may be controlled by a passenger operating the brake pedal. The communication seat-type vehicle of the present teaching may be driven in either the automatic driving mode or the manual driving mode. In the automatic driving mode, the running of the communication seat-type vehicle is controlled by the automatic driving controller. In the manual driving mode, the running of the communication seat-type vehicle is controlled by a passenger operating the accelerator pedal and the brake pedal.

In the specific examples of the present teaching, the rotational shaft of the seat is, for example, made of an elastic member. With this arrangement, when the seat in the seating state is manually lifted up at a predetermined angle, the seat is switched to the storage state thanks to the elastic force of the elastic member. Alternatively, the rotational shaft of the seat of the present teaching may be stoppable at a desired position between the seating state and the storage state. Alternatively, the seat may be normally in the storage state on account of an elastic member, and may be manually swung to the seating state when a passenger is seated on the seat.

In the specific examples of the present teaching, the seat is swingable between the seating state in which a passenger is allowed to be seated thereon and the storage state in which a passenger is not allowed to be seated. Alternatively, the seat of the present teaching may be arranged so that the seat portion on which a passenger is seated is fixed. To put it differently, the seat of the present teaching may not be switchable to the storage state in which the seat portion is not formed.

In the specific examples of the present teaching, the seat is swingable between the seating state in which the seat portion is formed and the storage state in which the seat portion is not formed. Alternatively, the seat of the present teaching may be detachable and switchable from the seating state in which the seat portion is formed to a detached state in which the seat portion is not formed.

In the specific examples of the present teaching, the back rest is fixed to the vehicle body frame. Alternatively, the communication seat-type vehicle of the present teaching may further include a storage space which is in the vehicle internal portion and outside the cabin space. The back rest of the present teaching may be arranged to open and close the storage space. For example, as indicated by two-dot chain lines in FIG. 4, the communication seat-type vehicle 101 may include two storage spaces 123 (a front storage space 123*f* and a rear storage space 123*r*). The front storage space 123*f* is constituted by the front luggage deck 123*fd*. In the vehicle front-rear direction, the front luggage deck 123*fd* is provided partially forward of the front end of the front back rest 122*f* of the front seat assembly 120*f*. The front luggage deck 123*fd* is provided below the front luggage deck 179*af* in the vehicle up-down direction. The rear storage space 123*r* is constituted by the rear luggage deck 123*rd*. In the vehicle front-rear direction, the rear luggage deck 123*rd* is provided partially rearward of the rear end of the rear back rest 122*r* of the rear seat assembly 120*b*. The rear luggage deck 123*rd* is provided below the rear luggage deck 179*ar* in the vehicle up-down direction. The back rest of the present teaching may be arranged to open and close the storage space, e.g., as in the back rest 122 shown in FIG. 4. In other words, the area of the back rest is changeable when viewed in the vehicle front-rear direction. Alternatively, for example, the area of the back rest when viewed in the vehicle front-rear direction is changeable between a posture keeping state and a storage state in which the passenger cannot keep the posture. When the back rest is in the posture keeping state, the area of the back rest is maximized when viewed in the vehicle front-rear direction. When the back rest is in the storage state, the area of the back rest when viewed in the vehicle front-rear direction is small as compared to the case where the back rest is in the posture keeping state. When the back rest is in the storage state, the rest is swung so that the back rest faces the seat. Alternatively, for example, the back rest is formed to be detachable and switchable from the posture keeping state or the storage state to a detached state in which the back rest is detached. When the back rest is in the detached state, the area of the back rest is minimized to 0 when viewed in the vehicle front-rear direction. The back rest is formed to be switchable between a closed state in which the front storage space or the rear storage space is closed and an open state in which the front storage space or the rear storage space is open. The back rest is arranged to be swingable relative to the seat which constitutes the seat portion. When the back rest is in the open state, the back rest is swung and the storage space is open. When the back rest in the open state is swung to be in the closed state, the storage space is closed. Alternatively, the back rest may be detachable and switchable from the closed state in which the back rest portion is formed to the open state in which the back rest portion is not formed. To be more specific, when the back rest is in the open state, the back rest is detached and the storage space is open. When the back rest is in the open state, the back rest is attached and the storage space is closed. When the back rest is in the open state, a passenger is allowed to utilize the storage space and store a luggage, etc. in the storage space. As compared to a case where a luggage, etc. of a passenger is placed in the cabin space, a space which can be used by passengers getting in or out is large in the cabin space. It becomes easy for passengers to get in and out from the vehicle. The communication seat-type vehicle of the present teaching may include both a back rest which is able to open and close the front storage space and a back rest which is able to open and close the rear storage space. Only the front storage space or the rear storage space may be provided as the storage space. In the vehicle internal portion, storage spaces may be provided not only at the vehicle front portion and the vehicle rear portion but also at the vehicle right portion or the vehicle left portion. The storage space may not be openable and closable by the back rest.

In the specific examples of the present teaching, the automatic driving controller is arranged to be able to communicate with the control panel and receive various types of signals from the control panel. Alternatively, the control panel of the present teaching may be a terminal with a computer, e.g., a tablet terminal or a portable terminal. The terminal may be provided in the vehicle internal portion of the communication seat-type vehicle or outside the communication seat-type vehicle.

In the specific examples of the present teaching, the automatic driving controller is arranged to be able to communicate with the terminal and receive various types of signals from the terminal. The automatically controlled vehicle of the present teaching, however, may not be able to communicate with the terminal. In such a case, for example, the automatic driving controller may store commands to be output to the driving source, the steering mechanism, and the brake mechanism in advance, in association with information related to a location of the vehicle.

In the specific examples of the present teaching, the communication seat-type vehicle includes the emergency button. Alternatively, the communication seat-type vehicle of the present teaching may not include the emergency button.

In the specific examples of the present teaching, the communication seat-type vehicle includes the door. Alternatively, the communication seat-type vehicle of the present teaching may not include the door.

In the specific examples of the present teaching, the door is a sliding door. Alternatively, the door of the present teaching may be a hinged door, a swing door, a glide slide door, etc.

In the specific examples of the present teaching, the communication seat-type vehicle includes two open buttons provided on the outer surface of the door and two open buttons provided on the inner surface of the door. Alternatively, the open button of the present teaching may be provided on the outer surface of the vehicle body cover, which is not the door. Likewise, the open button of the present teaching may be provided on the inner surface of the vehicle body cover, which is not the door. The communication seat-type vehicle of the present teaching may include five or more open buttons. The communication seat-type vehicle of the present teaching may include only one open button, two open buttons, or three open buttons. In the specific examples of the present teaching, one close button is provided on the vehicle inner surface. Alternatively, the number of the close buttons in the present teaching may be two or more. The door of the present teaching may be opened and closed by a passenger operating the control panel or another portable terminal. The communication seat-type vehicle of the present teaching may not include an open button or a close button. The door of the present teaching may be opened and closed without being operated by a passenger. For example, the door may be switched to the open state by the automatic driving controller when the communication seat-type vehicle does not run. The door may be switched to the closed state by the automatic driving controller when the communication seat-type vehicle is running.

In the specific examples of the present teaching, the open buttons include the open button for general passengers and the open button for special passengers. Alternatively, the communication seat-type vehicle of the present teaching may include only the open button for general passengers. In this case, the communication seat-type vehicle of the present teaching may not include the slope. The communication seat-type vehicle of the present teaching may be arranged not to change the vehicle height from the vehicle height when the vehicle is running, even when any of the open buttons is pressed. The communication seat-type vehicle of the present teaching may include only the open button for special passengers.

In the specific examples of the present teaching, the slope member is stored along the inner surface of the door when the communication seat-type vehicle is running. Alternatively, the slope member of the present teaching may be stored below the floor frame along the floor frame. In this case, the depth of the slope member is identical with or shorter than the length of the floor frame in the vehicle left-right direction. With this arrangement, the slope member stored below the floor frame does not obstruct the running of the communication seat-type vehicle. The height of the protrusion of the slope member is shorter than the length between the floor frame and the ground. This allows the slope member to be stored below the floor frame.

In the specific examples of the present teaching, the communication seat-type vehicle includes visors. Alternatively, the communication seat-type vehicle of the present teaching may not include the visors.

In the specific examples of the present teaching, the entrance is formed at a left portion in the vehicle left-right direction of the vehicle body cover. Alternatively, the communication seat-type vehicle of the present teaching may be arranged such that the entrance is formed at one or more of the front portion and the rear portion in the vehicle front-rear direction and the left portion and the right portion in the vehicle left-right direction of the vehicle body cover. When the communication seat-type vehicle runs at a right portion of the road in the vehicle left-right direction, an oncoming vehicle passes to the left of the communication seat-type vehicle. In this case, the entrance is preferably formed at the right portion in the vehicle left-right direction of the vehicle body cover to allow passengers to easily get in and out from the cabin space. Meanwhile, when, for example, the communication seat-type vehicle runs on a narrow road, it may be difficult to get in and out from the communication seat-type vehicle in the vehicle left-right direction. In this case, the entrance is preferably formed at one or both of the front portion and the rear portion in the vehicle front-rear direction of the vehicle body cover, in order to allow passengers to easily get in and out from the cabin space.

In the embodiment and the specific examples of the present teaching, in the vehicle body frame, the shape of the front portion viewed rearward in the vehicle front-rear direction is identical with the shape of the rear portion viewed forward in the vehicle front-rear direction. In the specific examples of the present teaching, the vehicle body frame is formed to be plane symmetrical with respect to a plane which passes through the center in the vehicle front-rear direction of the vehicle body frame and is perpendicular to the vehicle front-rear direction. In this regard, in the present teaching, the plane perpendicular to the vehicle front-rear direction may not pass through the center of the vehicle body frame, as long as the plane passes between the front end and the rear end of the vehicle body frame. The rear portion in the front-rear direction of the vehicle body frame may be differently shaped. For example, the rear portion in the front-rear direction of the vehicle body frame may be box-shaped.

In the embodiment and the specific examples of the present teaching, the traveling direction of the communication seat-type vehicle can be changed to rearward in the vehicle front-rear direction. To put it differently, the communication seat-type vehicle is a vehicle which is able to change the traveling direction by rotating the wheels in reverse. In the specific examples of the present teaching, the vehicle body cover of the communication seat-type vehicle is formed to be plane symmetrical with respect to a plane which passes through the center in the vehicle front-rear direction of the vehicle body cover and is perpendicular to the vehicle front-rear direction. In this regard, in the present teaching, the plane perpendicular to the vehicle front-rear direction may not pass through the center of the vehicle body cover in the vehicle front-rear direction, as long as the plane passes between the front wall and the rear wall in the vehicle front-rear direction. In the specific examples of the present teaching, the communication seat-type vehicle is formed to be plane symmetrical with respect to a plane which passes through the center in the vehicle front-rear direction of the vehicle and is perpendicular to the vehicle front-rear direction. In this regard, in the present teaching, the plane perpendicular to the vehicle front-rear direction may not pass through the center of the communication seat-type vehicle in the vehicle front-rear direction as long as the plane passes between the front wall and the rear wall in the vehicle front-rear direction. When the traveling direction of the communication seat-type vehicle of the present teaching is changed to the reverse direction and the communication seat-type vehicle runs, the vehicle body cover of the vehicle is preferably formed to be plane symmetrical with respect to a plane which passes between the front wall and the rear wall in the vehicle front-rear direction and is perpendicular to the vehicle front-rear direction. Alternatively, when the traveling direction of the communication seat-type vehicle of the present teaching is changed to the reverse direction and the communication seat-type vehicle runs, the vehicle body cover of the vehicle is preferably arranged such that the shape of the front portion viewed rearward in the vehicle front-rear direction is identical with the shape viewed forward in the vehicle front-rear direction. The traveling direction of the communication seat-type vehicle may not be changeable to the reverse direction. In such a case, the vehicle body cover of the communication seat-type vehicle of the present teaching may not be plane symmetrical with respect to a plane which passes between the front wall and the rear wall in the vehicle front-rear direction and is perpendicular to the vehicle front-rear direction, and may not be arranged such that the shape of the front portion viewed rearward in the vehicle front-rear direction is identical with the shape viewed forward in the vehicle front-rear direction.

Figure 9:
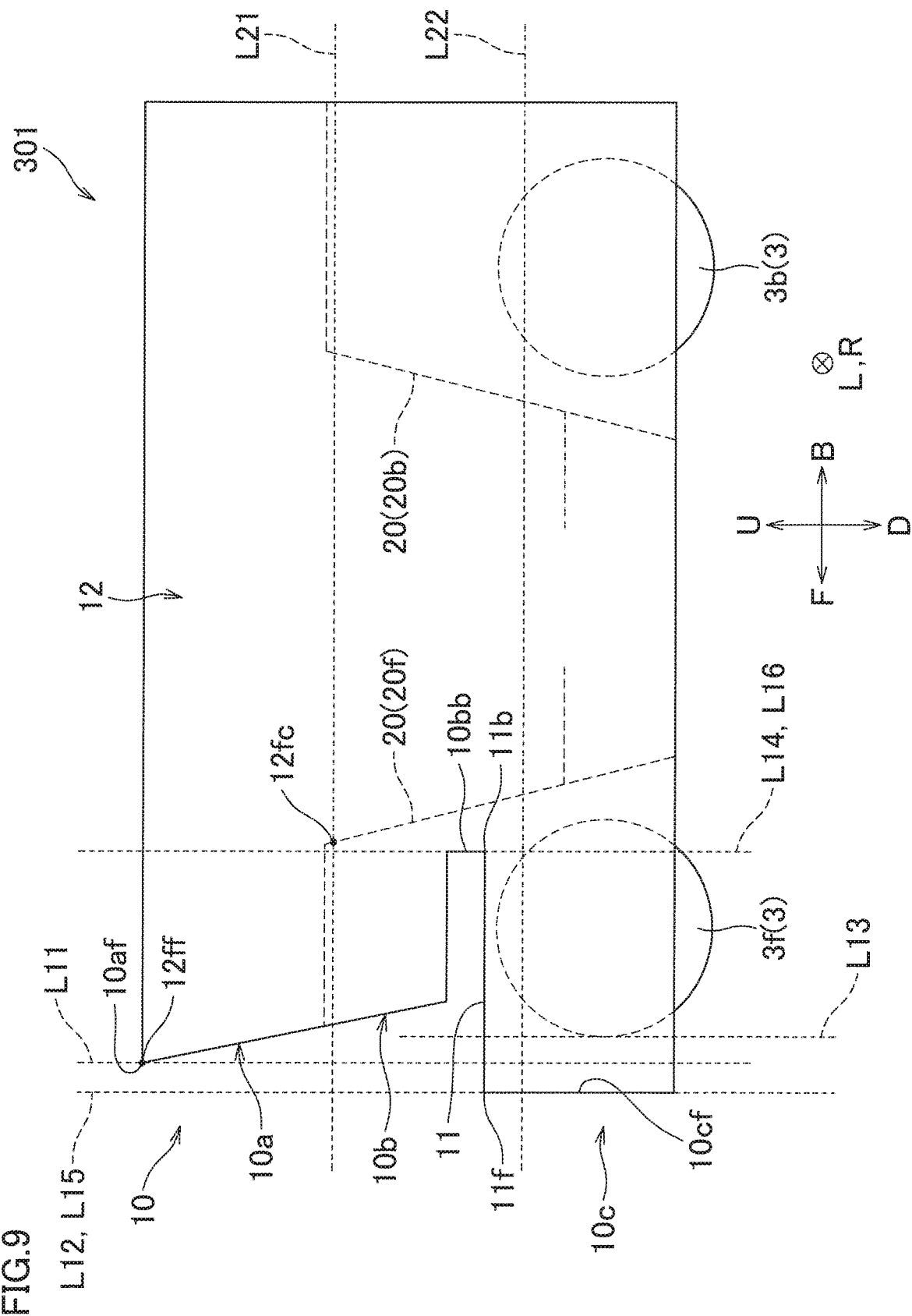
FIG. 9 is a side view which schematically shows a communication seat-type vehicle of a modification.

In the embodiment and the specific examples of the present teaching, the vehicle body cover is formed to be plane symmetrical with respect to a plane which passes between the front wall and the rear wall in the vehicle front-rear direction and is perpendicular to the vehicle front-rear direction. In other words, the front cover and the rear cover of the vehicle body cover are formed to be plane symmetrical with respect to a plane which passes between the front wall and the rear wall in the vehicle front-rear direction and is perpendicular to the vehicle front-rear direction. In this regard, the vehicle body cover of the present teaching may not be formed to be plane symmetrical with respect to a plane which passes between the front wall and the rear wall in the vehicle front-rear direction and is perpendicular to the vehicle front-rear direction. In this case, the communication seat-type vehicle is preferably not able to change the traveling direction to rearward in the vehicle front-rear direction. The rear portion of the vehicle body cover may be differently shaped. For example, in the communication seat-type vehicle of the present teaching, the front wall and the rear wall may not be symmetrical in shape, or may not be identical in shape. Furthermore, for example, in the communication seat-type vehicle of the present teaching, the right portion and the left portion may not be symmetrical in shape, or may not be identical in shape. To be more specific, the rear portion of the vehicle body cover may be box-shaped. As a specific example, the following will describe a communication seat-type vehicle 301 shown in FIG. 9. The communication seat-type vehicle 301 shown in FIG. 9 is a modification of the communication seat-type vehicle shown in FIG. 1. Basically, a modification of the embodiment of the present teaching encompasses all features of the embodiment of the present teaching described above, which is shown in FIG. 1. The shape of a front wall 10 of the communication seat-type vehicle 301 is identical with the shape of the front wall 10 of the communication seat-type vehicle 1 of the embodiment shown in FIG. 1. A cabin space 12 of the communication seat-type vehicle 301 is identical with the cabin space 12 of the communication seat-type vehicle 1 of the embodiment shown in FIG. 1. The shape of a rear wall 18 of the communication seat-type vehicle 301 is different from the shape of the rear wall of the communication seat-type vehicle 1 of the embodiment shown in FIG. 1. The rear wall 18 of the communication seat-type vehicle 301 is shaped to be flat along the vehicle up-down direction.

Figure 10:
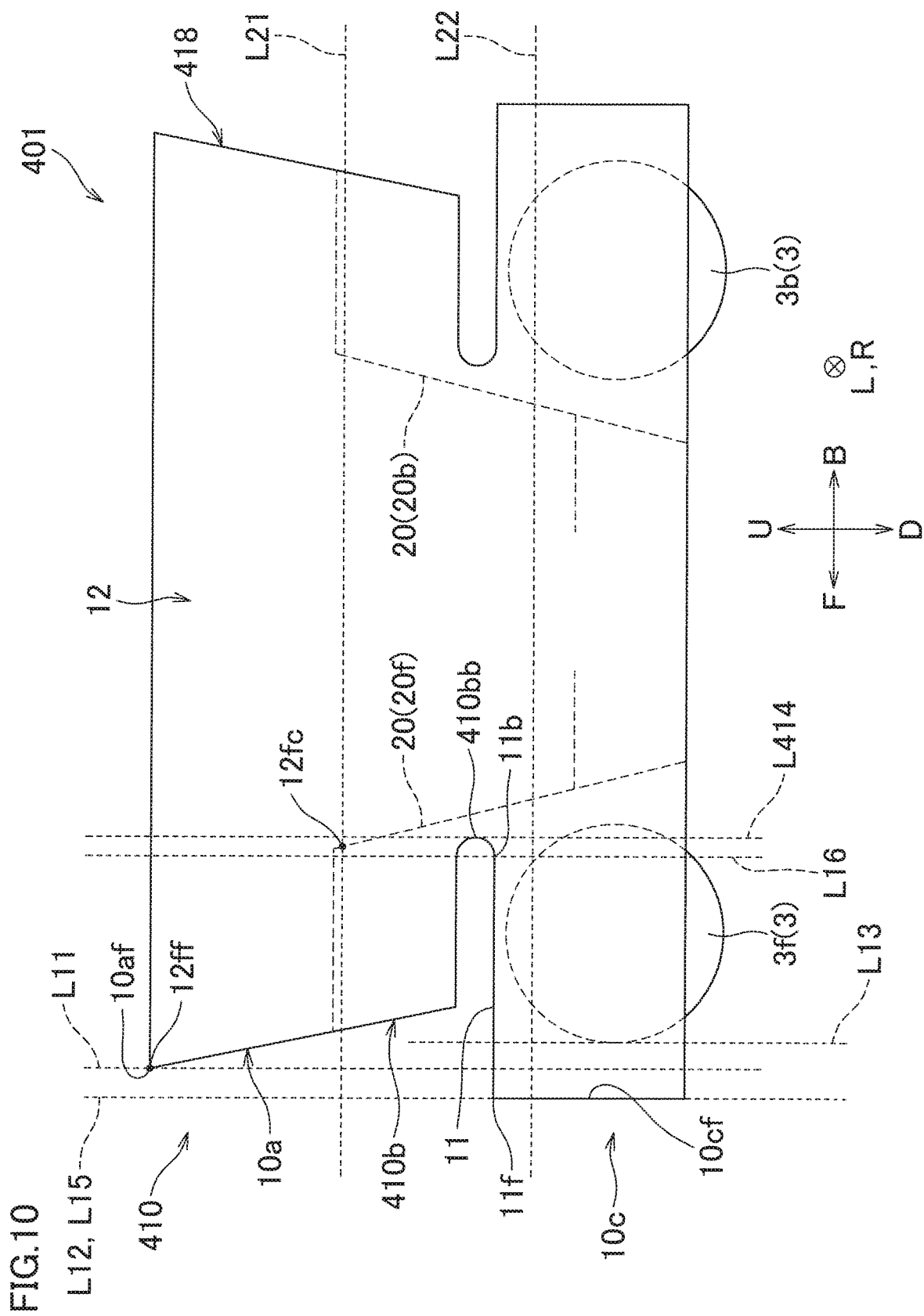
FIG. 10 is a side view which schematically shows a communication seat-type vehicle of another modification.

In the embodiment and the specific examples of the present teaching, in the vehicle front-rear direction, the front wall of the communication seat-type vehicle is arranged such that the rear end of the front face-up surface is provided rearward of the front end of the front wall upper portion and is at the same position as the rear end of the front wall intermediate portion. In this regard, in the vehicle front-rear direction, the front wall of the communication seat-type vehicle of the present teaching may be arranged such that the rear end of the front face-up surface is provided rearward of the front end of the front wall upper portion and is provided forward of the rear end of the front wall intermediate portion. As a specific example, the following will describe a communication seat-type vehicle 401 shown in FIG. 10. The communication seat-type vehicle 401 shown in FIG. 10 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 410 and a rear wall 418 of the communication seat-type vehicle 401 are different from the shapes of the front wall 10 and the rear wall of the communication seat-type vehicle 1 of the embodiment shown in FIG. 1. In other words, the shape of a front wall intermediate portion 410B of the front wall 410 of the communication seat-type vehicle 401 is different from the shape of the front wall intermediate portion 10b of the front wall 10 of the communication seat-type vehicle 1 of the embodiment shown in FIG. 1. The position of a rear end 410bb of the front wall intermediate portion 410b of the front wall 410 of the communication seat-type vehicle 401 is different from the position of the rear end 10bb of the front wall intermediate portion 10b of the communication seat-type vehicle 1 of the embodiment shown in FIG. 1. It is noted that a cabin space 12 of the communication seat-type vehicle 401 is identical with the cabin space 12 of the communication seat-type vehicle 1 of the embodiment shown in FIG. 1.

In the vehicle front-rear direction, the front wall 410 of the communication seat-type vehicle 401 shown in FIG. 10 is arranged such that the front end 10af of the front wall upper portion 10a is positioned rearward of the front end 10cf of the front wall lower portion 10c and forward of the rear end 410bb of the front wall intermediate portion 410b. In FIG. 10, a plane which passes through the rear end 410bb of the front wall intermediate portion 410b and is parallel to the vehicle up-down direction is indicated by a linear line L414. Therefore the linear line L11 is positioned rearward of the linear line L12 and forward of the linear line L414 in the vehicle front-rear direction. In the vehicle front-rear direction, the front end 11f of the front face-up surface 11 is provided at the same position as the front end 10cf of the front wall lower portion 10c and is forward of the front ends of the two front wheels 3f. In the vehicle front-rear direction, the rear end 11b of the front face-up surface 11 is provided rearward of the front end 10af of the front wall upper portion 10a and forward of the rear end 410bb of the front wall intermediate portion 410b. In short, in FIG. 10, the linear line L15 is at the same position as the linear line L12 and forward of the linear line L13 in the vehicle front-rear direction. The linear line L16 is positioned rearward of the linear line L11 and forward of the linear line L414 in the vehicle front-rear direction. The rear wall 418 is not explained because, in the communication seat-type vehicle 401, the front wall 410 viewed rearward in the vehicle front-rear direction is substantially identical in shape with the rear wall 418 viewed forward in the vehicle front-rear direction. In the communication seat-type vehicle 401, the front wall 410 viewed rearward in the vehicle front-rear direction may not be identical in shape with the rear wall 418 viewed forward in the vehicle front-rear direction. In other words, the rear wall 418 viewed forward in the vehicle front-rear direction may be different in shape from the above-described front wall 410 viewed rearward in the vehicle front-rear direction.

Figure 11:
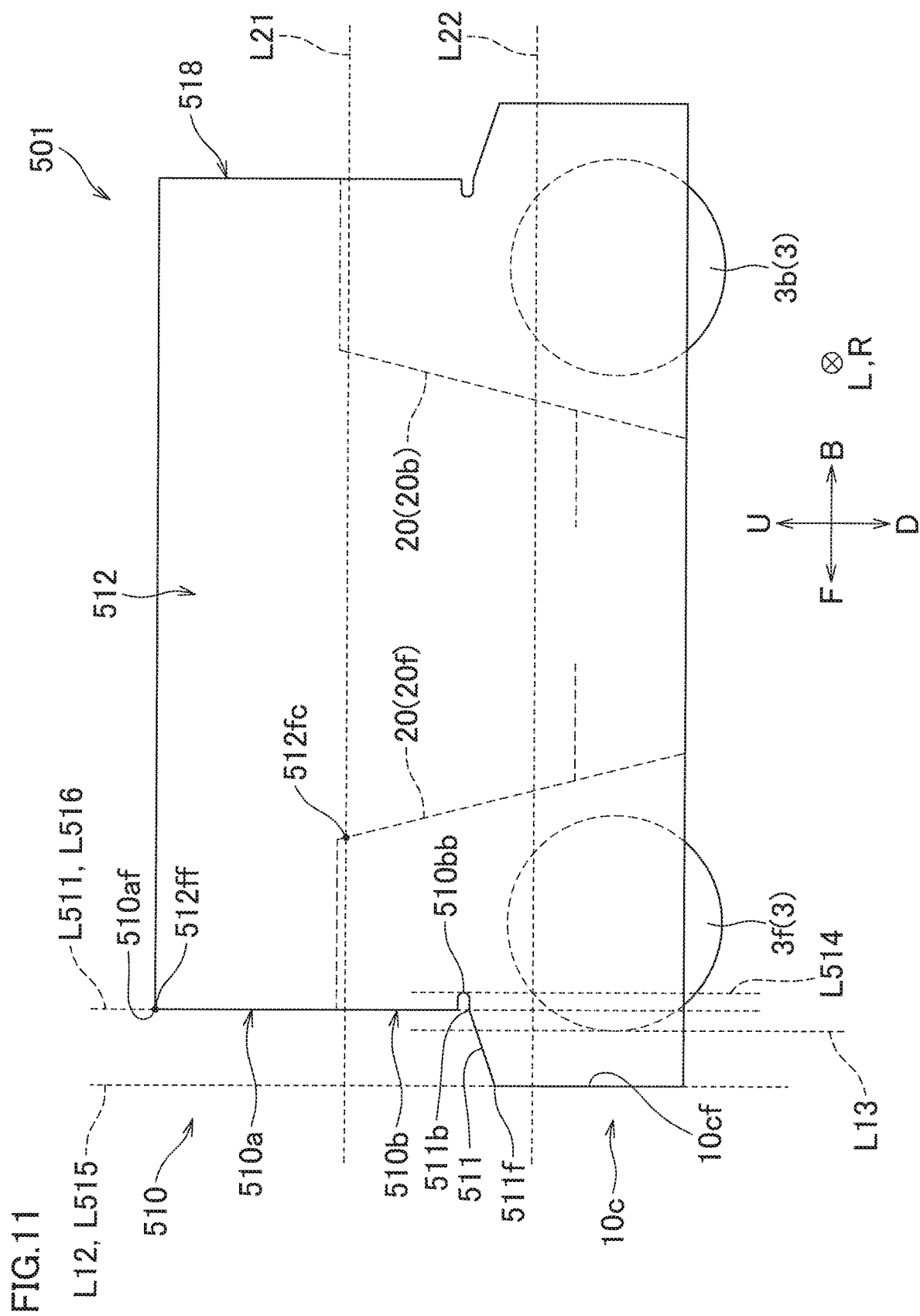
FIG. 11 is a side view which schematically shows a communication seat-type vehicle of another modification.

In the embodiment and the specific examples of the present teaching, in the vehicle front-rear direction, the front wall of the communication seat-type vehicle is arranged such that the rear end of the front face-up surface is provided rearward of the front end of the front wall upper portion and is at the same position as the rear end of the front wall intermediate portion. In this regard, in the vehicle front-rear direction, the front wall of the communication seat-type vehicle of the present teaching may be arranged such that the rear end of the front face-up surface is at the same position as the front end of the front wall upper portion and is provided forward of the rear end of the front wall intermediate portion. As a specific example, the following will describe a communication seat-type vehicle 501 shown in FIG. 11. The communication seat-type vehicle 501 shown in FIG. 11 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 510 and a rear wall 518 of the communication seat-type vehicle 501 are different from the shapes of the front wall 10 and the rear wall of the communication seat-type vehicle 1 of the embodiment shown in FIG. 1. In other words, the shapes of a front wall upper portion 510a and a front wall intermediate portion 510b of the communication seat-type vehicle 501 are different from the shapes of the front wall upper portion 10a and the front wall intermediate portion 10b of the communication seat-type vehicle 1 of the embodiment shown in FIG. 1. In the vehicle front-rear direction, the position of a front end 510*af* of the front wall upper portion 510*a* of the front wall 510 of the communication seat-type vehicle 501 is different from the position of the front end 10*af* of the front wall upper portion 10*a* of the communication seat-type vehicle 1 of the embodiment shown in FIG. 1. In the vehicle front-rear direction, the position of a rear end 510*bb* of the front wall intermediate portion 510*b* of the front wall 510 of the communication seat-type vehicle 501 is different from the position of the rear end 10*bb* of the intermediate portion 10*b* of the front wall 10 of the communication seat-type vehicle 1 of the embodiment shown in FIG. 1. In the vehicle front-rear direction, the position of a rear end 511*bb* of a front face-up surface 511 of the front wall 510 of the communication seat-type vehicle 501 is different from the position of the rear end 11*b* of the front face-up surface 11 of the communication seat-type vehicle 1 of the embodiment shown in FIG. 1.

In the vehicle front-rear direction, the front wall 510 of the communication seat-type vehicle 501 shown in FIG. 11 is arranged such that the front end 510*af* of the front wall upper portion 510*a* is positioned rearward of the front end 10*cf* of the front wall lower portion 10*c* and forward of the rear end 510*bb* of the front wall intermediate portion 510*b*. In FIG. 11, a plane which passes through the front end 510*af* of the front wall upper portion 510*a* and is parallel to the vehicle up-down direction is indicated by a linear line L511. A plane which passes through the rear end 510*bb* of the front wall intermediate portion 510*b* and is parallel to the vehicle up-down direction is indicated by a linear line L514. Therefore the linear line L511 is positioned rearward of the linear line L12 and forward of the linear line L514 in the vehicle front-rear direction. In the vehicle front-rear direction, the front end 511*f* of the front face-up surface 511 is provided at the same position as the front end 10*cf* of the front wall lower portion 10*c* and is forward of the front ends of the two front wheels 3*f*. In the vehicle front-rear direction, the rear end 511*b* of the front face-up surface 411 is at the same position as the front end 510*af* of the front wall upper portion 510*a* and is positioned forward of the rear end 510*bb* of the front wall intermediate portion 510*b*. In FIG. 11, a plane which passes through the front end 511*f* of the front face-up surface 511 of the front wall 510 and is parallel to the vehicle up-down direction is indicated by a linear line L515. A plane which passes through the rear end 511*b* of the front face-up surface 511 of the front wall 510 and is parallel to the vehicle up-down direction is indicated by a linear line L516. In short, in FIG. 11, the linear line L515 is at the same position as the linear line L12 and forward of the linear line L13 in the vehicle front-rear direction. In the vehicle front-rear direction, the linear line L516 is at the same position as the linear line L511 and is positioned forward of the linear line L514. The front wall 510 of the communication seat-type vehicle 501 shown in FIG. 11 constitutes a cabin space 512 in the following manner. The cabin space 512 is arranged such that, in the vehicle front-rear direction, a front end 512*ff* of the cabin space upper portion is positioned forward of a front end 512*fc* of the cabin space intermediate portion. FIG. 11 schematically shows that, in the vehicle front-rear direction, the front end 512*ff* of the cabin space upper portion is at the same position as the front end 510*af* of the front wall upper portion 510*a*. In reality, in the vehicle front-rear direction, the front end 512*ff* of the cabin space upper portion is positioned rearward of the front end 510*af* of the front wall upper portion 510*a* by the thickness of the front wall 510. In FIG. 11, the front end 512*fc* of the cabin space intermediate portion is positioned at the rear surface of the back rest of the front seat 20*f* of the communication seat 20. The rear wall 518 is not explained because, in the communication seat-type vehicle 501, the front wall 510 viewed rearward in the vehicle front-rear direction is substantially identical in shape with the rear wall 518 viewed forward in the vehicle front-rear direction. In the communication seat-type vehicle 501, the front wall 510 viewed rearward in the vehicle front-rear direction may not be identical in shape with the rear wall 518 viewed forward in the vehicle front-rear direction. In other words, the rear wall 518 viewed forward in the vehicle front-rear direction may be different in shape from the above-described front wall 510 viewed rearward in the vehicle front-rear direction.

Figure 12:
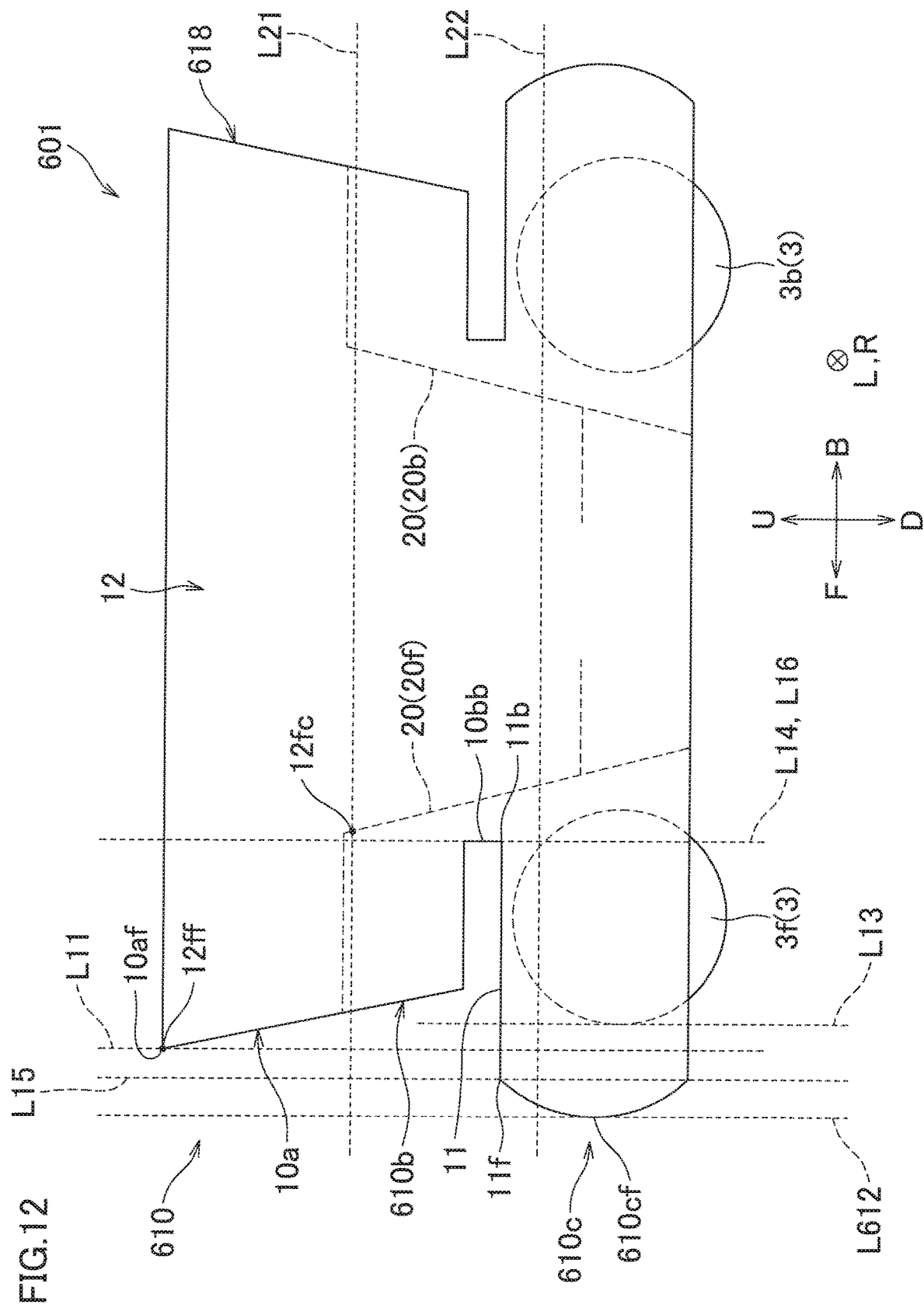
FIG. 12 is a side view which schematically shows a communication seat-type vehicle of another modification.

In the embodiment and the specific examples of the present teaching, in the vehicle front-rear direction, the front end of the front face-up surface of the front wall of the communication seat-type vehicle is provided at the same position as the front end of the front wall lower portion and forward of the front ends of the front wheels. In this regard, in the vehicle front-rear direction, the front end of the front face-up surface of the front wall of the communication seat-type vehicle of the present teaching may be provided rearward of the front end of the front wall lower portion and forward of the front ends of the front wheels. As a specific example, the following will describe a communication seat-type vehicle 601 shown in FIG. 12. The communication seat-type vehicle 601 shown in FIG. 12 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 610 and a rear wall 618 of the communication seat-type vehicle 601 are different from the shapes of the front wall 10 and the rear wall of the communication seat-type vehicle 1 of the embodiment shown in FIG. 1. In other words, the shape of a front wall intermediate portion 610*b* of the communication seat-type vehicle 601 is different from the shape of the front wall intermediate portion of the communication seat-type vehicle 1 of the embodiment shown in FIG. 1. The shape of the front wall lower portion 610*c* of the communication seat-type vehicle 601 is different from the shape of the of the front wall lower portion 10*c* of the communication seat-type vehicle 1 of the embodiment shown in FIG. 1. The position of a front end 610*cf* of the front wall lower portion 610*c* of the front wall 610 of the communication seat-type vehicle 601 is different from the position of the front end 10*cf* of the front wall lower portion 10*c* of the communication seat-type vehicle 1 of the embodiment shown in FIG. 1. It is noted that a cabin space 12 of the communication seat-type vehicle 601 is identical with the cabin space 12 of the communication seat-type vehicle 1 of the embodiment shown in FIG. 1.

In the vehicle front-rear direction, the front wall 610 of the communication seat-type vehicle 601 shown in FIG. 12 is arranged such that the front end 10*af* of the front wall upper portion 10*a* is positioned rearward of the front end 610*cf* of the front wall lower portion 610*c* and forward of the rear end 10*bb* of the front wall intermediate portion 610*b*. In FIG. 10, a plane which passes through the front end 610*cf* of the front wall lower portion 610*c* and is parallel to the vehicle up-down direction is indicated by a linear line L612. Therefore the linear line L11 is positioned rearward of the linear line L612 and forward of the linear line L14 in the vehicle front-rear direction. In the vehicle front-rear direction, the front end 11f of the front face-up surface 11 is provided rearward of the front end 610cf of the front wall lower portion 610c and is forward of the front ends of the two front wheels 3f. In the vehicle front-rear direction, the rear end 11b of the front face-up surface 11 is provided rearward of the front end 10af of the front wall upper portion 10a and is at the same position as the rear end 10bb of the front wall intermediate portion 10b. In short, in FIG. 10, the linear line L15 is rearward of the linear line L612 and forward of the linear line L13 in the vehicle front-rear direction. The linear line L16 is rearward of the linear line L11 and at the same position as the linear line L414 in the vehicle front-rear direction. The rear wall 618 is not explained because, in the communication seat-type vehicle 601, the front wall 610 viewed rearward in the vehicle front-rear direction is substantially identical in shape with the rear wall 618 viewed forward in the vehicle front-rear direction. In the communication seat-type vehicle 601, the front wall 610 viewed rearward in the vehicle front-rear direction may not be identical in shape with the rear wall 618 viewed forward in the vehicle front-rear direction. In other words, the rear wall 618 viewed forward in the vehicle front-rear direction may be different in shape from the above-described front wall 610 viewed rearward in the vehicle front-rear direction.

Figure 13:
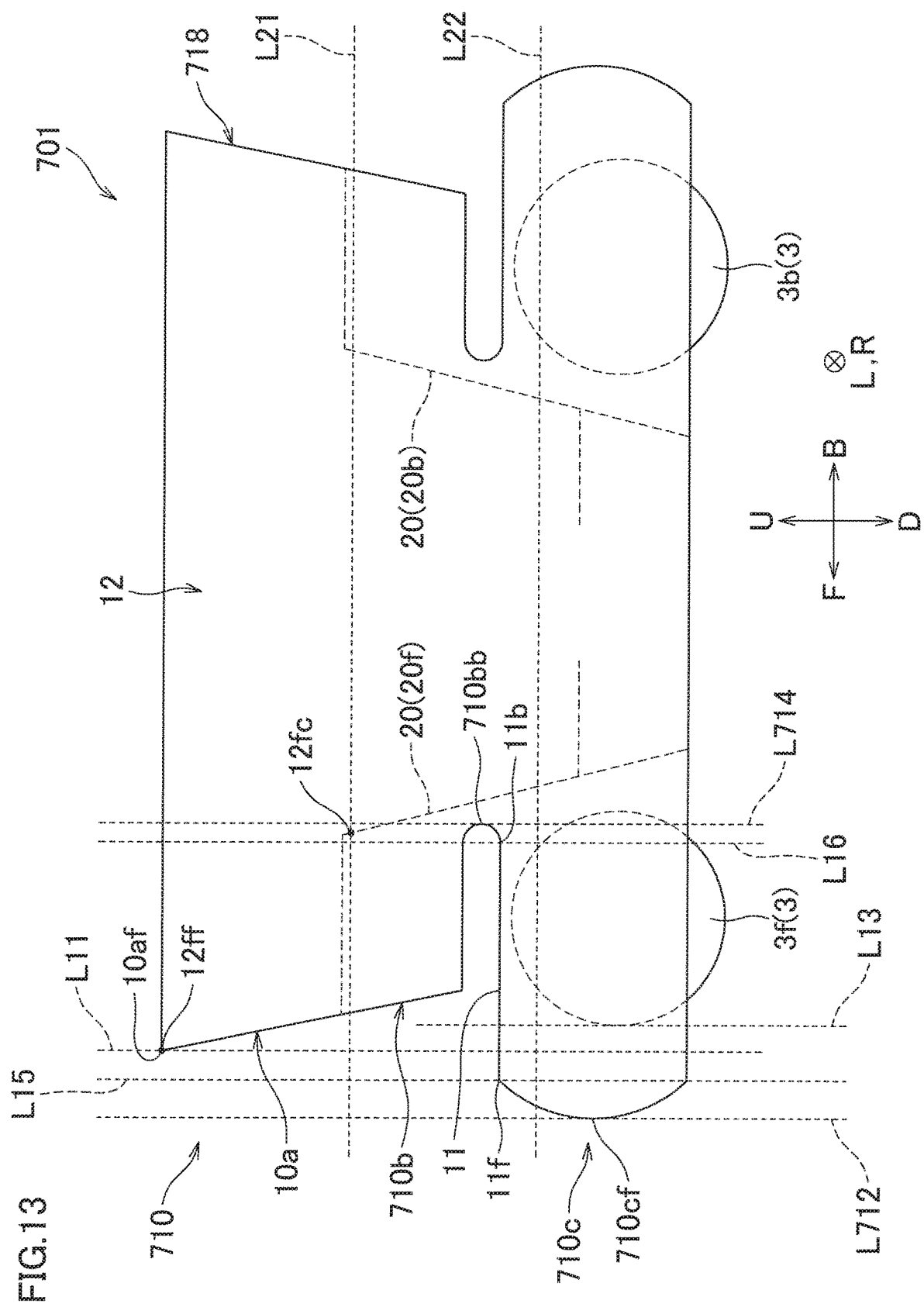
FIG. 13 is a side view which schematically shows a communication seat-type vehicle of another modification.

In the embodiment and the specific examples of the present teaching, in the vehicle front-rear direction, the front end of the front face-up surface of the front wall of the communication seat-type vehicle is provided at the same position as the front end of the front wall lower portion and forward of the front ends of the front wheels. In the vehicle front-rear direction, the rear end of the front face-up surface is provided rearward of the front end of the front wall upper portion and is at the same position as the rear end of the front wall intermediate portion. In this regard, in the vehicle front-rear direction, the front end of the front face-up surface of the front wall of the communication seat-type vehicle of the present teaching may be provided rearward of the front end of the front wall lower portion and forward of the front ends of the front wheels. In the vehicle front-rear direction, the front wall of the communication seat-type vehicle of the present teaching may be arranged such that the rear end of the front face-up surface is provided rearward of the front end of the front wall upper portion and is provided forward of the rear end of the front wall intermediate portion. As a specific example, the following will describe a communication seat-type vehicle 701 shown in FIG. 13. The communication seat-type vehicle 701 shown in FIG. 13 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 710 and a rear wall 718 of the communication seat-type vehicle 701 are different from the shapes of the front wall 10 and the rear wall of the communication seat-type vehicle 1 of the embodiment shown in FIG. 1. In other words, the shape of a front wall intermediate portion 710b of the communication seat-type vehicle 701 is different from the shape of the front wall intermediate portion of the communication seat-type vehicle 1 of the embodiment shown in FIG. 1. The shape of the front wall lower portion 710c of the communication seat-type vehicle 701 is different from the shape of the of the front wall lower portion 10c of the communication seat-type vehicle 1 of the embodiment shown in FIG. 1. The position of a rear end 710bb of the front wall intermediate portion 710b of the front wall 710 of the communication seat-type vehicle 701 is different from the position of the rear end 10bb of the front wall intermediate portion 10b of the communication seat-type vehicle 1 of the embodiment shown in FIG. 1. The position of a front end 710cf of the front wall lower portion 710c of the front wall 710 of the communication seat-type vehicle 701 is different from the position of the front end 10cf of the front wall lower portion 10c of the communication seat-type vehicle 1 of the embodiment shown in FIG. 1. It is noted that a cabin space 12 of the communication seat-type vehicle 701 is identical with the cabin space 12 of the communication seat-type vehicle 1 of the embodiment shown in FIG. 1.

In the vehicle front-rear direction, the front wall 710 of the communication seat-type vehicle 701 shown in FIG. 13 is arranged such that the front end 10af of the front wall upper portion 10a is positioned rearward of the front end 710cf of the front wall lower portion 710c and forward of the rear end 710bb of the front wall intermediate portion 710b. In FIG. 13, a plane which passes through the rear end 710bb of the front wall intermediate portion 710b and is parallel to the vehicle up-down direction is indicated by a linear line L714. A plane which passes through the front end 710cf of the front wall lower portion 710c and is parallel to the vehicle up-down direction is indicated by a linear line L712. Therefore the linear line L11 is positioned rearward of the linear line L712 and forward of the linear line L714 in the vehicle front-rear direction. In the vehicle front-rear direction, the front end 11f of the front face-up surface 11 is provided rearward of the front end 710cf of the front wall lower portion 710c and is forward of the front ends of the two front wheels 3f. In the vehicle front-rear direction, the rear end 11b of the front face-up surface 11 is provided rearward of the front end 10af of the front wall upper portion 10a and forward of the rear end 710bb of the front wall intermediate portion 710b. In short, in FIG. 13, the linear line L15 is rearward of the linear line L712 and forward of the linear line L13 in the vehicle front-rear direction. The linear line L16 is positioned rearward of the linear line L11 and forward of the linear line L714 in the vehicle front-rear direction. The rear wall 718 is not explained because, in the communication seat-type vehicle 701, the front wall 710 viewed rearward in the vehicle front-rear direction is substantially identical in shape with the rear wall 718 viewed forward in the vehicle front-rear direction. In the communication seat-type vehicle 701, the front wall 710 viewed rearward in the vehicle front-rear direction may not be identical in shape with the rear wall 718 viewed forward in the vehicle front-rear direction. In other words, the rear wall 718 viewed forward in the vehicle front-rear direction may be different in shape from the above-described front wall 710 viewed rearward in the vehicle front-rear direction.

Figure 14:
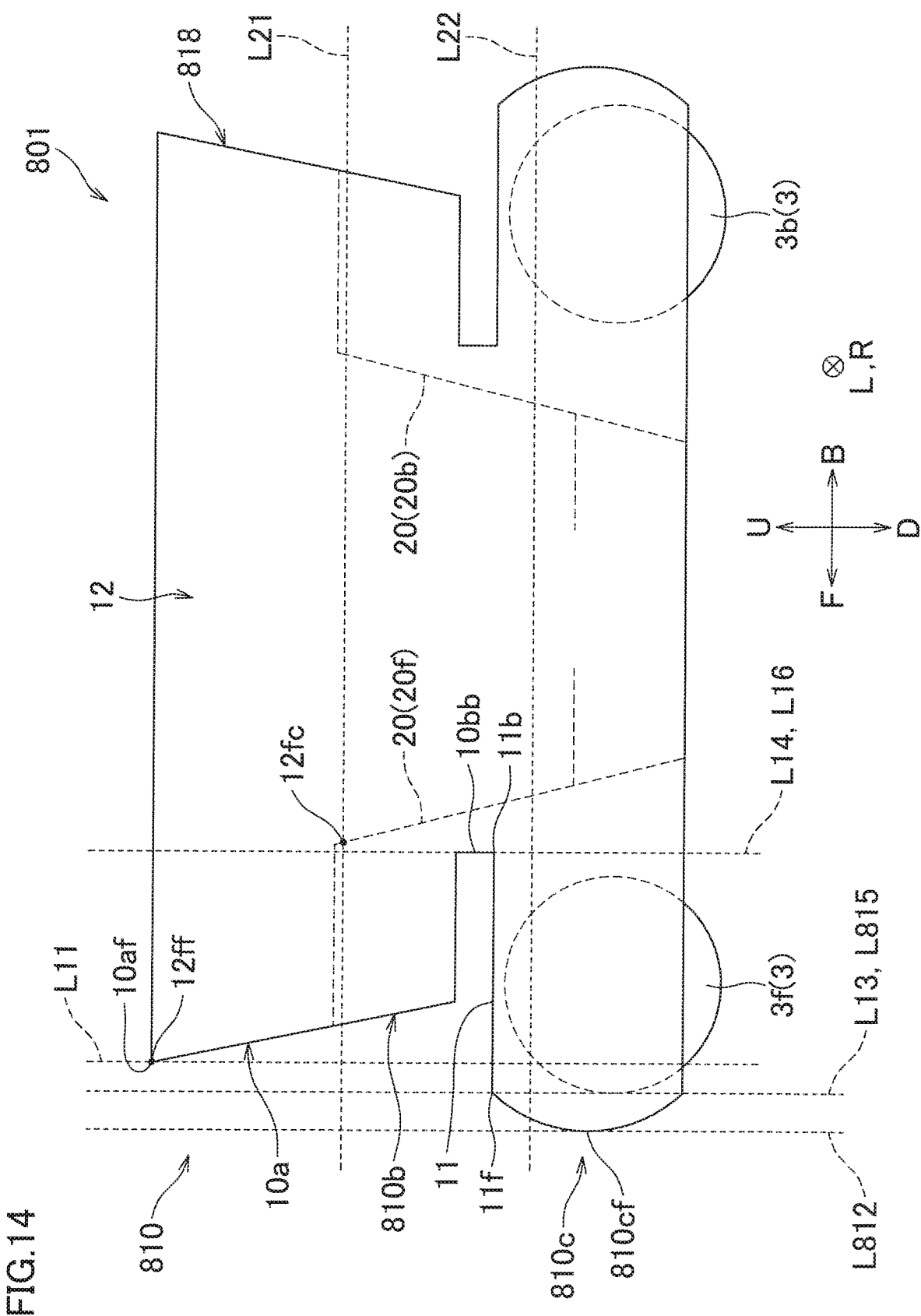
FIG. 14 is a side view which schematically shows a communication seat-type vehicle of another modification.

In the embodiment and the specific examples of the present teaching, in the vehicle front-rear direction, the front end of the front face-up surface of the front wall of the communication seat-type vehicle is provided at the same position as the front end of the lower portion of the front wall and forward of the front ends of the front wheels. In this regard, in the vehicle front-rear direction, the front end of the front face-up surface of the front wall of the communication seat-type vehicle of the present teaching may be positioned rearward of the front end of the front wall lower portion and at the same position as the front ends of the front wheels. As a specific example, the following will describe a communication seat-type vehicle 801 shown in FIG. 14. The communication seat-type vehicle 801 shown in FIG. 14 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 810 and a rear wall 818 of the communication seat-type vehicle 801 are different from the shapes of the front wall 10 and the rear wall of the communication seat-type vehicle 1 of the embodiment shown in FIG. 1. In other words, the shape of a front wall intermediate portion 810*b* of the communication seat-type vehicle 801 is different from the shape of the front wall intermediate portion 10*b* of the communication seat-type vehicle 1 of the embodiment shown in FIG. 1. The shape of the front wall lower portion 810*c* of the communication seat-type vehicle 801 is different from the shape of the of the front wall lower portion 10*c* of the communication seat-type vehicle 1 of the embodiment shown in FIG. 1. The position of a front end 810*cf* of the front wall lower portion 810*c* of the front wall 810 of the communication seat-type vehicle 801 is different from the position of the front end 10*cf* of the front wall lower portion 10*c* of the communication seat-type vehicle 1 of the embodiment shown in FIG. 1. The position of a front end 811*f* of a front face-up surface 811 of the front wall 810 of the communication seat-type vehicle 801 is different from the position of the front end 11*f* of the front face-up surface 11 of the front wall 10 of the communication seat-type vehicle 1 of the embodiment shown in FIG. 1. It is noted that a cabin space 12 of the communication seat-type vehicle 801 is identical with the cabin space 12 of the communication seat-type vehicle 1 of the embodiment shown in FIG. 1.

In the vehicle front-rear direction, the front wall 810 of the communication seat-type vehicle 801 shown in FIG. 14 is arranged such that the front end 10*af* of the front wall upper portion 10*a* is positioned rearward of the front end 810*cf* of the front wall lower portion 810*c* and forward of the rear end 10*bb* of the front wall intermediate portion 810*b*. In FIG. 14, a plane which passes through the front end 810*cf* of the front wall lower portion 810*c* and is parallel to the vehicle up-down direction is indicated by a linear line L812. Therefore the linear line L11 is positioned rearward of the linear line L812 and forward of the linear line L14 in the vehicle front-rear direction. In the vehicle front-rear direction, the front end 811*f* of the front face-up surface 811 is provided rearward of the front end 810*cf* of the front wall lower portion 810*c* and at the same position as the front ends of the two front wheels 3*f*. In the vehicle front-rear direction, the rear end 11*b* of the front face-up surface 811 is provided rearward of the front end 10*af* of the front wall upper portion 10*a* and is at the same position as the rear end 10*bb* of the front wall intermediate portion 810*b*. In FIG. 14, a plane which passes through the front end 811*f* of the front face-up surface 811 of the front wall 810 and is parallel to the vehicle up-down direction is indicated by a linear line L815. In short, in FIG. 14, the linear line L815 is positioned rearward of the linear line L812 and at the same position as the linear line L13 in the vehicle front-rear direction. The linear line L16 is rearward of the linear line L11 and at the same position as the linear line L14 in the vehicle front-rear direction. The rear wall 818 is not explained because, in the communication seat-type vehicle 801, the front wall 810 viewed rearward in the vehicle front-rear direction is substantially identical in shape with the rear wall 818 viewed forward in the vehicle front-rear direction. In the communication seat-type vehicle 801, the front wall 810 viewed rearward in the vehicle front-rear direction may not be identical in shape with the rear wall 818 viewed forward in the vehicle front-rear direction. In other words, the rear wall 818 viewed forward in the vehicle front-rear direction may be different in shape from the above-described front wall 810 viewed rearward in the vehicle front-rear direction.

In the embodiment and the specific examples of the present teaching, in the vehicle front-rear direction, the front wall of the communication seat-type vehicle is arranged such that the rear end of the front face-up surface is provided rearward of the front end of the front wall upper portion and is at the same position as the rear end of the front wall intermediate portion. In the vehicle front-rear direction, the front end of the front face-up surface is provided at the same position as the front end of the front wall lower portion and is forward of the front ends of the front wheels. In this regard, in the vehicle front-rear direction, the front wall of the communication seat-type vehicle of the present teaching may be arranged such that the rear end of the front face-up surface is at the same position as the front end of the front wall upper portion and is provided forward of the rear end of the front wall intermediate portion. Furthermore, in the vehicle front-rear direction, the front end of the front face-up surface may be provided rearward of the front end of the front wall lower portion and forward of the front ends of the front wheels. As a specific example, the following will describe a communication seat-type vehicle 901 shown in FIG. 15. The communication seat-type vehicle 901 shown in FIG. 15 is a modification of the communication seat-type vehicle shown in FIG. 1. Basically, a modification of the embodiment of the present teaching encompasses all features of the embodiment of the present teaching described above, which is shown in FIG. 1. It is noted that items identical with those of the Specific Example 1 of the embodiment of the present teaching are indicated by the same reference numerals and detailed descriptions thereof are suitably omitted. The shapes of a front wall 910 and a rear wall 918 of the communication seat-type vehicle 901 are different from the shapes of the front wall 10 and the rear wall of the communication seat-type vehicle 1 of the embodiment shown in FIG. 1. In other words, the shapes of a front wall upper portion 910*a*, a front wall intermediate portion 910*b*, and a front wall lower portion 910*c* of the front wall 910 of the communication seat-type vehicle 901 are different from the shapes of the front wall upper portion 10*a*, the front wall intermediate portion 10*b*, and the front wall lower portion 10*c* of the front wall 10 of the communication seat-type vehicle 1 of the embodiment shown in FIG. 1. The position of a front end 910*af* of the front wall upper portion 910*a* of the front wall 910 of the communication seat-type vehicle 901 is different from the position of the front end 10*af* of the front wall upper portion 10*a* of the communication seat-type vehicle 1 of the embodiment shown in FIG. 1. In the vehicle front-rear direction, the position of a rear end 910*bb* of the front wall intermediate portion 910*b* of the front wall 910 of the communication seat-type vehicle 901 is different from the position of the rear end 10*bb* of the front wall intermediate portion 10*b* of the communication seat-type vehicle 1 of the embodiment shown in FIG. 1. The position of a front end 910*cf* of the front wall lower portion 910*c* of the front wall 910 of the communication seat-type vehicle 901 is different from the position of the front end 10cf of the front wall lower portion 10c of the communication seat-type vehicle 1 of the embodiment shown in FIG. 1. The positions of a front end 911f and a rear end 911b of a front face-up surface 911 of the front wall 910 of the communication seat-type vehicle 401 are different from the positions of the front end 11f and the rear end 11b of the front face-up surface 11 of the front wall 10 of the communication seat-type vehicle 1 of the embodiment shown in FIG. 1.

In the vehicle front-rear direction, the front wall 910 of the communication seat-type vehicle 901 shown in FIG. 15 is arranged such that the front end 910af of the front wall upper portion 910a is positioned rearward of the front end 910cf of the front wall lower portion 910c and forward of the rear end 910bb of the front wall intermediate portion 910b. In FIG. 15, a plane which passes through the front end 910af of the front wall upper portion 910a and is parallel to the vehicle up-down direction is indicated by a linear line L911. A plane which passes through the rear end 910bb of the front wall intermediate portion 910b and is parallel to the vehicle up-down direction is indicated by a linear line L914. A plane which passes through the front end 910cf of the front wall lower portion 910c and is parallel to the vehicle up-down direction is indicated by a linear line L912. Therefore the linear line L911 is positioned rearward of the linear line L912 and forward of the linear line L914 in the vehicle front-rear direction. In the vehicle front-rear direction, the front end 911f of the front face-up surface 911 is provided rearward of the front end 910cf of the front wall lower portion 910c and is forward of the front ends of the two front wheels 3f. In the vehicle front-rear direction, the rear end 911b of the front face-up surface 911 is at the same position as the front end 910af of the front wall upper portion 910a and is positioned forward of the rear end 910bb of the front wall intermediate portion 910b. In FIG. 15, a plane which passes through the front end 911f of the front face-up surface 911 of the front wall 910 and is parallel to the vehicle up-down direction is indicated by a linear line L915. A plane which passes through the rear end 911b of the front face-up surface 911 of the front wall 910 and is parallel to the vehicle up-down direction is indicated by a linear line L916. In short, in FIG. 15, the linear line L915 is rearward of the linear line L912 and forward of the linear line L13 in the vehicle front-rear direction. In the vehicle front-rear direction, the linear line L916 is at the same position as the linear line L911 and is positioned forward of the linear line L914. The rear wall 918 is not explained because, in the communication seat-type vehicle 901, the front wall 910 viewed rearward in the vehicle front-rear direction is substantially identical in shape with the rear wall 918 viewed forward in the vehicle front-rear direction. In the communication seat-type vehicle 901, the front wall 910 viewed rearward in the vehicle front-rear direction may not be identical in shape with the rear wall 918 viewed forward in the vehicle front-rear direction. In other words, the rear wall 918 viewed forward in the vehicle front-rear direction may be different in shape from the above-described front wall 910 viewed rearward in the vehicle front-rear direction.

The front wall 910 of the communication seat-type vehicle 901 shown in FIG. 15 constitutes a cabin space 912 in the following manner. The cabin space 912 is arranged such that, in the vehicle front-rear direction, a front end 912ff of the cabin space upper portion is positioned forward of a front end 912fc of the cabin space intermediate portion. FIG. 15 schematically shows that, in the vehicle front-rear direction, the front end 912ff of the cabin space upper portion is at the same position as the front end 910af of the front wall upper portion 910a. In reality, in the vehicle front-rear direction, the front end 112ff of the cabin space upper portion is positioned rearward of the front end 910af of the front wall upper portion 910a by the thickness of the front wall 910. In FIG. 15, the front end 912fc of the cabin space intermediate portion is positioned at the rear surface of the back rest of the front seat 20f of the communication seat 20.

In the embodiment and the specific examples of the present teaching, in the vehicle front-rear direction, the front wall of the communication seat-type vehicle is arranged such that the front end of the front wall upper portion is provided rearward of the front end of the front wall lower portion. In this regard, in the vehicle front-rear direction, the front wall of the communication seat-type vehicle of the present teaching may be arranged such that the front end of the front wall upper portion is at the same position as the front end of the front wall lower portion or is provided forward of the front end of the front wall lower portion.

In the specific examples of the present teaching, the maximum number of passengers seated on the communication seats of the communication seat-type vehicle is four. Alternatively, the maximum number of passengers seated on the communication seats of the communication seat-type vehicle of the present teaching may be two or more and six or less.

REFERENCE SIGNS LIST 1, 101, 201, 301, 401, 501, 601, 701, 801, 901 communication seat-type vehicle
3, 103 wheel
3f, 103f front wheel
5, 105 driving source
6, 106 steering mechanism
10, 110, 210, 410, 510, 610, 710, 810, 910 front wall
10a, 110a, 210a, 510a, 910a front wall upper portion
10af, 110af, 210af, 910af front end of front wall upper portion
10b, 110b, 210b, 410b, 510b, 610b, 710b, 810b, 910b front wall intermediate portion
10bb, 110bb, 210bb, 410bb, 510bb, 710bb, 910bb rear end of front wall intermediate portion
10c, 110c, 210c, 610c, 710c, 810c, 910c front wall lower portion
10cf, 110cf, 210cf, 610cf, 710cf, 810cf, 910cf, front end of front wall lower portion
11, 111, 211, 411, 511, 811, 911 front face-up surface
11b, 111b, 211b, 411b, 511b, 911b rear end of front face-up surface
11f, 111f, 211f, 511f, 811f, 911f front end of front face-up surface
12, 112 cabin space
12ff front end of cabin space upper portion
12fc front end of cabin space intermediate portion
20, 120 communication seat
108 automatic driving controller
118, 218, 318, 418, 518, 618, 718, 818, 918 rear wall
119 rear face-up surface
121 seat
121a seat portion
122 back rest
122a back rest portion
123 storage space
181 door (sliding door)
182 entrance
184 visor

The invention claimed is:

1. A communication seat vehicle for passengers, the vehicle being capable of running forward in a front-rear direction as a traveling direction, the vehicle comprising:
   a front wall which is provided at a vehicle front portion to form a cabin space in a vehicle internal portion to accommodate the passengers;
   communication seats which are provided in the vehicle internal portion for the passengers to be seated thereon, at locations for the seated passengers to talk face-to-face with one another, each of the communication seats being configured for one of the passengers to sit thereon, and being adjustable to thereby change a direction that said one passenger sitting thereon faces;
   four wheels, including two front wheels and two rear wheels which are behind the two front wheels in a vehicle front-rear direction; and
   a rear wall which is provided at a vehicle rear portion to form the cabin space, wherein
   the front wall has an upper portion, an intermediate portion, and a lower portion, a front end of the upper portion and a front end of the lower portion being positioned forward of a rear end of the intermediate portion in the vehicle front-rear direction,
   the front wall includes a front face-up surface that is disposed below the upper portion thereof, the front face-up surface having
      a front end that is at a same position as, or rearward of, the front end of the lower portion of the front wall, and is at a same position as, or forward of, front ends of the two front wheels in the vehicle front-rear direction, and
      a rear end that is at a same position as, or rearward of, the front end of the upper portion of the front wall, and is at a same position as, or forward of, the rear end of the intermediate portion of the front wall,
   the cabin space has an upper portion, an intermediate portion, and a lower portion, a front end of the upper portion of the cabin space being positioned forward of a front end of the intermediate portion of the cabin space in the vehicle front-rear direction, and
   a rear end of the upper portion of the cabin space is positioned rearward of a rear end of the intermediate portion of the cabin space in the vehicle front-rear direction.

2. The communication seat vehicle according to claim 1, wherein, in the vehicle front-rear direction, the front end of the upper portion of the front wall is positioned rearward of the front end of the lower portion of the front wall.

3. The communication seat vehicle according to claim 1, wherein the communication seats include at least two of:
   a rear seat assembly positioned to have a passenger seated thereon to face a forward direction of the vehicle;
   a front seat assembly positioned to have a passenger seated thereon to face a rearward direction of the vehicle;
   a right seat assembly positioned to have a passenger seated thereon to face a leftward direction of the vehicle; and
   a left seat assembly positioned to have a passenger seated thereon to face a rightward direction of the vehicle.

4. The communication seat vehicle according to claim 1, wherein, a total number of the communication seats is no more than six.

5. The communication seat vehicle according to claim 1, wherein, the traveling direction is reversible to rearward in the vehicle front-rear direction.

6. The communication seat vehicle according to claim 1, wherein
   the rear wall has an upper portion, an intermediate portion, and a lower portion, a rear end of the upper portion of the rear wall and a rear end of the lower portion of the rear wall being positioned rearward of a front end of the intermediate portion of the rear wall in the vehicle front-rear direction,
   the rear wall includes a rear face-up surface disposed below the upper portion thereof, the rear face-up surface having, in the vehicle front-rear direction,
      a rear end that is at the same position as, or forward of, the rear end of the lower portion of the rear wall, and is at a same position as, or rearward of, rear ends of the two rear wheels, and
      a front end that is at a same position as, or forward of, the rear end of the upper portion of the rear wall, and is at a same position as, or rearward of, the front end of the intermediate portion of the rear wall.

7. The communication seat vehicle according to claim 6, wherein, in the vehicle front-rear direction, the rear end of the upper portion of the rear wall is positioned forward of the rear end of the lower portion of the rear wall.

8. The communication seat vehicle according to claim 6, wherein
   the upper portion of the rear wall is at an upper portion of the vehicle,
      the intermediate portion of the rear wall is at an intermediate portion of the vehicle, and the lower portion of the rear wall is at a lower portion of the vehicle.

9. The communication seat vehicle according to claim 1, wherein, the communication seats include a seat portion for a passenger to be seated thereon, and the seat portion includes a seat that is provided in the vehicle internal portion.

10. The communication seat vehicle according to claim 1, wherein,
    the communication seat includes a back rest portion for a passenger to keep posture, the back rest portion being constitutable by a back rest that is provided in the vehicle internal portion.

11. The communication seat vehicle according to claim 10, further comprising, in the vehicle internal portion, at least one of:
    a front luggage deck constituting a front storage space which is at least partially provided forward of a front end of the communication seats; or
    a rear luggage deck constituting a rear storage space which is at least partially provided rearward of a rear end of the communication seats, wherein
    the back rest is arranged to open and close at least one of the front storage space or the rear storage space.

12. The communication seat vehicle according to claim 1, further comprising, in the vehicle internal portion, at least one of:
    a front luggage deck constituting a front storage space which is at least partially provided forward of a front end of the communication seats; or
    a rear luggage deck constituting a rear storage space which is at least partially provided rearward of a rear end of the communication seats.

13. The communication seat vehicle according to claim 1, further comprising at least one window which allows the passengers seated on the communication seats to see an external space outside the vehicle from the cabin space.

14. The communication seat vehicle according to claim 1, further comprising an entrance which allows the passengers to get in and out from the cabin space, the entrance being provided at at least one of a vehicle left portion, a vehicle right portion, the vehicle front portion, or the vehicle rear portion.

15. The communication seat vehicle according to claim 14, further comprising a door which is configured to open and close the entrance.

16. The communication seat vehicle according to claim 1, further comprising:
- a driving source which is configured to apply driving force to at least one of the four wheels;
- a steering mechanism which is configured to steer at least one of the four wheels; and
- an automatic driving controller which is configured to automatically control the driving source and the steering mechanism.

17. The communication seat vehicle according to claim 1, wherein
- the upper portion of the front wall and the upper portion of the cabin space are at an upper portion of the vehicle,
- the intermediate portion of the front wall and the intermediate portion of the cabin space are at an intermediate portion of the vehicle, and
- the lower portion of the front wall and the lower portion of the cabin space are at a lower portion of the vehicle.

* * * * *